(12) United States Patent
Terwedo

(10) Patent No.: US 11,907,496 B2
(45) Date of Patent: Feb. 20, 2024

(54) BROWSER-BASED APPLICATION MANAGEMENT

(71) Applicant: cloudRIA, Inc., Edmonds, WA (US)

(72) Inventor: Ryan D. Terwedo, Edmonds, WA (US)

( * ) Notice: Subject to any disclaimer, the term of this patent is extended or adjusted under 35 U.S.C. 154(b) by 517 days.

(21) Appl. No.: 14/175,903

(22) Filed: Feb. 7, 2014

(65) Prior Publication Data

US 2014/0229898 A1   Aug. 14, 2014

Related U.S. Application Data

(60) Provisional application No. 61/762,673, filed on Feb. 8, 2013.

(51) Int. Cl.
*G06F 3/04817* (2022.01)
*G06F 3/0482* (2013.01)
*G06F 3/04842* (2022.01)

(52) U.S. Cl.
CPC ........ *G06F 3/04817* (2013.01); *G06F 3/0482* (2013.01); *G06F 3/04842* (2013.01)

(58) Field of Classification Search
CPC ..... H04L 67/02; H04L 67/306; H04L 7/2819; H04L 67/288; H04L 67/16; H04L 67/42; H04L 63/10; H04L 63/168; H04L 67/32; H04L 67/20; H04L 43/14; H04L 51/04; H04L 51/12; H04L 67/327; G06F 17/30873; G06F 3/0481; G06F 9/5066; G06F 9/45558; G06F 17/3048; G06F 9/45516; G06F 9/5061; G06F 17/30312; G06F 8/65; G06F 17/30902; G06F 21/6218; G06F 17/30896; G06F 3/0484; G06F 17/30174; G06F 21/50; G06F 3/04817;

(Continued)

(56) References Cited

U.S. PATENT DOCUMENTS 6,546,554 B1 * 4/2003 Schmidt .............. G06F 9/44526
709/201
7,146,563 B2 * 12/2006 Hesmer ............... G06F 17/3089
707/E17.116

(Continued)

FOREIGN PATENT DOCUMENTS

WO   WO02/37287    5/2002
WO   WO2005/114449   12/2005

OTHER PUBLICATIONS

Kao et al., "A Web-based, Offline-able, and Personalization Runtime Environment for executing applications on mobile devices," Computer Standards & Interfaces, vol. 34, pp. 212-224 (2012).

(Continued)

*Primary Examiner* — Tuyetlien T Tran
(74) *Attorney, Agent, or Firm* — K&L Gates LLP

(57) ABSTRACT

Systems and methods are provided for managing multiple software applications. A browser-based application interface portal provides users a single, unified portal for accessing software applications running on different operating systems, hosted servers, and third party servers, as well as web applications. The executed applications may then be integrated into the portal. The data retrieved from external web applications may be filtered, reformatted, and restyled to provide only the information of interest to the user and to provide a more consistent interface for the information.

32 Claims, 57 Drawing Sheets

(58) Field of Classification Search
CPC .. G06F 3/04842; G06F 3/04847; G06F 17/30; G06F 21/44; G06F 3/0482; G06F 21/31; G06F 3/1224; G06F 3/1236; G06F 17/3005; G06F 17/30082; G06F 17/30194; G06F 17/30893; G06F 21/41; G06F 16/958; G06F 16/9577; G06F 8/24; G06F 8/40; G06F 16/288; G06F 16/951; G06F 8/76; G06F 9/547; G06F 11/3612; G06F 16/9535; G06F 16/954; G06F 21/554; G06F 21/51; G06F 21/6281; G06F 8/443; G06F 9/451; G06F 9/445; G06F 16/64; G06F 16/9538; G06F 2209/545; G06F 16/95; G06F 21/645; G06F 2201/805; G06F 3/0656; G06F 9/44521; G06Q 10/103; H04N 21/25891; H04N 21/4828; H04W 4/18

See application file for complete search history.

(56) References Cited

U.S. PATENT DOCUMENTS

| | | | |
|---|---|---|---|
| 7,234,107 B1 | 6/2007 | Aoki et al. | |
| 7,293,070 B2* | 11/2007 | Moses | G06F 17/3089 707/E17.116 |
| 7,418,560 B2* | 8/2008 | Wintergerst | G06F 12/084 711/147 |
| 7,428,523 B2* | 9/2008 | Tsang | G06F 17/30873 |
| 7,428,592 B2* | 9/2008 | Lee | G06F 17/30607 705/4 |
| 7,444,597 B2 | 10/2008 | Perantatos et al. | |
| 7,505,927 B2* | 3/2009 | Price | G06Q 10/087 705/26.1 |
| 7,512,651 B2* | 3/2009 | Offermann | H04L 63/0428 709/203 |
| 7,533,385 B1* | 5/2009 | Barnes | G06F 9/5077 718/104 |
| 7,555,529 B2 | 6/2009 | Bloomfield et al. | |
| 7,634,756 B2* | 12/2009 | Bjornson | G06Q 10/06 717/107 |
| 7,673,074 B1* | 3/2010 | Sebastian | H04L 69/16 370/401 |
| 7,685,595 B1 | 3/2010 | Manahan et al. | |
| 7,784,089 B2* | 8/2010 | Lundblade | H04L 9/32 380/277 |
| 7,836,303 B2 | 11/2010 | Levy et al. | |
| 7,885,847 B2 | 2/2011 | Wodtke et al. | |
| 7,890,574 B2 | 2/2011 | Angeline | |
| 7,922,493 B1* | 4/2011 | Gennaro | G06F 17/30893 434/107 |
| 7,925,988 B2 | 4/2011 | Abernathy, Jr. et al. | |
| 7,950,026 B1 | 5/2011 | Urbach | |
| 7,971,187 B2* | 6/2011 | Sanghvi | G06Q 10/06 717/121 |
| 8,001,456 B2* | 8/2011 | McElroy | G06F 17/2247 715/205 |
| 8,028,237 B2 | 9/2011 | Schmitt | |
| 8,078,487 B2 | 12/2011 | Li et al. | |
| 8,117,554 B1* | 2/2012 | Grechishkin | G06F 9/4443 703/23 |
| 8,181,112 B2* | 5/2012 | Jolley | G06F 17/30873 715/739 |
| 8,191,081 B2 | 5/2012 | Schmidt et al. | |
| 8,327,351 B2* | 12/2012 | Paladino | G06F 8/71 717/106 |
| 8,548,909 B1* | 10/2013 | Snow | G06F 16/986 705/42 |
| 8,606,916 B2* | 12/2013 | Anuff | G06Q 10/10 709/203 |
| 8,631,324 B2* | 1/2014 | Lection | G06F 17/3089 715/205 |
| 8,667,017 B1* | 3/2014 | Forney | G06Q 10/103 707/782 |
| 8,731,529 B2* | 5/2014 | Lindeman | G06F 8/60 455/414.1 |
| 8,739,249 B1* | 5/2014 | Kay | G06F 21/44 713/168 |
| 8,788,953 B2* | 7/2014 | Lauridsen | G06F 17/3089 709/224 |
| 8,990,710 B1* | 3/2015 | Warner | G06F 8/20 715/760 |
| 9,009,313 B2* | 4/2015 | Rice | G06F 17/30309 709/219 |
| 9,111,091 B2* | 8/2015 | Ligman | H04L 67/22 |
| 9,165,083 B2* | 10/2015 | Buehler | G06F 16/958 |
| 9,231,939 B1* | 1/2016 | Morrison | G06F 21/6218 |
| 9,361,396 B2* | 6/2016 | Fox | G06F 8/38 |
| 9,448,815 B2* | 9/2016 | Pahlavan | G06F 3/1462 |
| 9,552,123 B1* | 1/2017 | Johnston | G06F 3/048 |
| 9,699,168 B2* | 7/2017 | Pieczul | H04L 67/02 |
| 9,754,245 B1* | 9/2017 | Davison | G06Q 20/12 |
| 9,942,271 B2* | 4/2018 | Lim | H04L 63/20 |
| 10,114,965 B2* | 10/2018 | Lim | G06F 21/604 |
| 10,120,952 B2* | 11/2018 | Bush | G06F 16/958 |
| 2001/0034771 A1* | 10/2001 | Hutsch | H04L 67/34 709/217 |
| 2002/0052950 A1* | 5/2002 | Pillai | H04L 41/0213 709/224 |
| 2002/0065877 A1* | 5/2002 | Kowtko | G06F 17/30893 709/203 |
| 2002/0067370 A1* | 6/2002 | Forney | G06F 17/30873 715/742 |
| 2002/0091712 A1* | 7/2002 | Martin | G06F 12/0866 |
| 2002/0097268 A1 | 7/2002 | Dunn et al. | |
| 2002/0188435 A1 | 12/2002 | Labarge | |
| 2002/0191612 A1* | 12/2002 | Curtis | H04L 12/1836 370/392 |
| 2003/0135509 A1* | 7/2003 | Davis | H04L 63/0227 |
| 2003/0229900 A1* | 12/2003 | Reisman | G06F 17/30873 725/87 |
| 2004/0104931 A1* | 6/2004 | Schmitt | G06F 17/3089 715/744 |
| 2004/0104947 A1* | 6/2004 | Schmitt | G06F 17/30899 715/859 |
| 2004/0221021 A1 | 11/2004 | Domer | |
| 2005/0010634 A1* | 1/2005 | Henderson | H04L 67/306 709/201 |
| 2005/0055377 A1* | 3/2005 | Dorey | G06F 17/30056 |
| 2005/0154742 A1* | 7/2005 | Roth | G06F 8/00 |
| 2005/0175015 A1* | 8/2005 | Ramaswamy | G06F 16/954 370/395.52 |
| 2006/0026557 A1* | 2/2006 | Petri | G06F 16/958 717/106 |
| 2006/0041637 A1* | 2/2006 | Jerrard-Dunne | H04L 67/28 709/219 |
| 2006/0059423 A1* | 3/2006 | Lehmann | G06Q 10/06 715/200 |
| 2006/0085500 A1* | 4/2006 | Allamaraju | G06F 17/3089 709/203 |
| 2006/0100892 A1* | 5/2006 | Ellanti | G06Q 30/02 705/319 |
| 2006/0101336 A1* | 5/2006 | Edwards | G06F 17/30899 715/700 |
| 2006/0129935 A1* | 6/2006 | Deinlein | G06F 17/30861 715/733 |
| 2006/0212798 A1* | 9/2006 | Lection | G06F 9/54 715/234 |
| 2006/0288110 A1* | 12/2006 | Alden | G06Q 10/06 709/228 |
| 2007/0067392 A1* | 3/2007 | Torres | H04L 51/043 709/206 |
| 2007/0101297 A1* | 5/2007 | Forstall | G06F 3/04817 715/841 |
| 2007/0136579 A1* | 6/2007 | Levy | H04L 63/102 713/168 |
| 2007/0174824 A1 | 7/2007 | Relyea et al. | |
| 2007/0198710 A1* | 8/2007 | Gopalakrishnan | H04L 67/06 709/225 |
| 2007/0245300 A1* | 10/2007 | Chan | G06Q 10/06 717/105 |

(56) References Cited

U.S. PATENT DOCUMENTS

| | | | |
|---|---|---|---|
| 2007/0250531 A1* | 10/2007 | Wiggins | G06F 17/30011 |
| 2007/0256073 A1* | 11/2007 | Troung | G06F 21/606 718/1 |
| 2007/0300057 A1 | 12/2007 | Corcoran et al. | |
| 2008/0091774 A1* | 4/2008 | Taylor | G06Q 30/02 709/203 |
| 2008/0163075 A1* | 7/2008 | Beck | H04L 67/10 715/759 |
| 2008/0256443 A1* | 10/2008 | Li | G06F 3/0486 715/700 |
| 2008/0256513 A1* | 10/2008 | Nathan | G06F 8/24 717/115 |
| 2008/0263216 A1* | 10/2008 | Jacob | G06F 17/30887 709/229 |
| 2008/0295110 A1 | 11/2008 | Muscarella et al. | |
| 2009/0059909 A1* | 3/2009 | Sullivan | G06Q 10/06 370/360 |
| 2009/0070162 A1* | 3/2009 | Leonelli | G06Q 10/0633 705/7.27 |
| 2009/0070744 A1* | 3/2009 | Taylor | G06Q 10/10 717/128 |
| 2009/0089406 A1* | 4/2009 | Roush | G06F 9/5077 709/220 |
| 2009/0100425 A1 | 4/2009 | Russell | |
| 2009/0113329 A1* | 4/2009 | Corona | G06F 8/34 715/769 |
| 2009/0249310 A1* | 10/2009 | Meijer | G06F 8/24 717/136 |
| 2009/0292791 A1* | 11/2009 | Livshits | G06F 9/451 709/217 |
| 2009/0319363 A1* | 12/2009 | Callaghan | G06Q 20/10 705/14.36 |
| 2009/0327953 A1* | 12/2009 | Honkala | G06F 3/04817 715/804 |
| 2010/0017461 A1 | 1/2010 | Kokkevis et al. | |
| 2010/0064208 A1 | 3/2010 | Valtchev | |
| 2010/0070887 A1 | 3/2010 | Murrett et al. | |
| 2010/0106564 A1* | 4/2010 | Manesh | G06Q 30/0253 705/26.1 |
| 2010/0122196 A1* | 5/2010 | Wetzer | G06F 9/54 715/769 |
| 2010/0125797 A1* | 5/2010 | Lavi | G06F 17/30873 715/738 |
| 2010/0153862 A1* | 6/2010 | Schreiber | G06Q 30/0273 715/760 |
| 2010/0162274 A1 | 6/2010 | Gangadharappa et al. | |
| 2010/0223217 A1* | 9/2010 | Little | G06F 9/5088 706/19 |
| 2010/0268828 A1* | 10/2010 | Pahlavan | G06F 9/4445 709/227 |
| 2010/0269039 A1* | 10/2010 | Pahlavan | G06F 3/0481 715/702 |
| 2010/0269046 A1* | 10/2010 | Pahlavan | G06F 3/1462 715/740 |
| 2010/0287618 A1* | 11/2010 | Howell | G06F 9/468 726/26 |
| 2010/0293481 A1 | 11/2010 | Austin | |
| 2010/0304860 A1 | 12/2010 | Gault et al. | |
| 2010/0312829 A1* | 12/2010 | O'Connell, Jr. | G06F 17/212 709/203 |
| 2011/0055912 A1* | 3/2011 | Fusari | G06F 16/972 726/8 |
| 2011/0078678 A1 | 3/2011 | Matthews | |
| 2011/0113353 A1* | 5/2011 | Koh | G08C 17/02 709/219 |
| 2011/0126197 A1* | 5/2011 | Larsen | H04L 9/3213 718/1 |
| 2011/0131335 A1* | 6/2011 | Spaltro | G06F 9/5072 709/228 |
| 2011/0197154 A1* | 8/2011 | Corona | G06F 8/34 715/769 |
| 2011/0214075 A1 | 9/2011 | Vongphouthone et al. | |
| 2011/0231280 A1 | 9/2011 | Farah | |
| 2011/0252304 A1 | 10/2011 | Lemonik et al. | |
| 2011/0258049 A1* | 10/2011 | Ramer | G06F 17/30867 705/14.66 |
| 2011/0314389 A1* | 12/2011 | Meredith | G06F 8/61 709/201 |
| 2011/0320224 A1* | 12/2011 | Sen | G06Q 10/103 705/4 |
| 2012/0005345 A1* | 1/2012 | Doyle | G06F 9/5066 709/226 |
| 2012/0047442 A1* | 2/2012 | Nicolaou | G06F 16/972 715/738 |
| 2012/0075469 A1* | 3/2012 | Oskin | G08B 13/19656 348/143 |
| 2012/0095878 A1* | 4/2012 | Feldman | G06Q 30/0641 705/27.1 |
| 2012/0096365 A1* | 4/2012 | Wilkinson | G06F 9/468 715/740 |
| 2012/0102433 A1* | 4/2012 | Falkenburg | G06F 8/61 715/835 |
| 2012/0110129 A1* | 5/2012 | Ronco | H04L 67/02 709/219 |
| 2012/0144034 A1* | 6/2012 | McCarty | H04L 63/0815 709/225 |
| 2012/0158823 A1* | 6/2012 | Ahuja | G06F 9/54 709/203 |
| 2012/0179732 A1* | 7/2012 | Caso | G06F 16/134 707/827 |
| 2012/0191227 A1* | 7/2012 | Bokelberg | G06Q 10/06311 700/91 |
| 2012/0198457 A1* | 8/2012 | Leonelli | G06Q 10/06 718/102 |
| 2012/0254720 A1* | 10/2012 | Hamm | G06F 16/957 715/234 |
| 2012/0278844 A1* | 11/2012 | Curtis | H04N 21/4147 725/93 |
| 2012/0297288 A1* | 11/2012 | Mansouri | G06F 17/30893 715/234 |
| 2013/0007216 A1* | 1/2013 | Fries | H04L 67/34 709/218 |
| 2013/0124807 A1* | 5/2013 | Nielsen | G06F 11/1482 711/E12.103 |
| 2013/0132854 A1* | 5/2013 | Raleigh | G06F 3/0482 715/738 |
| 2013/0227153 A1* | 8/2013 | Zurmuehl | G06F 9/5055 709/228 |
| 2013/0304797 A1* | 11/2013 | Warren | G06Q 40/02 709/203 |
| 2013/0332825 A1* | 12/2013 | Singh | H04H 60/72 715/273 |
| 2014/0082586 A1* | 3/2014 | Casey | G06F 8/20 717/104 |
| 2014/0122999 A1* | 5/2014 | Falkenberg | G06F 9/451 715/234 |
| 2014/0123020 A1* | 5/2014 | Bleier | G06F 8/38 715/746 |
| 2014/0156363 A1* | 6/2014 | Hsu | G06Q 30/0241 705/14.4 |
| 2014/0337404 A1* | 11/2014 | Jitkoff | G06F 16/9562 709/203 |
| 2015/0161384 A1* | 6/2015 | Gu | H04L 63/1433 726/22 |
| 2015/0205588 A1* | 7/2015 | Bates | G06F 9/4552 717/145 |
| 2015/0278388 A1* | 10/2015 | Markov | G06F 3/04842 715/744 |
| 2016/0041823 A1* | 2/2016 | Ben-Yair | G06F 8/72 717/111 |
| 2017/0272349 A1* | 9/2017 | Hopkins | H04L 43/0817 |

OTHER PUBLICATIONS

Taivalsaari, "Web Browser as an Application Platform," Sun Microsystems Laboratories, available at: http://research.sun.com/projects/lively (Nov. 27, 2007).

(56) References Cited

OTHER PUBLICATIONS

Wikipedia contributors; "Tampermonkeyr"; Wikipedia, The Free Encyclopedia; Apr. 20, 2023, Retrieved from https://en.wikipedia.org/wiki/Tampermonkey on May 8, 2023; 2 pgs.

\* cited by examiner

BROWSER-BASED APPLICATION MANAGEMENT

CROSS-REFERENCE TO RELATED APPLICATIONS

The present application claims the benefit of U.S. Provisional Application No. 61/762,673, filed Feb. 8, 2013, the complete disclosure of which is incorporated by reference herein in its entirety.

FIELD OF THE INVENTION

The present application relates to systems and methods for managing software applications.

BACKGROUND

Computer users typically utilize numerous software applications. This may include applications stored on the user's local hard drive, enterprise software applications stored on a networked server, and web applications accessed via the user's browser over the Internet. In many cases, users have to switch between numerous applications over the course of their day or even to perform a single task.

For example, a user may visit a financial web site to retrieve information regarding a potential investment. Next, the user may access a contact management application to retrieve information regarding customers to contact regarding the potential investment, and then access an email application to send a message to the customer. Finally, the user may access a sales management application to input the sale to the customer.

In order to address the inefficiencies of having to switch between numerous applications to perform daily tasks, some companies have developed client relationship management (CRM) applications that integrate multiple functions into a single software application. This CRM application may be hosted on a central server that can be accessed by users via a standard browser application. While this can help to reduce the fragmented nature of the user's computing experience, it locks the user into using the functions provided by that CRM application.

Accordingly, it would be desirable improve the experience of computer users when utilizing multiple software applications, particularly those from different vendors and running on different operating systems.

SUMMARY

In accordance with embodiments of the present invention, systems and methods are provided for managing multiple software applications. A browser-based application interface portal provides users a single, unified portal for accessing software applications running on different operating systems, hosted servers, and third party servers, as well as web applications (both hosted and external). The executed applications may then be integrated into the portal. The data retrieved from external web applications may be filtered, reformatted, and restyled with code that may be executed on a user's device to provide only the information of interest to the user and to provide a more consistent interface for the information. One way in which this is accomplished is by integrating the menu structures from those applications into the menu structure of the browser-based interface. Hosted software applications may be presented to the user within a window in the portal without need to display or interact with the underlying operating system hosting the application.

In accordance with other embodiments, systems and methods are provided for creating and executing computing workflows. A visual editor enables drag-and-drop integration of various cross-platform applications and web information into the workflows, which can then be deployed across the enterprise for execution by multiple users. Text, audio, and/or video documentation may be incorporated into the workflow to provide instructions to users as they progress through execution of the workflow.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
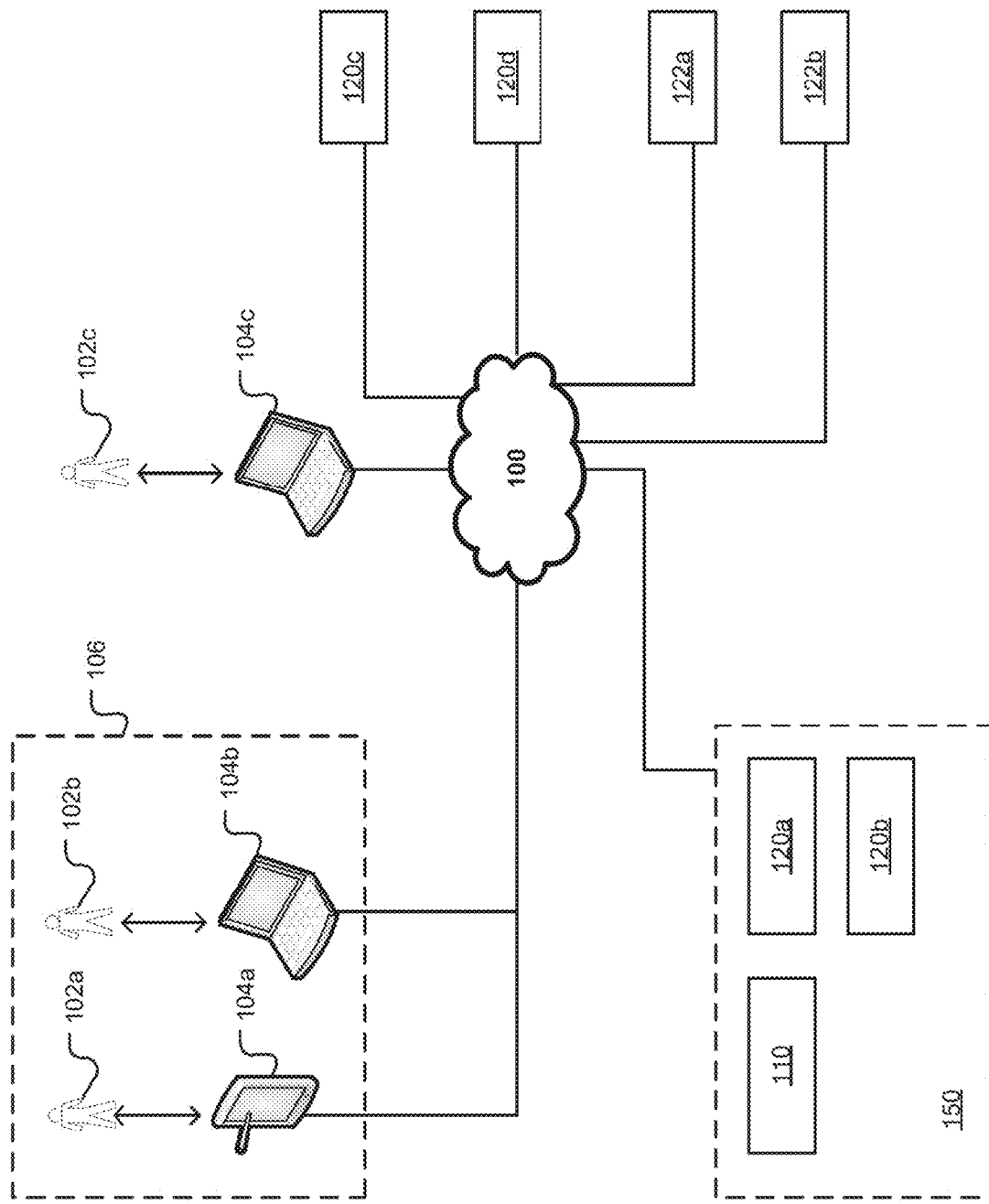
FIG. 1 is an exemplary block diagram of an environment in which embodiments of the present invention may be implemented.

FIG. 1 is an exemplary block diagram of an environment in which embodiments of the present invention may be implemented. Users 102a-102c can access the application portal via Internet 100 using browser applications running on computing devices 104a-104c. Some users 102a-102b may be located at a company site 106 and may access the application portal via a company intranet, and other users 102c may access the application portal remotely from any location. The computing devices 104a-104c may be any type of computing system, such as desktop personal computer, laptop personal computer, tablet, smartphone, mainframe computer, or other computing device providing a display and user interface for accessing the Internet. The computing devices 104a-104c may run an operating system such as, for example, the Windows operating system by Microsoft Corporation of Redmond, Wash., Mac OS by Apple Inc. of Cupertino, Calif., Android by Google Inc. of Mountain View, Calif., UNIX, Linux, or any other operating system.

The application portal may be hosted on a portal server 110 at a data center 150, The application portal can enable users 102a-102c to access software applications hosted on a plurality of servers 120a-120d, including servers 120a-120b hosted at the same data center 150 as the portal server 110, or on servers 120c-120d hosted by third parties. The servers 120a-120d may run different software applications on different operating systems. In addition, the application portal may enable users 102a-102c to access information provided by third party web servers 122a-122b, such as third party social media websites.

Figure 2A:
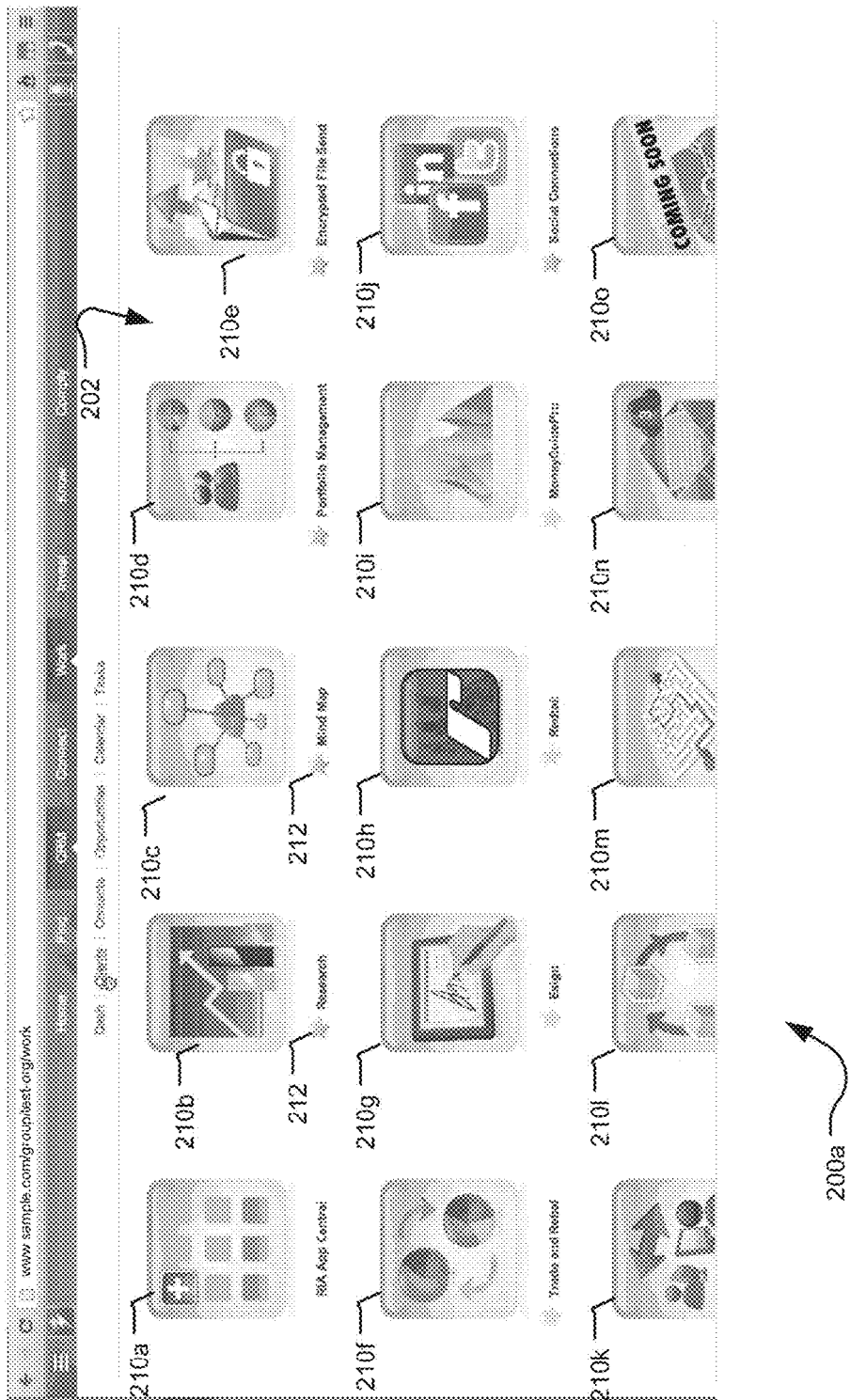
FIGS. 2A-2B illustrate application interface portals that may be accessed by users, in accordance with embodiments of the present invention.
Figure 2B:
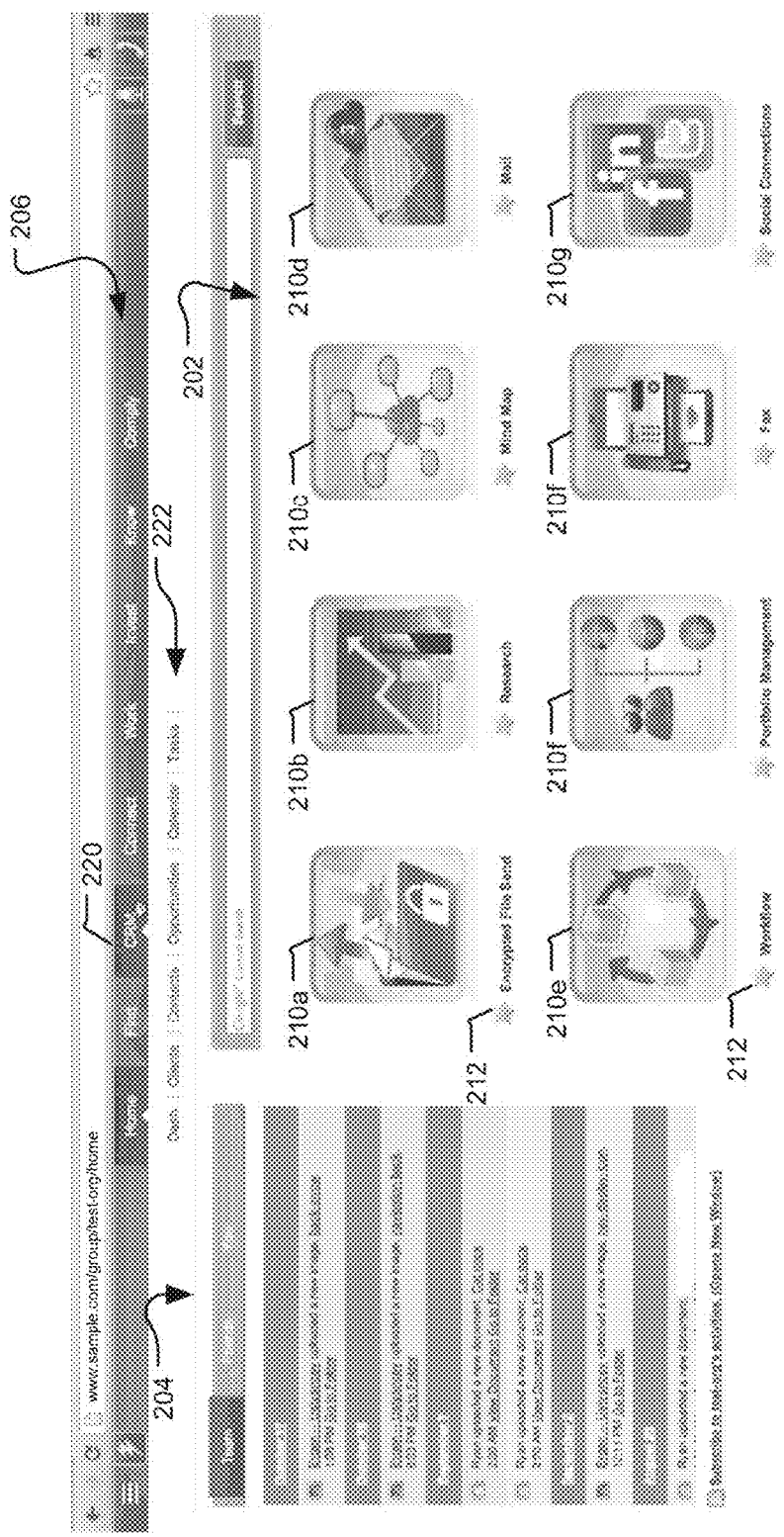

FIGS. 2A-2B illustrates application interface portals 200a-200b that may be accessed by users 102a-102c, in accordance with embodiments of the present invention. The application interface portal 200 is generated by the portal server 110 and can be accessed using a browser application on one of the user's computing devices 104a-104c. In the example illustrated in FIG. 2A, the interface portal 200a includes an icon section 202, which includes a plurality of icons 210a-210o, which can represent desktop software applications, enterprise software applications, hosted web applications, third party web applications and workflows. It is to be understood that an icon may represent a portion of an application, such as a module of an application. In some embodiments, an icon may comprise a hyperlink. In some embodiments, an icon may represent a workflow, a web page, web content, knowledge base content, and the like. In some embodiments, when an icon is selected by a user, the applicable application or module may be displayed to the user. This display may occur after the user is automatically authenticated by a third party authentication system, as discussed below. This display may also occur after automatic processes occur with respect to the application or module, such as restyling. Such automatic authentication and automatic processing may be hidden from a user, as the user need only select the application to be launched in order to interact with the application. Accordingly, a user may launch a variety of applications from the application interface portal 200.

Figure 10:
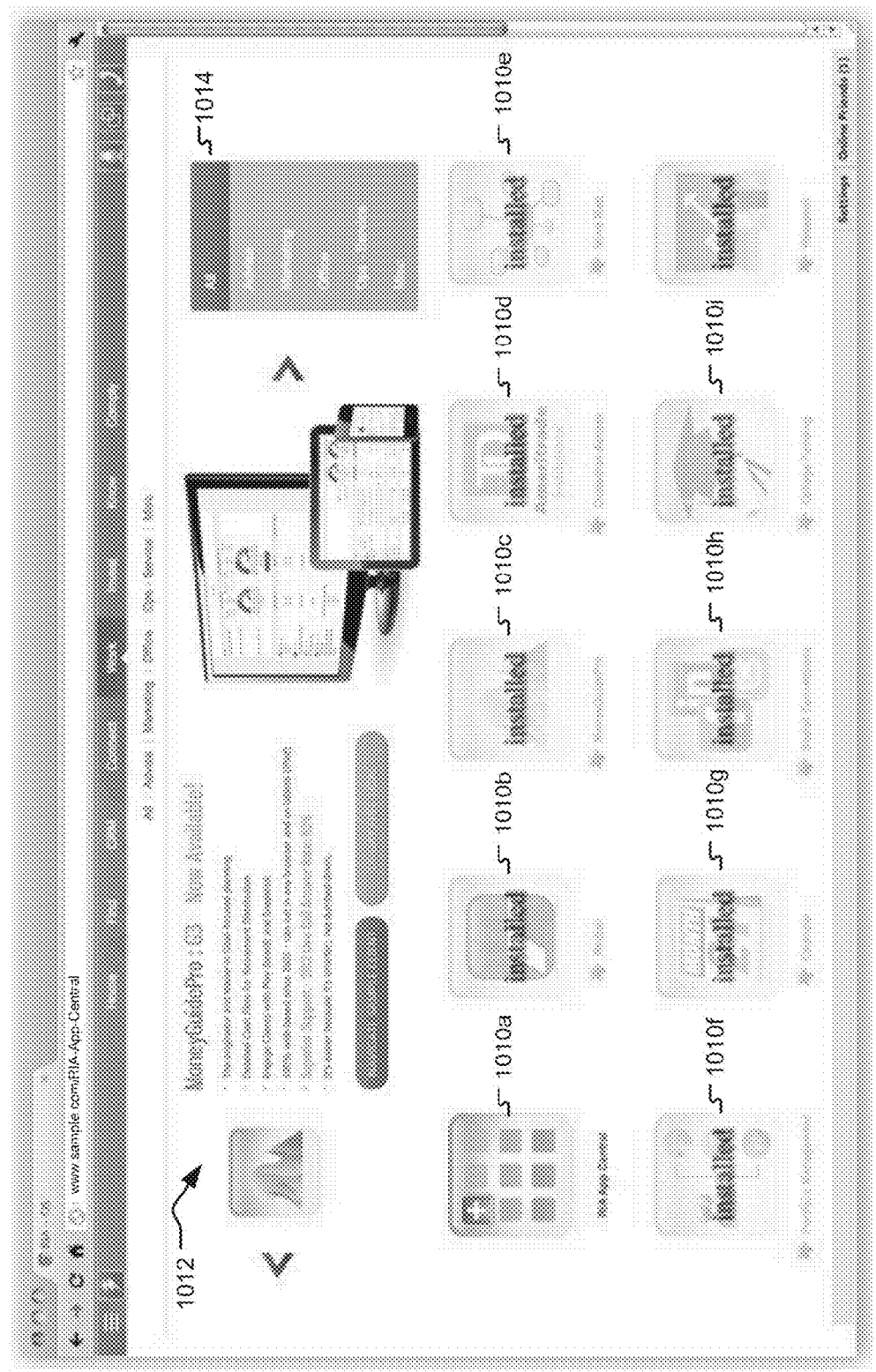
FIG. 10 illustrates an application management portal that may be utilized to select the applications that are displayed in the user's default Home application interface portal, in accordance with embodiments of the present invention.

FIG. 2B illustrates a second application interface portal 200b that may be utilized. In FIG. 2A, the application interface portal 200b includes only those icons that have been identified as "favorites," as indicated by the stars 212. Such may be considered a view of the icons identified as favorites. It is to be understood that other views may be selected by a user such as a view by type, for example Applications, Services, Workflow, and the like. Furthermore, a view may be based on a category, such as Advice, Marketing, Office, Operations, Miscellaneous, and the like. For example, the dialog box 1014 of FIG. 10 illustrates a type of All in which a user may select an appropriate category with which a view of icons associated with that category may be displayed.

In contrast, the application interface portal 200a is configured to include all of the icons available for use by the user. The interface portal 200b may also be configured to include additional modules, such as an activity module 204. In this example, the activity module 204 retrieves and displays selected types of information from various applications, such as a calendaring program, task manager, social media application, and others. In some implementations, the user may be able to choose between viewing all of the icons in application interface portal 200a or choose application interface portal 200b to view a main dashboard with only "favorited" icons and modules. This can be implemented by delivering the application interface portal 200a as the default Home page for the user, and delivering application interface portal 200b if the user selects the "Dash" option in submenu 222, as described in greater detail below.

The interface portals 200a-200b may also include a menu bar 206, which provides links and pull down menus for retrieving different types of information or performing different types of tasks. In some embodiments, the menu bar 206 may provide direct access to specific web pages in various web applications. For example, hovering over the "CRM" link 220 will cause the interface portal 200 to display a submenu 222, which includes a series of links associated with the "CRM" category: "Dash", "Clients", "Contacts", "Opportunities", "Calendar", and "Tasks". Each of these links corresponds to pages within the third party CRM web application. It is to be understood that in some embodiments, such links may be understood as modules that may be represented by icons, as discussed below. Furthermore, it is to be understood that such links may correspond to web pages that are typically accessible after a user passes through a third party authentication system. The interface portal 200 may satisfy the authentication requirements of the third party authentication system prior to display of the module to the user. If the user were to access the CRM web application directly instead of going through the interface portal 200, the user could navigate to each of these pages via the standard CRM web application interface. However, as shown in FIG. 2B, the menu bar 206 integrates the third party CRM web application into the submenu 222 to provide a cohesive menu structure within the interface portal 200b that permits users to navigate directly to the page of interest, rather than navigate through multiple pages in the native third party CRM web application. Similarly, the other links in the menu bar 206 can provide access to submenu links that correspond with pages within other web applications. The integration of multiple web applications into the menu structure can provide a more cohesive and easily navigatable interface for the user.

Figure 3A:
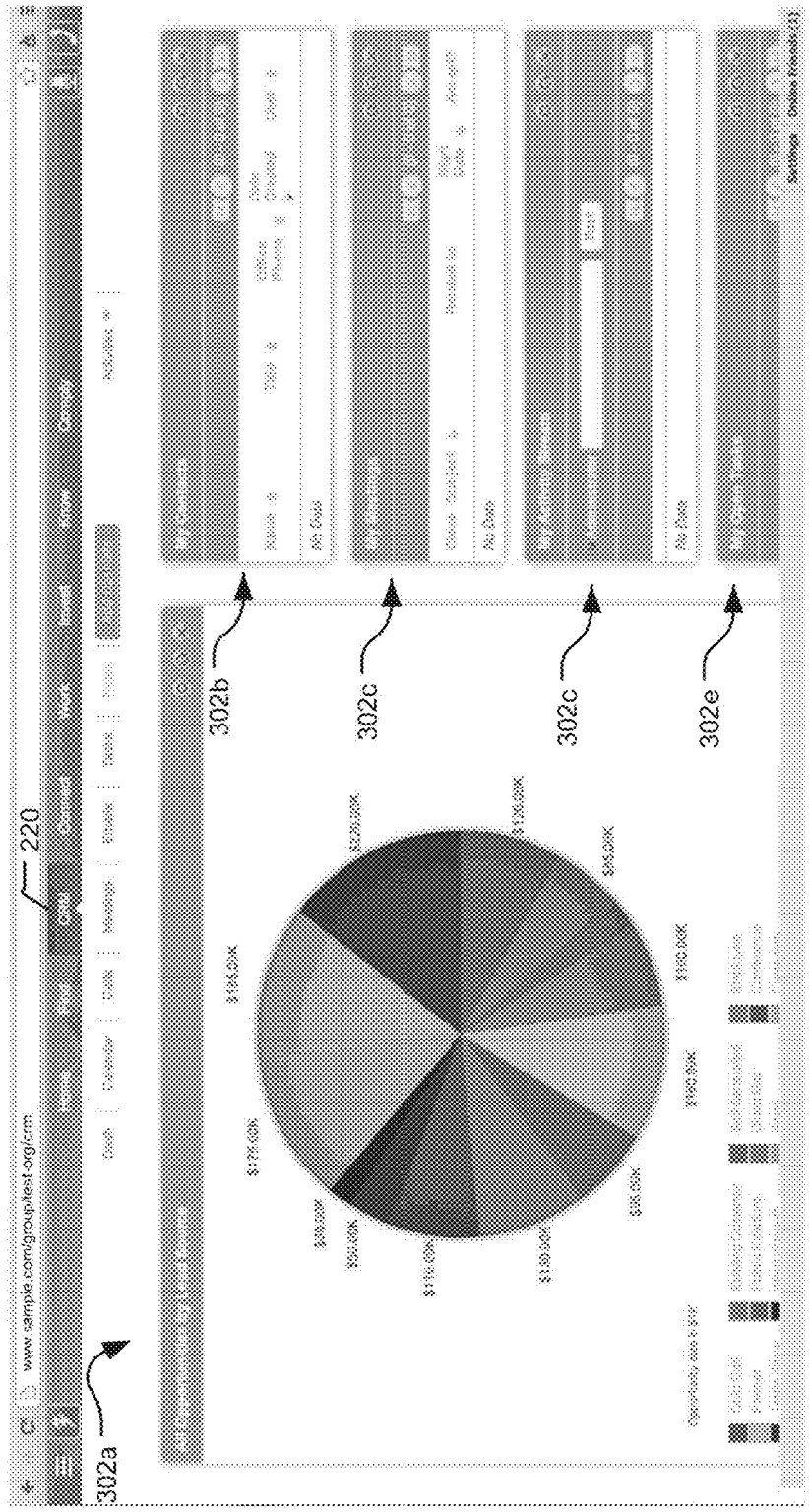
FIGS. 3A-3B illustrate additional application interface portals that may be accessed by users, in accordance with embodiments of the present invention.

FIG. 3A illustrates a CRM portal 300 that may be accessed by a user by selecting the CRM menu link 220. This changes the interface portal viewed by the user to provide various preselected modules containing information retrieved from one or more software or web applications. In the illustrated example, the CRM portal 300 provides access to various CRM modules 302a-302e (e.g., graphic 302a, contact list 302b, appointment list 302c, activity stream 302d, and task list 302e) that are part of the third party CRM web application. For some embodiments, a module may be a visual representation of a subcomponent or a subset of an application. The user may interact with that visual representation in order to utilize that subcomponent or subset of the application. For example, a module may be a web page or a portion of a web page that is a child page of a web application's home page and that can, for example, be retrieved with deep linking. For further example, in a CRM system the modules may be Contacts, Calendar or Settings. It is to be understood that the scope of a subcomponent or a subset of an application may increase or decrease for the same user or for different users, based on a user's reasons for interacting with the application. A web application or a module may be restyled to conform to the interface theme for the system or conform to the user's reasons or context for accessing an application or a module of the application. For example, if an application under normal direct use displays a screen of multiple fields, but the user need only update one field, then just that field may be displayed to the user and the rest of the fields may be hidden. In some embodiments, a variety of applications and corresponding modules may be displayed to a user with one or more of the modules being restyled to meet the needs of a user, which may increase the ease of use for a user accessing a plurality of disparate applications. In other embodiments, the retrieved information may come from different third party applications and may include only selected information of interest to the user from each of those applications, for example as illustrated by the activity module 204 of FIG. 2B. Retrieving only the most pertinent information from multiple applications and presenting the information in a single portal can reduce the burden on a user to separately log into each application, thereby improving the user's efficiency in performing his or her job, for example, as the user moves from one application or module of an application to another across different web domains.

An icon may be a visual representation of a module that is a deep link into an application regardless of an application's own authentication system's support of deep linking functionality. The module indicated by a deep link may be behind a third party authentication system. The deep linking methodology may occur regardless of whether the third party authentication system provides for or precludes such deep linking. In some embodiments, as discussed further below, a third party authentication system may require static variables and/or dynamic variables. In some embodiments, a user may have predetermined static variables, such as user names and passwords. Static and dynamic variables may be supplied to the third party authentication system without user involvement other than, for example, a user responding to a prompt to access an application or a module behind the third party authentication system. Such static and/or dynamic variables may be supplied to the authentication system utilizing code on a user device that may simulate a user's interaction with the authentication system, and may simulate other system variables that may be required by the authentication system. Accordingly, a user may easily access an application or a module that is hidden behind a third party authentication system or gateway, such as through a user clicking an icon.

In some embodiments, actions may be automatically executed by code as part of the deep linking methodology. Accordingly, processes may be executed prior to or during the display of an application to a user. For example, buttons may be automatically clicked and fields may be automatically populated, and the like. It is to be understood that the automatic actions may be dependent on the context of the current use of an application by the user. This code may be executed on the user's computing device, on one or more remote server computing device, or a combination of the user's computing device and remote computing devices.

Figure 3B:
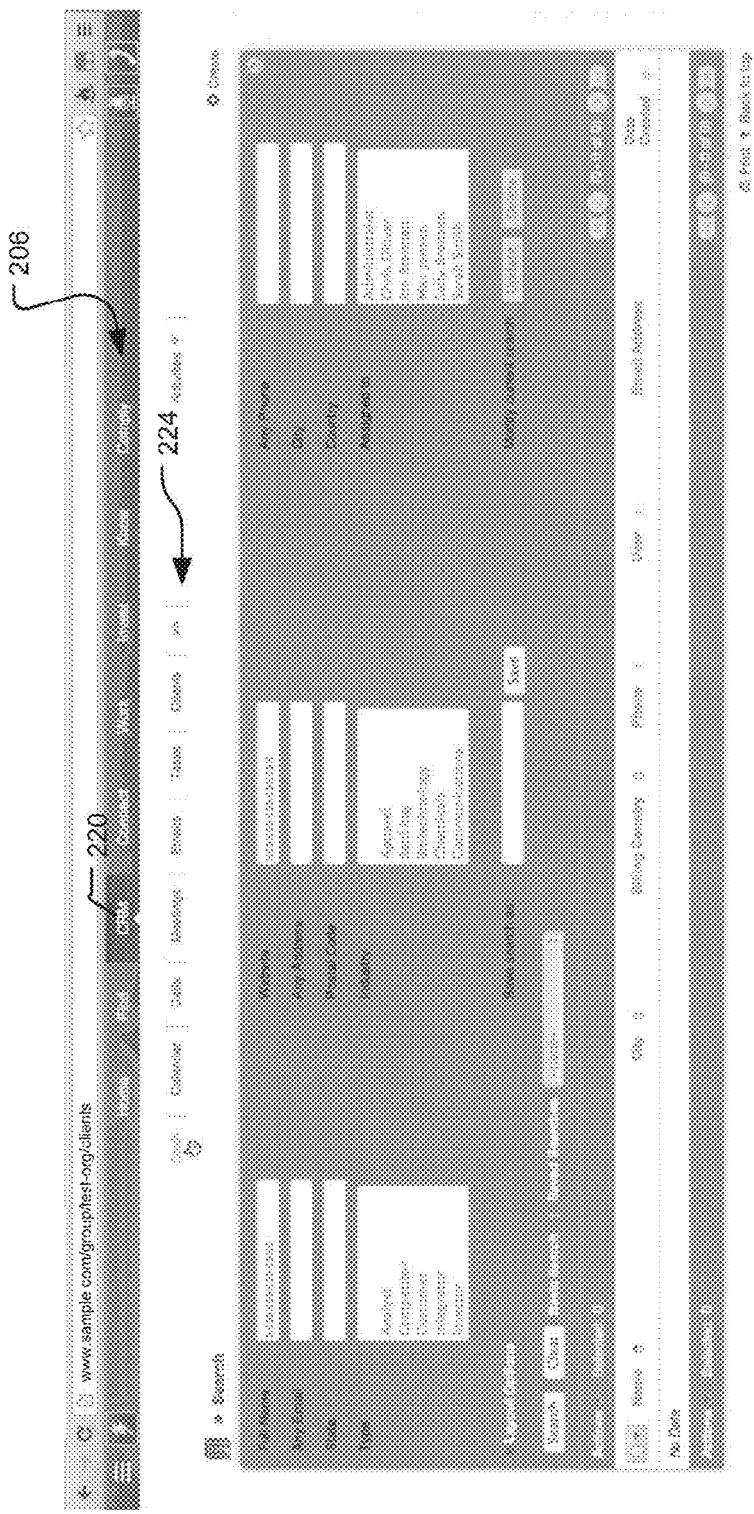

FIG. 3B illustrates a CRM portal 300' in which the submenu 222 is replaced with an application submenu 224. In this embodiment, if a user clicks on CRM link 220, the third party CRM application is launched and displayed in the application interface portal. After the CRM application is launched by clicking on link 220, the submenu 222 which had previously been displayed when hovering over link 220 is replaced with application submenu 224. The application submenu 224 includes links that would normally be provided when viewing the CRM portal 300' in the native third party CRM web application, but instead of being provided in the native menu structure, the links are provided in the application submenu 224 using a consistent interface theme with the submenu 222.

The restyling and reconfiguration of the submenus described above with respect to FIGS. 3A-3B can advantageously provide a more consistent user experience by presenting the information from multiple third party applications as if they were all a seamless part of the portal system. The portal system may also make the user's navigation to and through the submenu applications more efficient. For example, as shown in FIG. 2B, when the user is viewing the application portal 200b and has not yet launched an application, the submenu 222 provides direct links to subcomponents within the CRM application. After the user has launched the CRM application, as shown in FIG. 3B, the submenu under the CRM link 220 changes to provide the navigation links normally available when running the native CRM web application, but restyled to be integrated into the portal's submenu structure and style.

Figure 4:
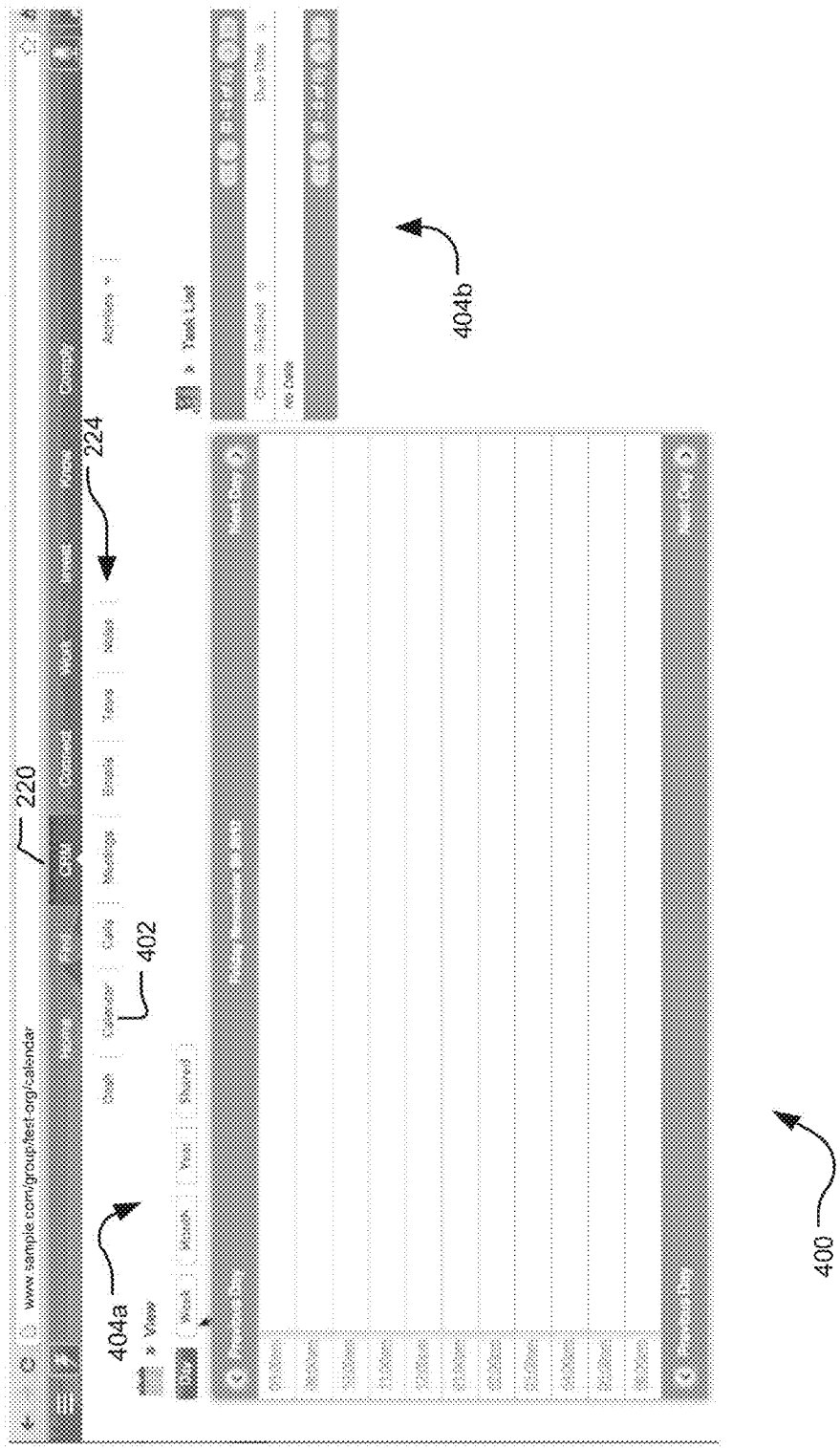
FIG. 4 shows a calendar portal that may be accessed by users, in accordance with embodiments of the present invention.

FIG. 4 shows a calendar portal 400 that may be accessed by a user by selecting the Calendar sub-menu link 402 under the CRM menu link 220. This portal 400 displays a different set of modules 404a-404b more narrowly directed to calendaring issues. Here, a daily calendar module 404a and a task list 404b are shown. As in FIG. 3B, the application submenu 224 provides the same links that would be provided in the native CRM web application, but restyled to maintain the interface theme. In some embodiments, an application or a module may be restyled. In the illustrated embodiment, the task list 404b is a restyled display of a task module, in which a portion of the native task module is displayed to the user. Furthermore, in some embodiments, an interface control of a module or application, such as a button, may be displayed, while other portions of the native user interface may not be displayed. Alternatively, interface controls may be repositioned on a user interface. For example, a button displayed at the bottom of a module in a native application, may be moved to the top of the module with restyling. For further example, restyling allows a button to be placed anywhere within the display of an application or module. Accordingly, under some embodiments, content of interest may be selectively displayed to the user.

Content of interest that may be displayed to a user may come from a variety of sources that are owned or controlled by external entities or organizations. Furthermore, sources may be across domains, and the like. Furthermore, sources may comprise applications, websites, web content, and the like. It is to be understood that the portal server 110 may have no control of the source of the content to be displayed. Furthermore, it is to be understood that a user may interact with content of interest that is restyled, in which the manner of interaction is similar or equivalent to such interaction when the content is displayed in a native format. For example, if a user may edit a field within a native application, the user may also edit the field when it is restyled. Such may be advantageous because multiple fields from a plurality of sources may be displayed to a user and edited by the user, for example, on one screen. Such may also be advantageous because the user may not need to access each source on a separate screen in order to interact with content of interest.

Under one embodiment, restyling may improve aesthetics. For example, if each native source of data has a unique display of a "close" button, the reformatting may provide for the same consistent "close" button across all the sources. Such may provide for a consistent user interface for a user across diverse applications, domains, operating systems, websites, and the like. It is to be understood that restyling may also improve the usability of the sources. A source may provide functionality to meet the needs of a broad spectrum of users, but a single user may only desire to access portions of the functionality. Although a user may be unable to control the source of the content natively, restyling may allow for control of the content from the source, for example, based on a user's context. For example, a user may need to access two fields from one source, one field from a second source, and three fields from a third source. Based on this context, these six fields may be displayed to the user at the same time, without showing other fields from the sources that are not of interest to the user. Such selective display of information from a variety of sources across domains, applications, websites, and the like, may, for example, reduce the need of user training within an organization. In some embodiments, an application may be restyled with a single theme for many users, or an application may be restyled with a variety of themes for a single user depending on the user's use of an application, or any combination thereof.

In some embodiments, although the display of data may be restyled, the data is restyled on a user's device, such as a computing device 104b, without the storage of corresponding data on a portal server 110 or other servers within a data center 150. Under this embodiment, the data would be hosted by an external server, such as servers 120c-120d, and displayed to the user on device 104b without being stored in the data center 150. Under some embodiments, a portal server 110 may display data that is integrated from diverse systems and domains without storing the data on its corresponding servers 120a-120b. Accordingly, under such embodiments, while data may display on a user's device, the data does not pass through the portal server 110.

Figure 5:
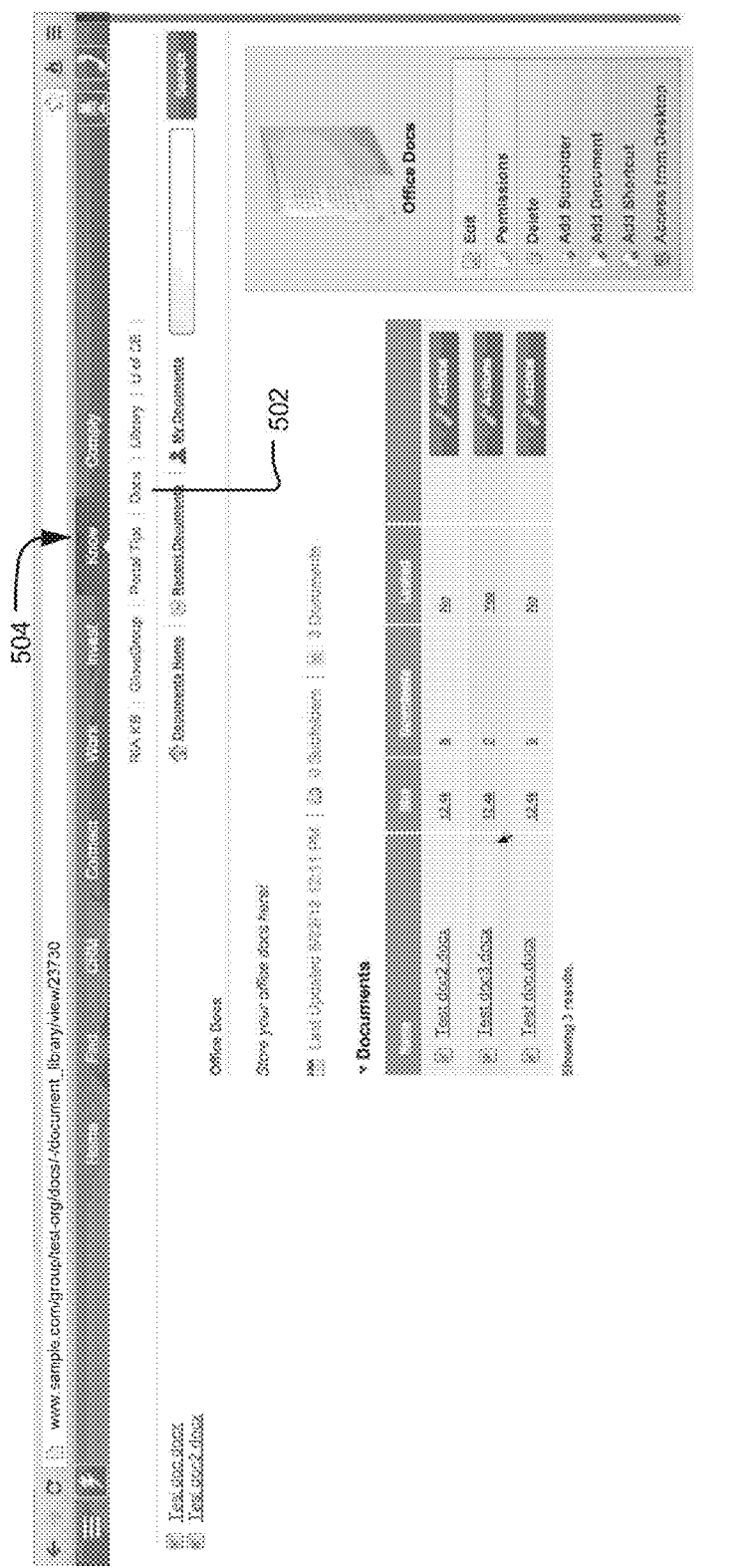
FIG. 5 shows a document management portal that may be accessed by users, in accordance with embodiments of the present invention.

FIG. 5 shows a document management portal 500 that may be accessed by a user by selecting the Docs sub-menu link 502 under the Know menu link 504. The document management portal 500 may provide users with access to documents hosted on a fileserver, document management application, or from one or more other computers.

Figure 6:
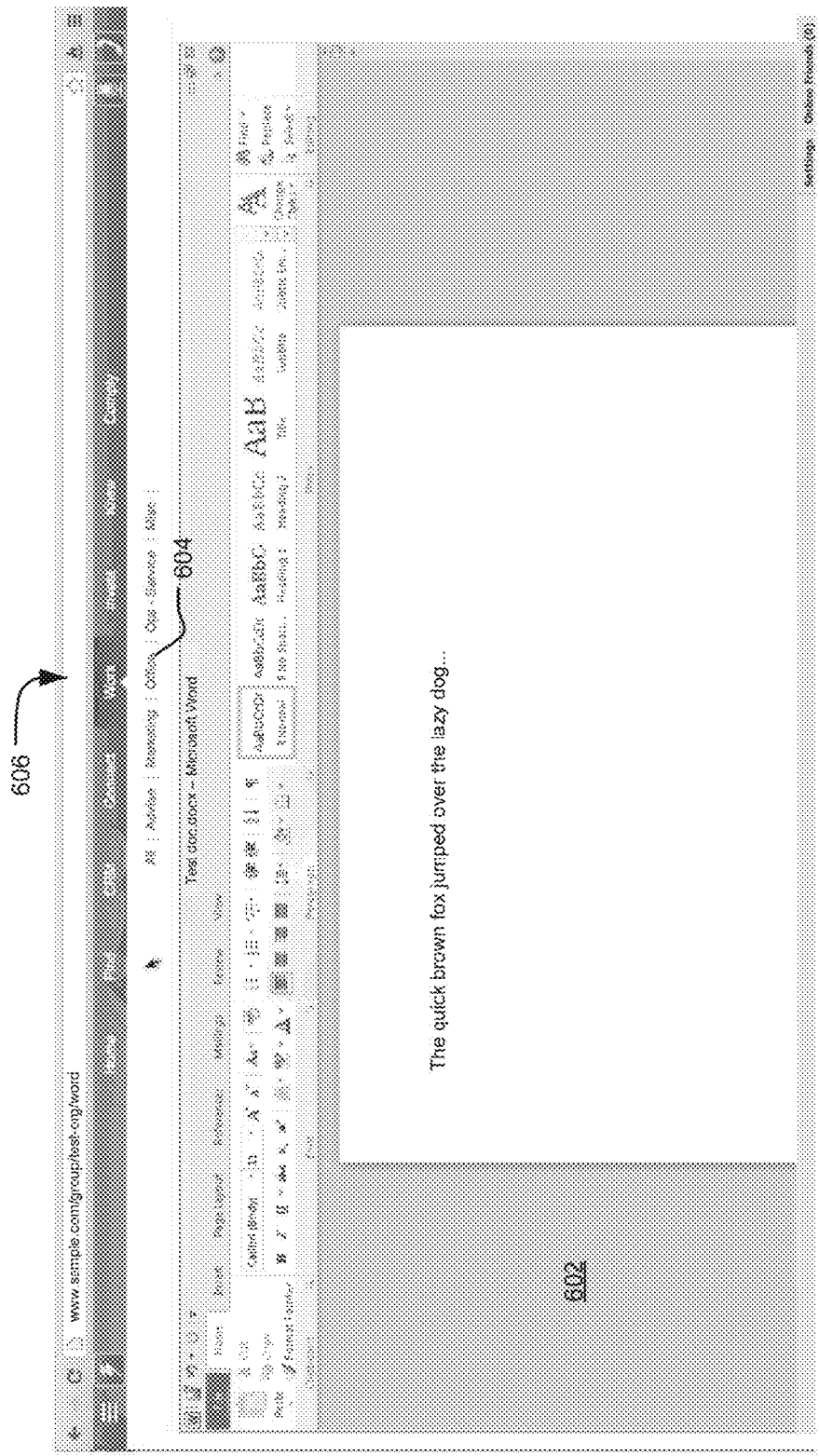
FIG. 6 shows a word processing portal that may be accessed by users, in accordance with embodiments of the present invention.

FIG. 6 shows a word processing portal 600 that may be accessed by a user by selecting the Office sub-menu link 604 under the Work menu link 606. This portal 600 includes a window displaying a word processing application 602 running on a remote device. In this example, the word processing application 602 is Microsoft Word running on a version of the Microsoft Windows operating system. The application 602 may be running, for example, on a server 120a in the user's enterprise or a third party server 120c. Because the application 602 is displayed within a web browser-based portal 600, the user may access the word processing application 602 on any type of computing device, regardless of the device's operating system. In addition, because the application 602 is provided within the portal 600, the user need not switch between multiple software applications on the user's computing device in order to perform the desired tasks. In addition, the application 602 may be delivered to the user in a dedicated window that provides only access to the word processing application 602, and not the underlying desktop of the operating system running the word processing application 602. This can simplify the user's experience in accessing desired applications without requiring interaction with or training on the underlying operating system. The documents created or edited using the word processing application 602 can be saved to a server and displayed via the document management portal 500, as described above, or may be saved to the user's local hard drive.

In the example above, a word processing software application 602 is provided to the user via the browser-based portal. In other embodiments, the system may provide access to other types of software applications via the browser-based portal. For example, the system may provide access to a software application that is traditionally run from a user's desktop personal computer, such as a spreadsheet application, drawing application, or any other software application configured to run on a conventional operating system, such as Microsoft Windows, Apple Mac OS, LINUX, or UNIX. The software application and underlying operating system may be executed, for example, on a virtualized server 120, with the interface for that application being delivered to the user via the browser-based portal. This can be enabled using, for example, third party remote desktop tools.

Figure 7A:
FIGS. 7A-7C show methods of organizing icons in accordance with embodiments of the present invention.
Figure 7B:
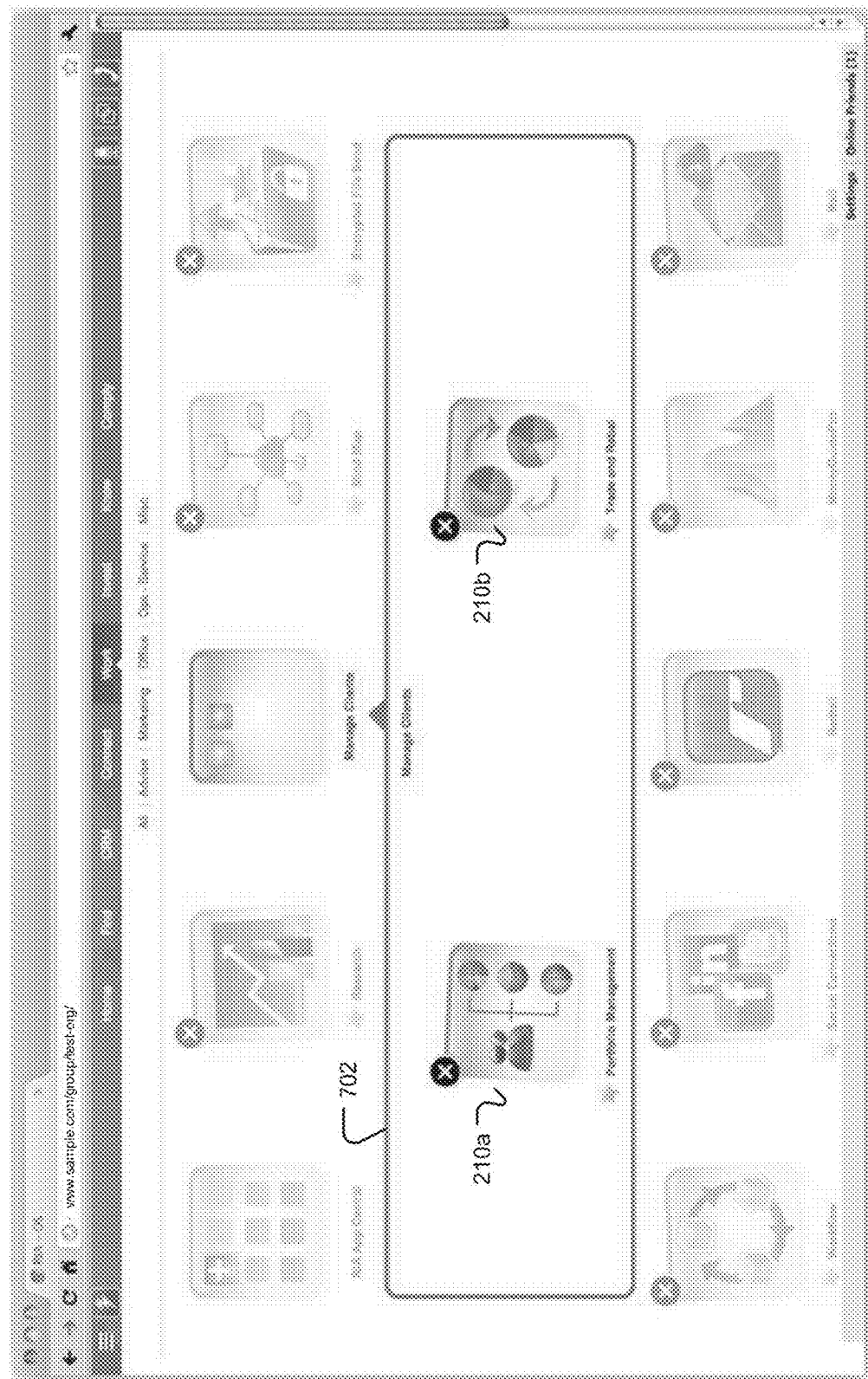
Figure 7C:
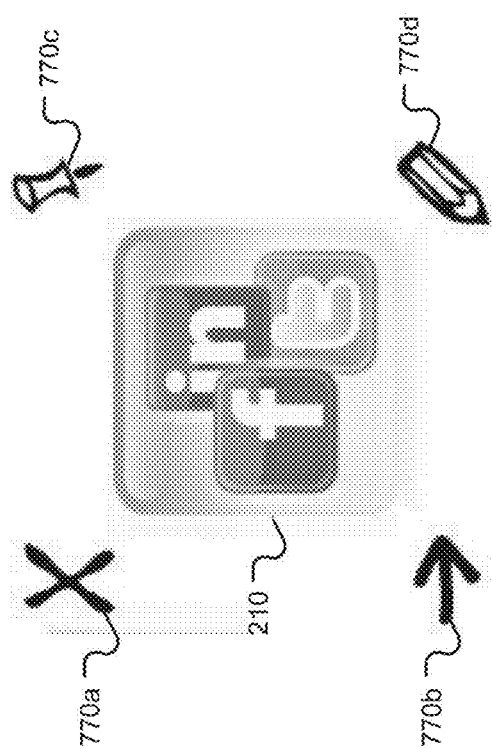

FIGS. 7A-7C show methods of organizing icons in accordance with embodiments of the present invention. FIG. 7A shows another application portal 700 displaying a plurality of icons 210. If a user selects one of the icons 210*a*, then drags and drops it onto another icon 210*b*, a folder creation window 702 appears. Using this folder creation window 702, a user may combine multiple application icons 210 into a single folder to be accessed via the application portal 700, as shown in FIG. 7B. In some embodiments, the dragging and dropping of icons onto other icons may also be used to initiate the creation of a new workflow, as described in more detail below. In these embodiments, when a user performs a drag and drop of a first icon onto a second icon, the system may prompt the user to select whether the user desires to create a new folder or a new workflow.

The icons 210*a*-210*o* displayed in the application interface portals (e.g., 200, 700) may be implemented in a variety of ways. For example, the icons 210 may be images that, when selected by the user, provide links to predefined web pages that are hosted on the portal server 110. In conventional hyperlinks used in web browsers for navigating web pages, the links are implemented as static text associated with a URL destination anchor. In accordance with embodiments of the present invention, the URL destination anchor is hidden from the user, so that the user's interaction with the icons 210 is more similar to the launching of an application by double-clicking on an icon in a conventional graphical user interface operating system. However, instead of launching an executable file on the user's computer, the icons 210 redirect the user's browser to a hidden web page containing the application associated with the selected icon. This application may be preinstalled on a remote server and preconfigured for that user's account. In some embodiments, the application interface portal 200 may be configured such that when the user's browser is directed to the application interface portal 200, the browser URL bar may continue to display the application interface portal 200 home page URL, instead of the hidden URL destination anchor.

In accordance with embodiments of the present invention, application interface portals can enable users to manage links to web applications and software applications using icon-based images that may be rearranged and organized into folders in a more user-friendly manner than traditional web page hyperlinks. Unlike conventional web page hyperlinks, the icons described in examples herein are provided as part of interactive and GUI-based click-and-drag configurable interfaces, and launch preinstalled or preconfigured applications provided on hidden web pages or on external servers. In addition, because the destination web pages associated with each icon can be managed by a system administrator, the management of enterprise-wide applications can be more easily performed. There is no need to update files on the user's local computer when making any changes to the applications accessed via the application interface portal.

In accordance with embodiments of the present invention, the portal server 110 may include a centralized authentication application which stores user authentication information associated with any accounts or applications that the user will access via the application interface portal 200. When the user requests that an application or web content be retrieved from a third party server 120*c*-120*d* or 122*a*-122*b*, the portal server 110 can be configured to transmit login information to the third party server to authenticate the user's access to the requested application, module or content before the application, module or content is displayed. For example, the centralized authentication application may provide authentication to access an application or a module that is retrieved with deep linking, as discussed above. In some embodiments, the centralized authentication application may replicate or mimic user and/or system actions required by a third party authentication system. The centralized authentication application may store login information or authentication information such as a user name, a password, a destination login page of an application, and additional variables required by an application, such as static variables and dynamic variables. In some embodiments, static variables may be stored on a user device or at the data center 150. In some embodiments, the values of dynamic variables may generated by code executed in real-time by a user's device, such as the device 104*a*, or code executed by the portal server 110. Accordingly, providing third party authentication systems with required static and dynamic variables provides for automatic authentication by the centralized authentication application, so that the user may access the application or modules behind the third party authentication system.

In some embodiments, each user may have more than one profile comprising a set of static and dynamic variables for each third party authentication system. For example, a variety of profiles may be associated to a user to provide for different accessibility to a variety of different applications. For example, a user with higher security privileges may have a personal profile comprising static and dynamic variables that are required to access an application with the higher security privileges. That same user may also wish to access the same applications with lower security privileges. Accordingly, two sets of profiles may be associated with the user, wherein each profile comprises static and dynamic variables, and the appropriate profile is used to access an application based on the context of the user's interaction with an application behind a third party authentication system. In some embodiments, a user, such as an administrator, may view another user's access to applicable applications, modules, web pages and web content that are made available or displayed through the application interface portal. For example, an administrator may have a plurality of profiles, each representing another user. Such authentication impersonation capability may allow an administrator to view what is displayed to other users. Accordingly, an administrator may confirm or validate authentication, restyling and/or automated actions that may be conducted by the application interface portal on behalf of the impersonated user. For further example, different authentication profiles may exist for the same user based on user context such as mobile use, multitasks (described below), and screen resolution.

In some embodiments, the centralized authentication application may store information such as actions to be taken after authentication by the application, and content to be removed from the display of an application or module in order to facilitate deep linking. In some embodiments, such actions may be required in order to properly authenticate with a third party authentication system. In some embodiments, such actions may comprise executed code that enables deep linking to applications and modules behind a third party authentication system that does not natively support such deep linking.

In some embodiments, the centralized authentication application may store user authentication information for multiple users and multiple hosted applications and third party applications running on any type of operating system. Accordingly, if one of those third party applications is modified in a way that requires that the automated login process be changed to accommodate that modification, the changes can be instantly applied for all of the users. The centralized authentication application may be configured to automate user logins using multiple types of authentication methods, such as, for example, form-based authentication, basic authentication, Security Assertion Markup Language (SAML) authentication, OAuth, technology specific methods, such as those using the .NET Framework from Microsoft, or third party custom authentication methods. The authentication functionality may be provided for a plurality of users, such as all of the employees of a particular organization, department, or workgroup. Furthermore, the authentication functionality may control a variety of static and/or dynamic variables required by a specific application. By centralizing the user authentication process, the administration of multiple authentication methods across an organization can be greatly streamlined. For example, although a user may access a variety of applications and modules of applications via, for example, an application interface portal 200a, the user need only be authenticated a single time by the centralized authentication application.

In accordance with other embodiments of the present invention, the application interface portal 200 may provide a graphical interface for enabling the user to modify the interface portal to customize it for the user's preferences. For example, if the user clicks one of the icons, or, alternatively, clicks and holds one of the icons for a predetermined period of time (e.g., three seconds), the application interface portal 200 may enter into an editing mode. In this mode, the user may drag and drop icons to different positions within the interface portal so as to modify the order in which the icons are displayed in the browser window. In addition, in the editing mode, context menus may be displayed, such as an image of an "X" may be overlaid each icon. If the user selects the "X", that icon will be deleted from the application interface portal. In some embodiments, a system administrator may set permissions for each application icon that define how a user may modify the icon. For example, the user may be prohibited from deleting certain icons for essential applications. In some embodiments, when a single click of an icon displays a context menu, a second click of the icon may launch the underlying application or module. Accordingly, under this embodiment, a user may double-click the icon to launch the application or module associated with the icon. In some embodiments, after the first single click of the icon, the icon may change to a launch button with a corresponding context menu of context menu icons.

It is to be understood that an embodiment may display different context menus based on the context of the icon, such as whether an icon is an application or a workflow, or whether an icon is located in an application interface portal 200b or a workflow builder interface 800. For example, if an icon represents an application, a context menu may be displayed comprising a Help context menu icon, a Delete context menu icon, an Edit context menu icon, a Notifications context menu icon, and a Share context menu icon. For further example, if an icon represents a workflow, a context menu may be displayed comprising a Delete context menu icon, an Edit context menu icon, and a Notifications context menu icon.

FIG. 7C illustrates other options for managing icons 210 in the application interface portal. In this example, when a user clicks one of the icons or, alternatively, clicks and holds one of the icons 210, a plurality of management options 770 may appear on top of or adjacent to the icon 210. In some embodiments, a management option may be a context icon, and a plurality of management options may be a context menu. Each of these management options 770a-770d can permit the user to configure the icon or associated application or workflow in a different way. For example, if the user selects Delete option 770a, the icon will be removed from the user's portal. In some embodiments, an administrator may define whether an icon may or may not be deleted by a user or a group of users assigned a specific user role.

If the user selects Share option 770b, then the user is presented with prompts for sharing that icon with other users. This sharing may be useful, for example, if the user has created a new workflow (as described in greater detail below) and wishes to share that workflow with other users. By sharing the icon associated with that workflow, the user can send that workflow to be added to the portals for other users. This icon sharing may also be used to share web or software application icons with other users in the same organization or in external organizations. In some embodiments, sharing may be based on a specific user role, for example, a user may have a role that permits selling a workflow for a profit. In some embodiments, a store may permit selling of icons and workflows. An icon may be purchased in order to acquire a customized restyling of an application. A workflow may be purchased in order to acquire a customized interaction with a group of applications, modules, and the like, as discussed further below.

If the user selects the Pin-To-Default option 770c, the user may set the application associated with that icon 210 as one of the default applications appearing in the user's menu bar 206. When an application is selected as a default application using the Pin-To-Default option 770c, the submenus 224 in the user's portal may be reconfigured to display the sub-menu links associated with that application. For example, a user may initially have a Redtail CRM application by Redtail Technology, Inc. associated with the CRM menu link 220. When the user selects that CRM menu link 220, a first set of sub-menu links 224 for the Redtail CRM application are displayed. Exemplary sub-menu links 224 are shown in FIG. 4: Dash, Calendar, Calls, Meetings, Emails, Tasks, Notes. If the user selects a different CRM application from another vendor as the default CRM application, then the sub-menu links 224 displayed under the CRM menu link 220 are automatically updated to reflect the links available with the other CRM application. For example, if the other CRM application does not have a Calls module, there would be no Calls sub-menu link 224 displayed under the CRM menu link 220.

If the user selects the Edit option 770d, the user may edit that icon. The editing options available to the user may vary, but may include the changing of the icon image or color scheme, or modifying of a workflow associated with the icon. In some embodiments, if the Edit option 770d is associated with an application, then the user may edit the settings of that application, for example, by displaying the settings module of the application. In some embodiments, the settings to be updated in one application may be different from the settings in another application. In some embodiments, if the Edit option is associated with a workflow, then a workflow may be edited, such as by displaying a workflow builder interface 800.

In some embodiments, a Notifications option may display different notifications for different icon types, such as applications and workflows. For example, a Notifications option for an application may show the number of user notifications that are issued from the application. For further example, a Notifications option for a workflow may show the number of pending or overdue steps that a user is to complete. In some embodiments, a user may select the Notifications option in order to view the notifications.

Workflow Builder

Figure 8:
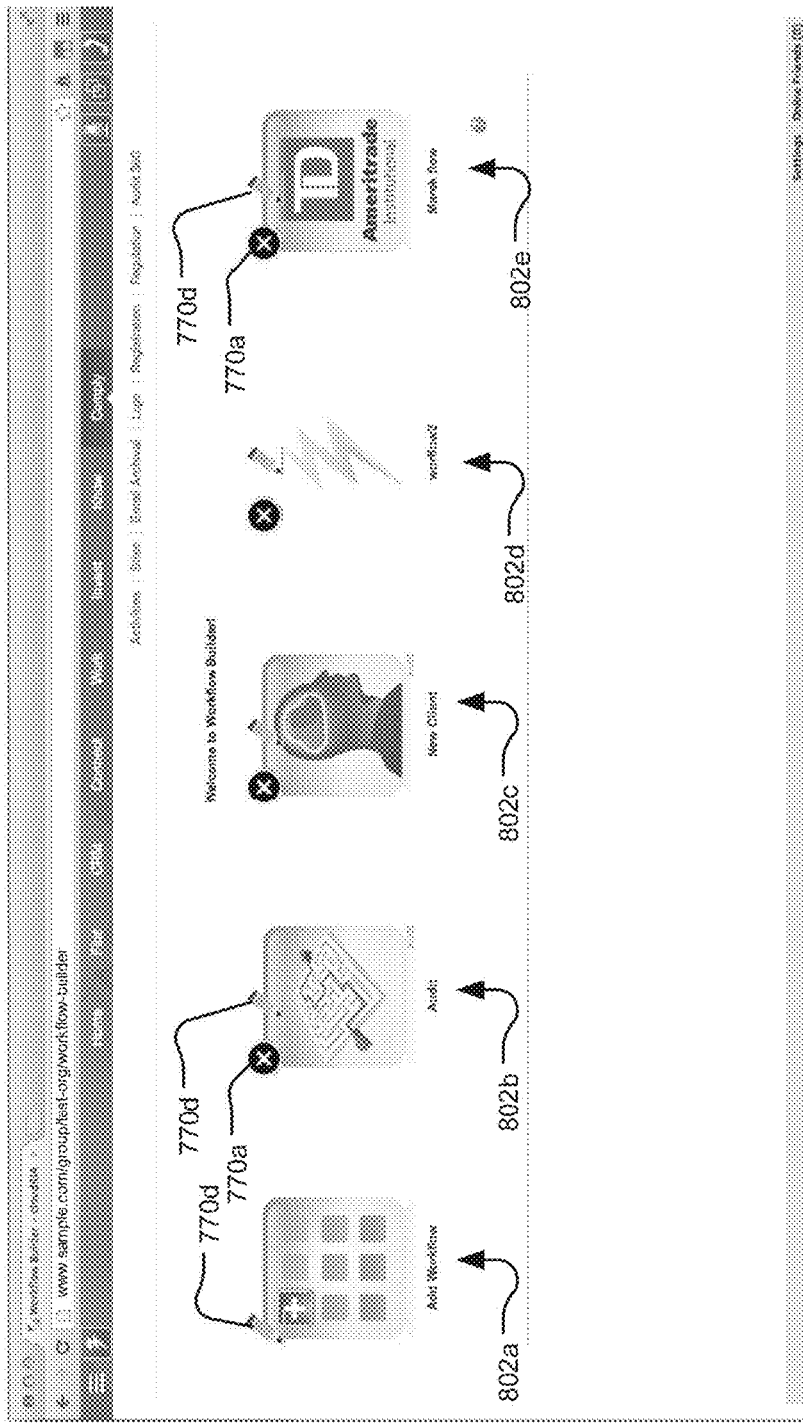
FIG. 8 displays a workflow builder interface, in accordance with embodiments of the present invention.

FIG. 8 displays a workflow builder interface 800, in accordance with embodiments of the present invention. This interface 800 may be accessed when the user clicks on "Workflow" icon 210e in FIG. 2B, or by dragging and dropping one icon onto a second icon. In the illustrated example, the interface 800 displays five icons 802: a New Workflow icon 802a that may create a new workflow and existing workflow icons 802b-802e. The user can select "Audit Workflow" icon 802b, "New Client Workflow" icon 802c, "workflow2" icon 802d, or "Marek flow" icon 802e to launch predefined workflow processes associated with each of those icons. The user may edit one of the icons by clicking the icon for that workflow or, alternatively, clicking and holding the icon for that workflow. The user may then click the Edit option 770d to edit the workflow corresponding to that icon, or click the Delete option 770a to delete the workflow corresponding to that icon. In this example, the "Add Workflow" icon 802a does not have a Delete option 770a, because the administrator has set the permissions for that icon 802a to prohibit users from deleting icon 802a from the workflow builder interface 800.

Figure 9A:
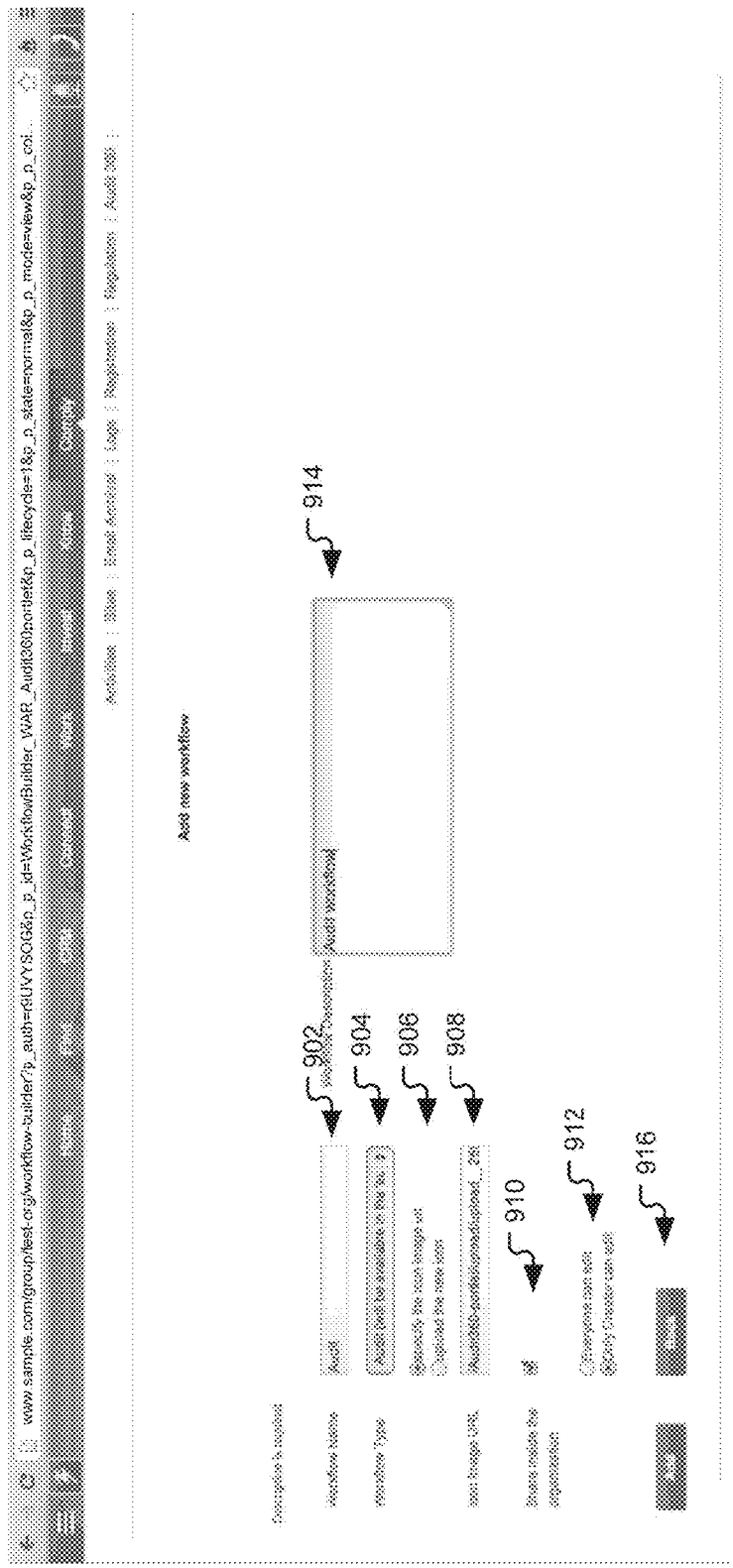
FIGS. 9A-9C illustrate workflow creation, in accordance with embodiments of the present invention.

If the user selects New Workflow icon 802a, the system will initiate a workflow creation process. FIG. 9A illustrates a workflow creation interface 900, which prompts the user for various types of inputs pertaining to the creation of a new workflow process. This interface 900 may provide a complete list of options and fields for user input, or may lead the user step-by-step through a series of prompts to provide the necessary inputs.

In the illustrated embodiment, the user is prompted to enter a name for the workflow in name field 902. Next, the user is prompted to select a workflow type from pull-down menu 904. Option buttons 906 prompt the user to select whether to select an icon to represent the new workflow from a provided list of existing images or to upload a new image for use as the icon. Field 908 prompts the user to select a URL associated with the selected image. Check box 910 prompts the user for whether the workflow will be a private workflow or will be shared inside the organization. For example, a workflow may be created by one user and then shared to other users of the organization. In some embodiments, a workflow may be distributed for purchase, such as publishing to others for a fee. Option buttons 912 prompt the user to select editing privileges for this workflow; specifically, whether the workflow being created can be edited by all users or only by the creator. A text box 914 may be provided for the user to describe the workflow. Finally, buttons 916 prompt the user to continue to the next step in the workflow creation process or to go back and change a previous entry.

Figure 9B:
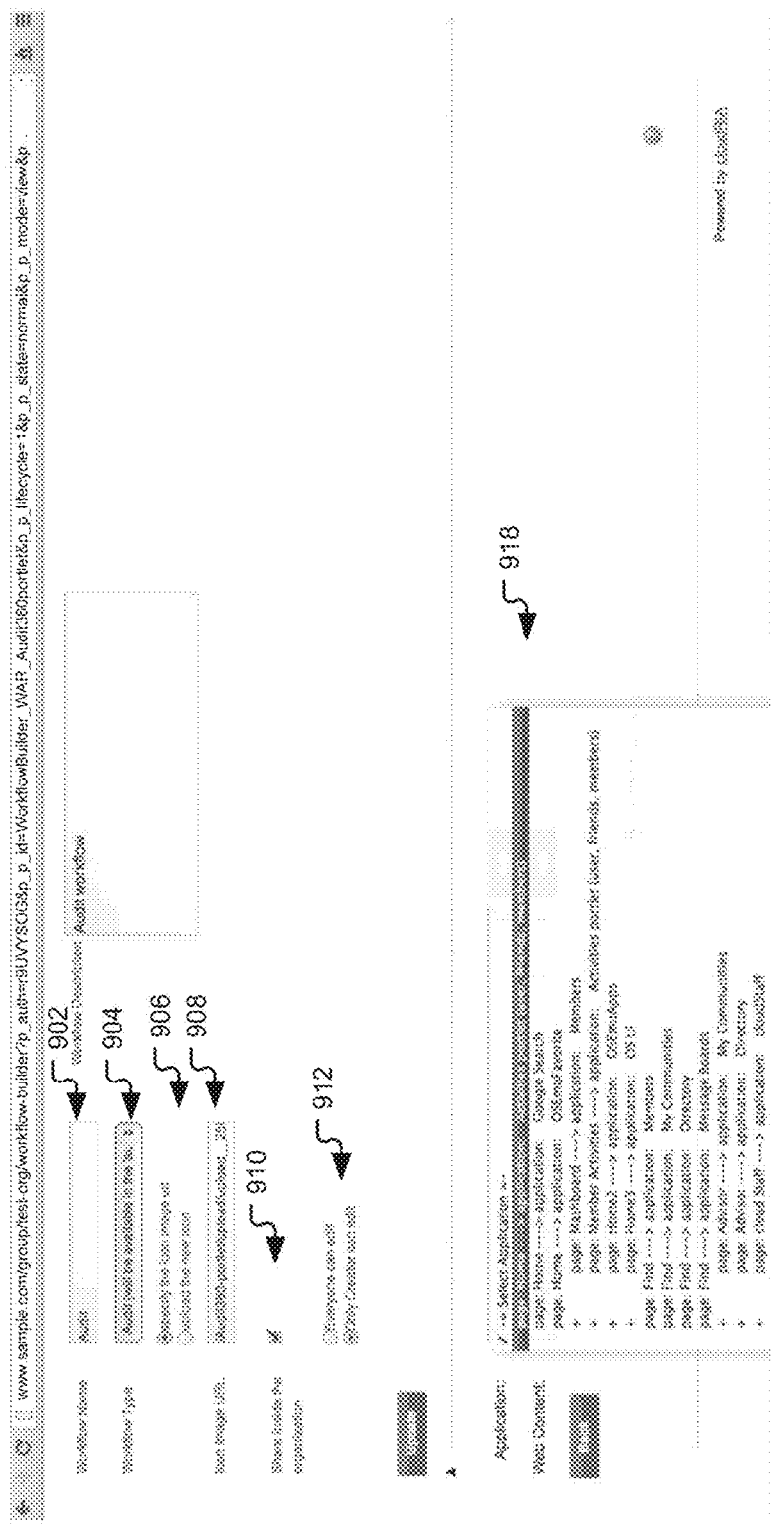

FIG. 9B illustrates a subsequent step in the workflow creation process in which the user is prompted to identify the action to be taken in the next step in the workflow. In this example, the user can utilize an application pull-down menu 918 to select one of a plurality of available software applications. When the completed workflow is initiated by a user, that selected software application will be launched within the application interface portal, similar to the way in which the word processing application 602 is launched, as described above with respect to FIG. 6.

Alternatively, the user may utilize a web content pull-down menu to select a content item that can be retrieved from a plurality of available web applications. When the completed workflow is initiated by a user, that web content item will be retrieved from the associated web application. In some cases, the web content item may be a static data set that is retrieved from the web server and presented to the user through the application interface portal. In other cases, the web content item may provide real-time access to information or services provided by the web application. In one example, a user may be required to update a newsletter on a company website and perform other tasks on a weekly basis. In yet another embodiment, the user may access a subset, subcomponent, or module of a web application as one of the workflow steps. For example, one workflow step may provide direct access to certain parts of a web application. In addition, a workflow step may retrieve and display a predetermined portion of content from a third party web page, even if the web page is not configured by the third party host to provide direct navigation to that content. For example, a workflow may require that a user access content from a particular section of a third party web page that would normally be accessed by scrolling far down the page. In this case, the workflow may be defined so as to either directly navigate to that section of the web page, or to retrieve the content from that section of the web page and display only the content of interest on the user's portal screen. This content may be reformatted or restyled to match the style of the application interface portal or in any other desired style. As a result, any module of a web application, or data point within a web application, can be made into a step of a workflow by taking the user to a particular part of an application during that step. In this case, the user can simply run a single workflow that will take the user through a series of steps to accomplish all of the tasks that the user must complete, such as taking the user to a web page where the user may edit the newsletter. The workflow may also take the user through steps involving internal web applications, third party web applications, third party software applications, or desktop software applications. For example, a step of a workflow may involve a module, as discussed above.

Figure 9C:
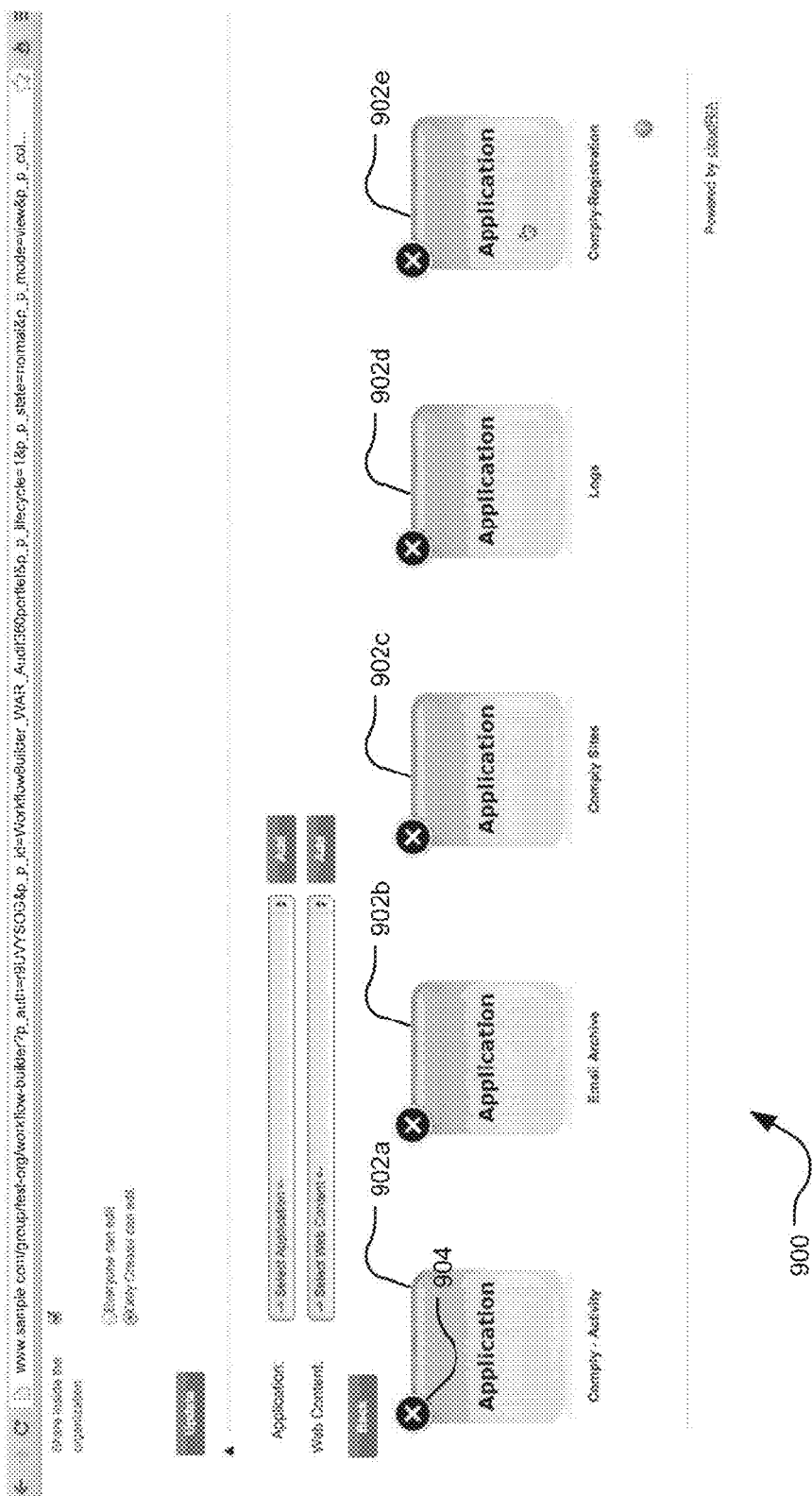

FIG. 9C illustrates a subsequent step in the workflow creation process in which the user can delete or organize the steps in the workflow via an icon-based graphical interface. In this stage of the workflow creation interface 900, the user has selected five steps 902a-902e to be incorporated into the workflow. As described above, each of these steps 902a-902e can be associated with the launching of a software application or the retrieval of content from a web application. The user may click on the Delete Icon portion 904 of the icon 902a in order to remove that step from the workflow. Alternatively, the user may click and drag the icons 902 to re-order the sequence in which the steps are conducted in the workflow. In some embodiments, a workflow may be linear, with one step following another. In some embodiments, a workflow may be non-linear. For example, a workflow may comprise a decision tree in which the next step displayed to the user will be dependent on user actions of a prior step. For further example, certain steps may be conducted in parallel with each other, for example by multiple users who are sharing a workflow. Accordingly, the steps of a workflow may branch out depending on choices made by a user while completing a workflow.

In some embodiments, the display of a workflow on an application interface portal 200a may have an icon of the first step. For example, the workflow comprising the five steps 902a-902e may be represented by the icon of 902a, which may be the first step.

In some embodiments, a step or a plurality of steps may be predefined as a template that can be incorporated into a workflow. For example, if a user intends to create an eight step workflow, in which steps six, seven, and eight are already defined in a template, then the user may add steps one through five privately before adding the shared template of steps six, seven, and eight. Accordingly, a user may reuse common steps that are already defined in a template.

In other embodiments, the workflow creation process may permit the creator to add documentation features to the workflow. For example, the creator may add documentation or user instructions to each step of the workflow, for example, creating an interactive procedure manual. This documentation may, for example, be provided as text to be displayed in a pop-up window, dialog box, or other portion of the application interface portal, so that, for example, the instructions and the corresponding application or module to which the instructions apply may both be displayed to a user. In other embodiments, the documentation may be provided in audio or visual form, such as instructional sound or video clips, or animated screen images showing the steps for the user to take. In some embodiments, with each step of a workflow, the instructions may be displayed with applications across separate web domains, operating systems, servers, applications, and the like.

Workflow Creation and Launch

Figure 13A:
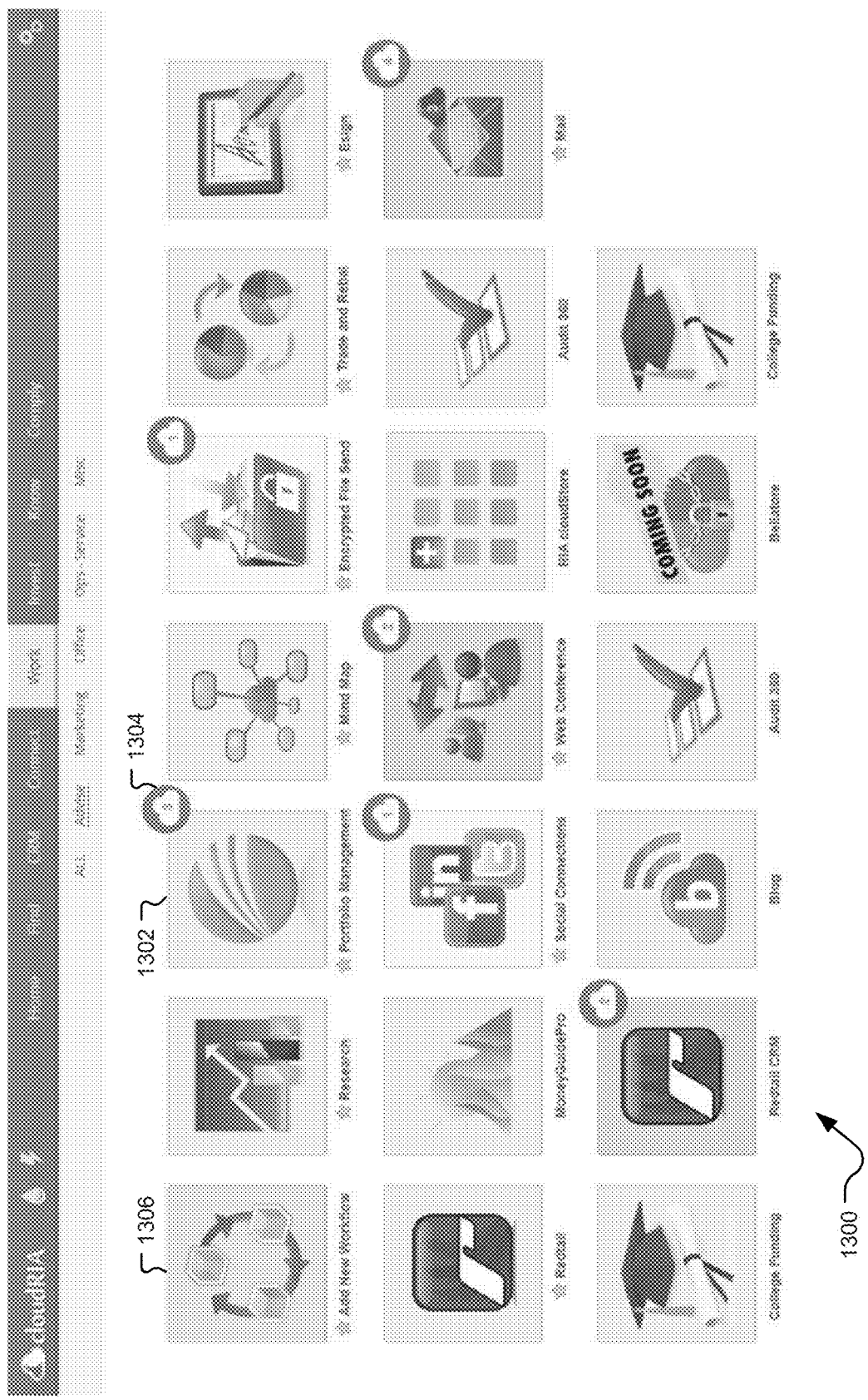
FIGS. 13A-13B illustrate additional application interface portals that may be accessed by users, in accordance with embodiments of the present invention.
Figure 13B:
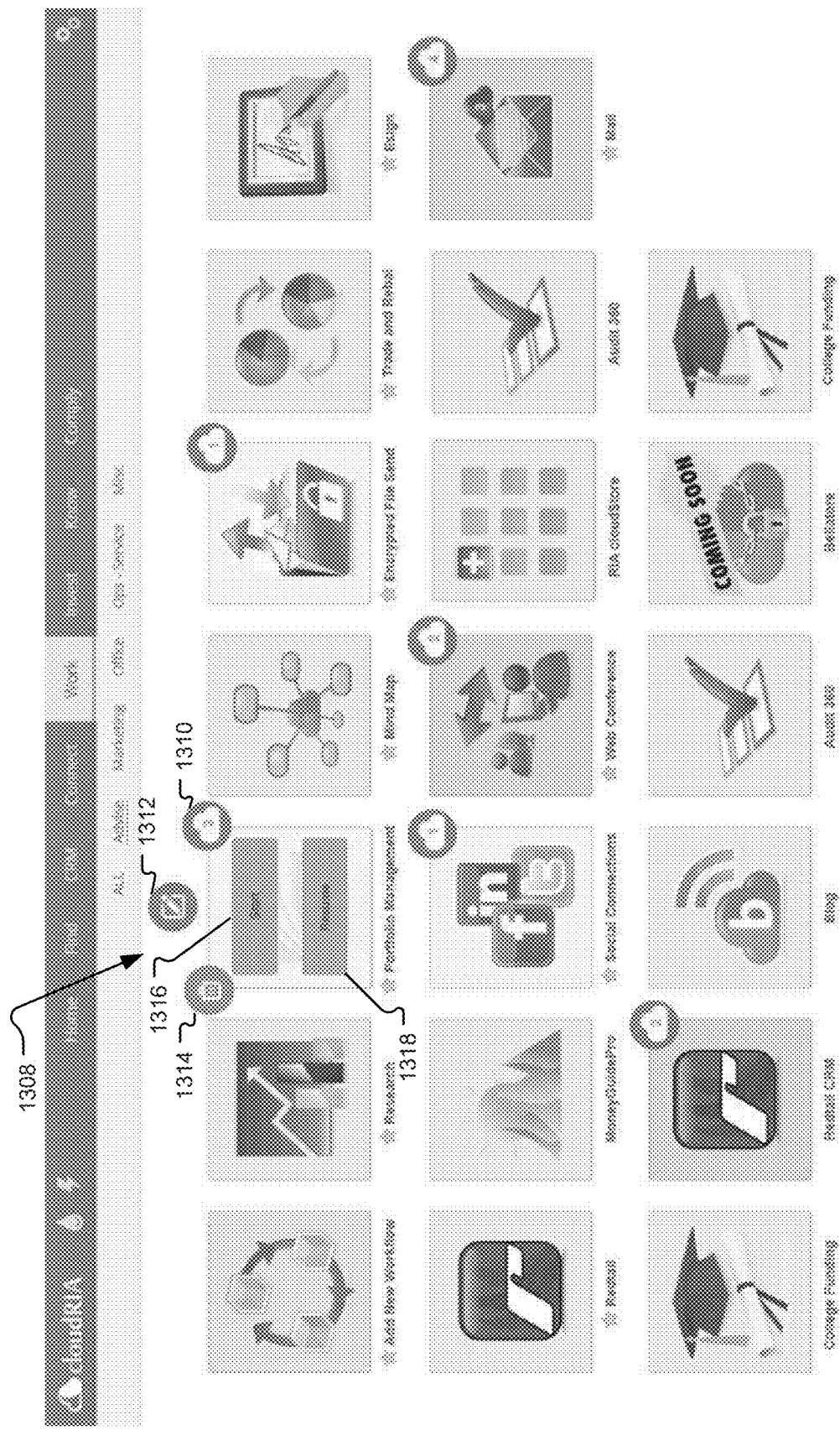

FIGS. 13A-13B illustrate additional application interface portals that may be accessed by users, in accordance with embodiments of the present invention.

FIG. 13A illustrates an application interface portal 1300, in accordance with embodiments of the present invention. The application interface portal 1300 may include an icon 1302 that represents a workflow. A workflow may comprise a plurality of steps, and in some embodiments the display of the workflow icon 1302 may be a representation of the first step of the workflow. In some embodiments, when an icon 1302 represents a workflow, a notification context icon 1304 may display when the workflow has notifications for the user, such as notifications about one or more workflow steps that need a user's attention, or notification of a change of workflow, such as an addition of a step or completion of a step by another user. As illustrated in FIG. 13A, a user may create a workflow with an icon 1306 labeled "Add New Workflow," as discussed further below.

FIG. 13B illustrates an application interface portal, in accordance with embodiments of the present invention. In some embodiments, a user has clicked the icon 1302 of FIG. 13A. After the click, a context menu 1308 may display with various context icons and context buttons that provide a user with various options. A notification context icon 1310 may display notifications relevant to the workflow. An edit context icon 1312 may allow a user to edit a workflow by displaying a workflow builder, discussed further below. A delete context icon 1314 may allow a user to delete the workflow icon from a user's application interface portal. A start context button 1316 may allow a user to start a new workflow, as discussed further below. A resume context button 1318 may allow a user to resume an existing workflow that had already been started, as discussed further below. It is to be understood that the context menu 1308 may display different context buttons and context icons based, for example, on the context of the workflow.

Figure 14A:
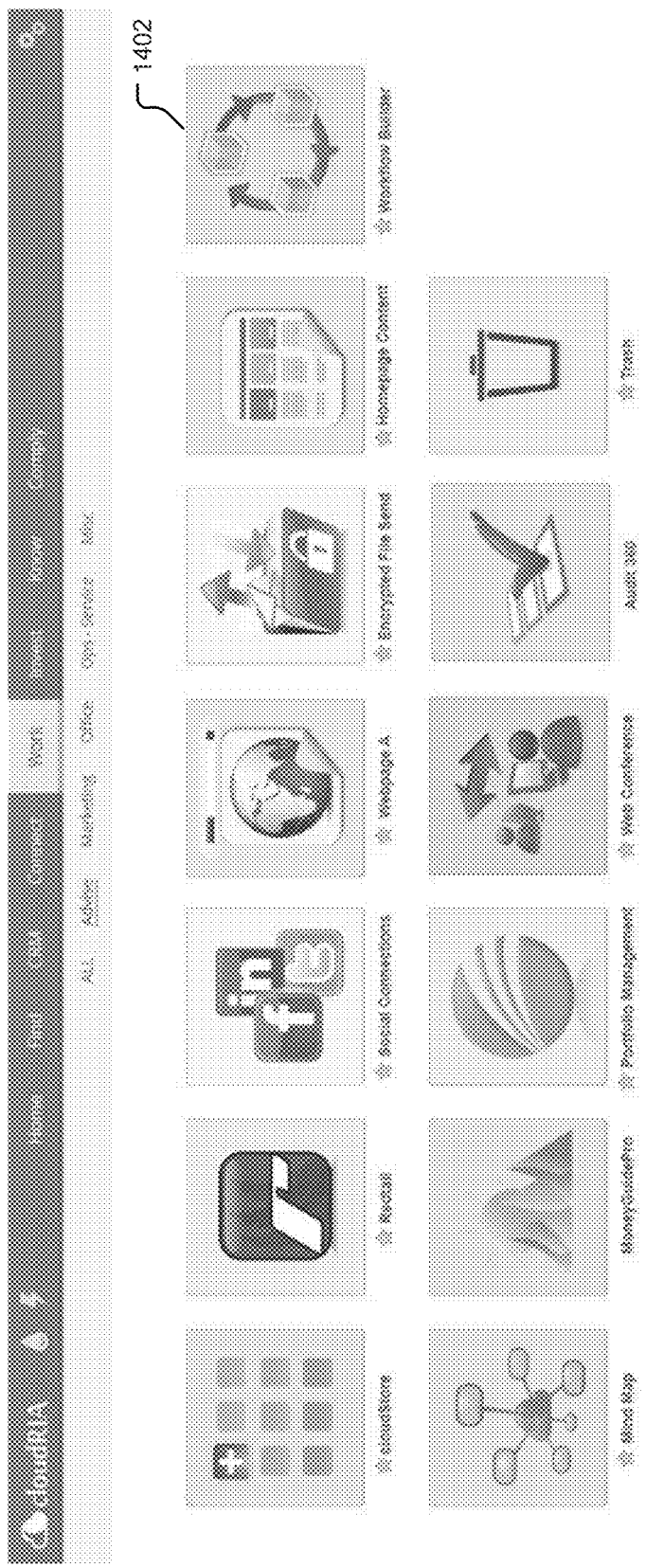
FIGS. 14A-14T illustrate additional workflow creation, in accordance with embodiments of the present invention.
Figure 14B:
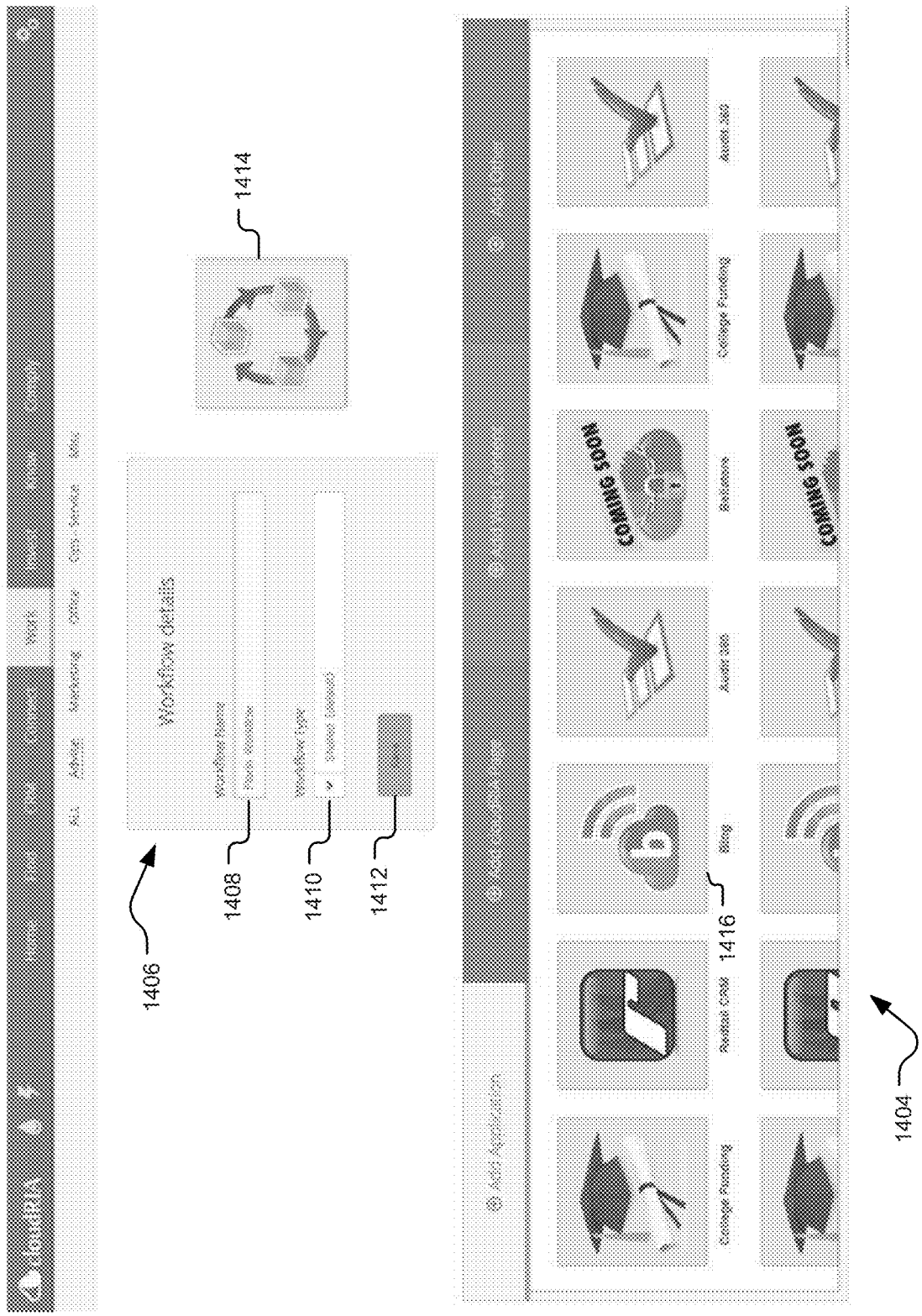
Figure 14C:
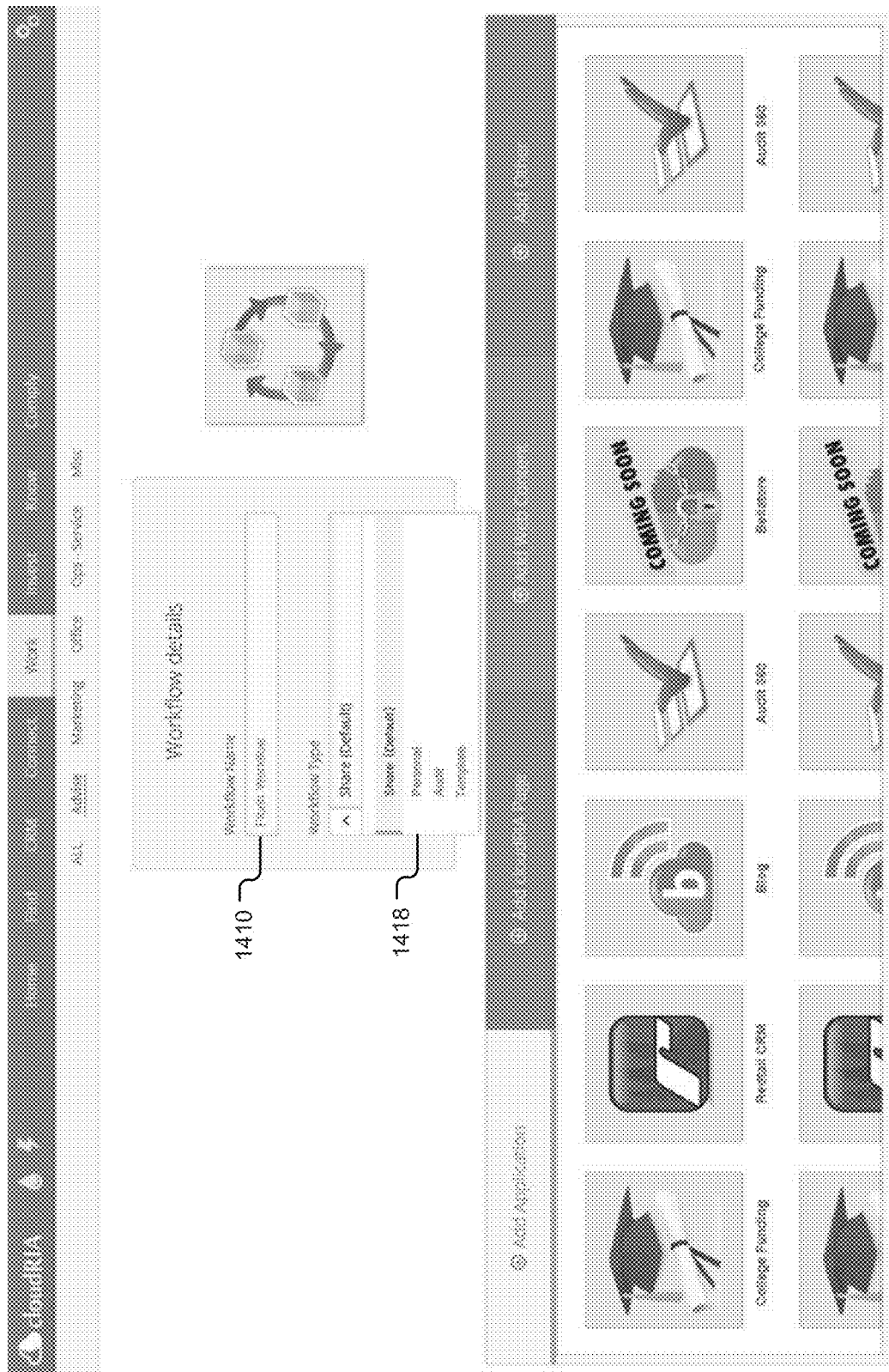
Figure 14D:
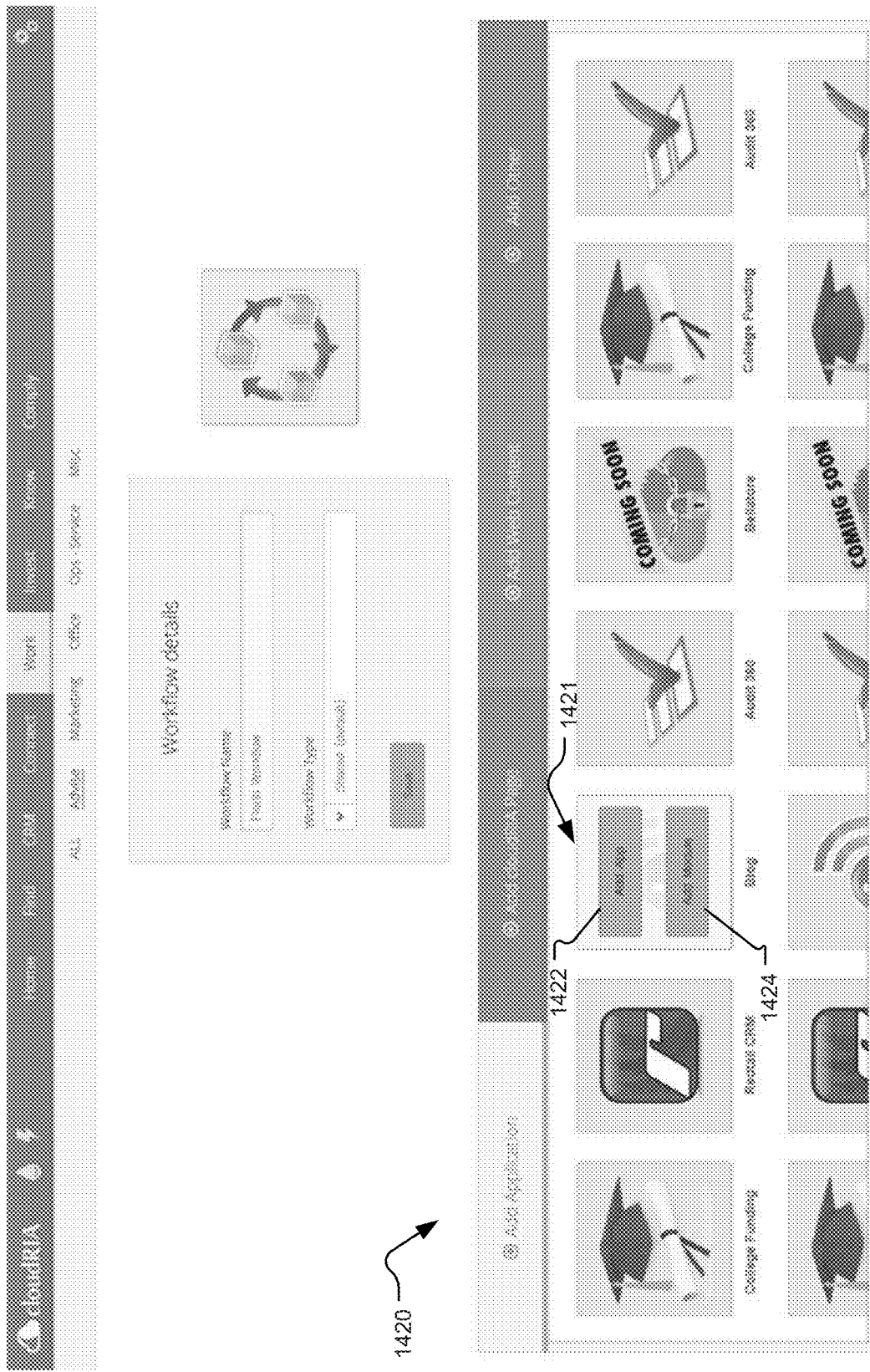
Figure 14E:
Figure 14F:
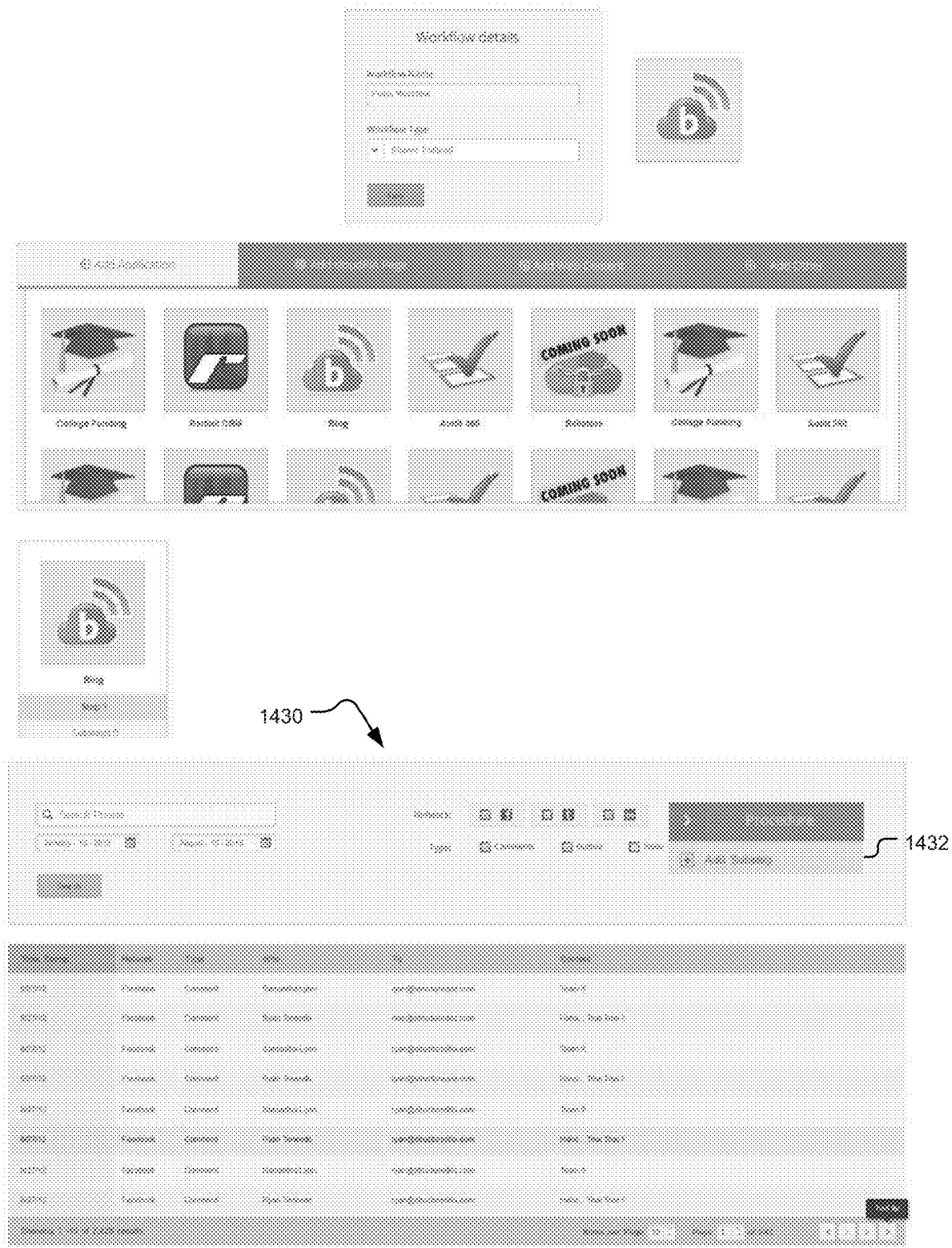
Figure 14G:
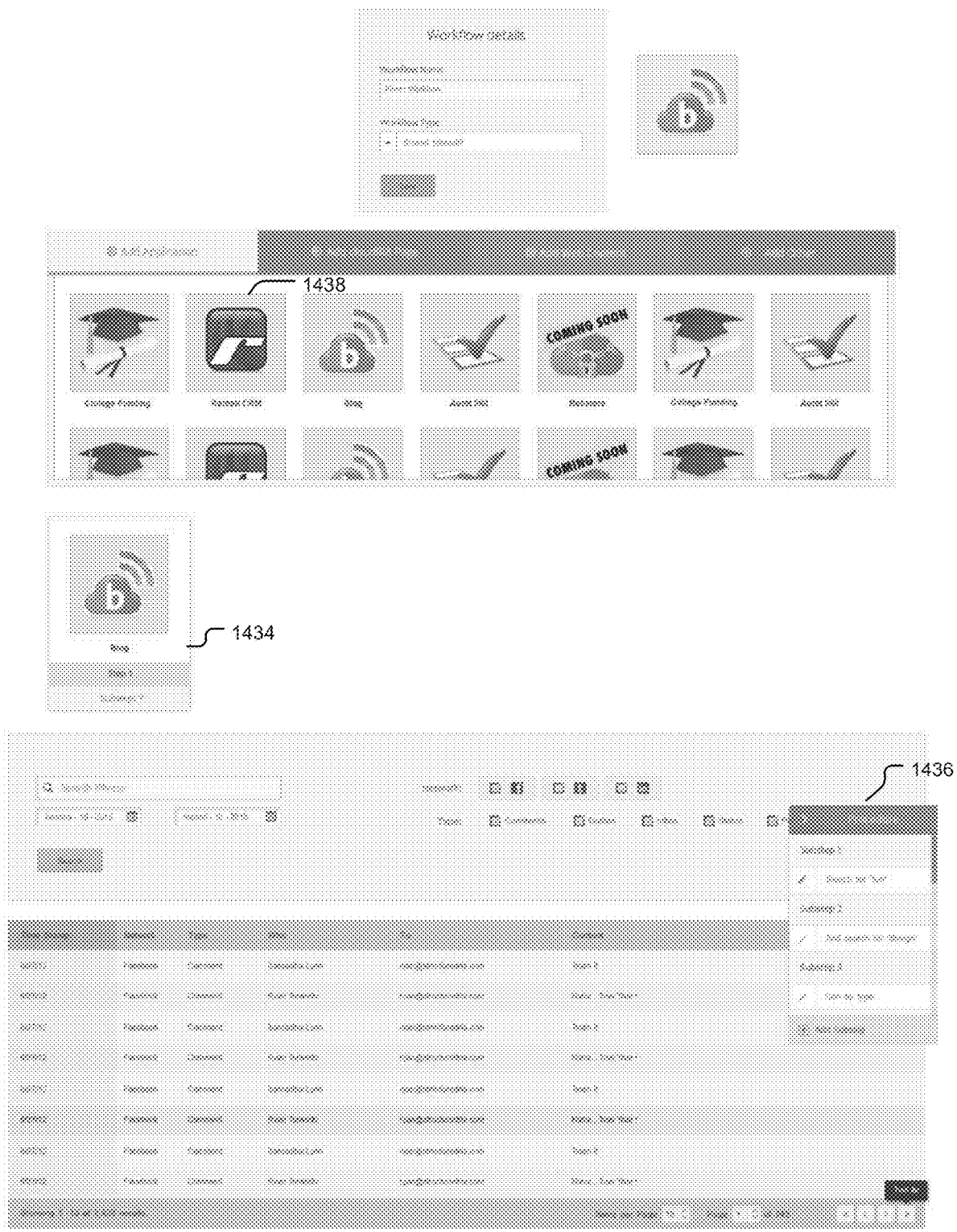
Figure 14H:
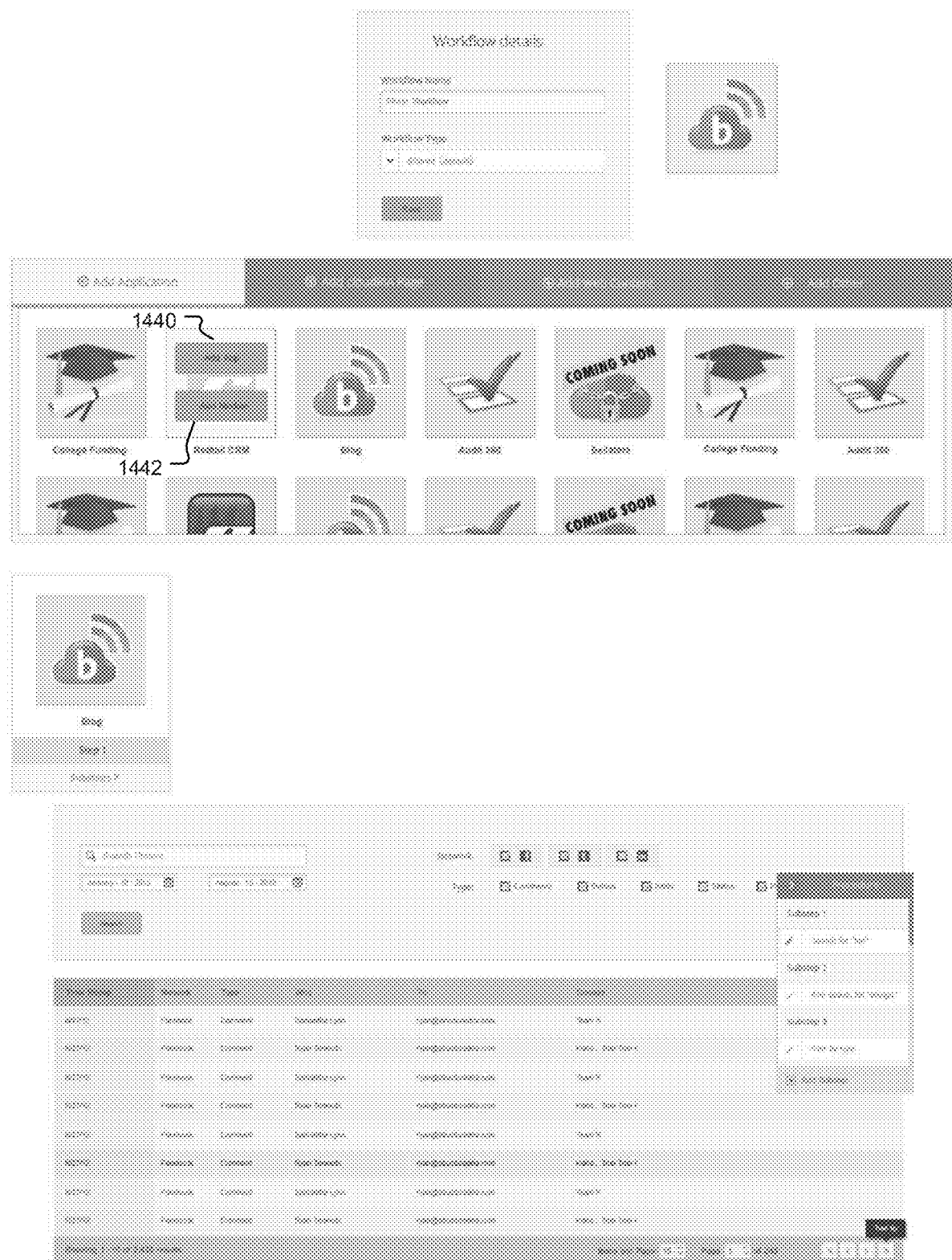
Figure 14I:
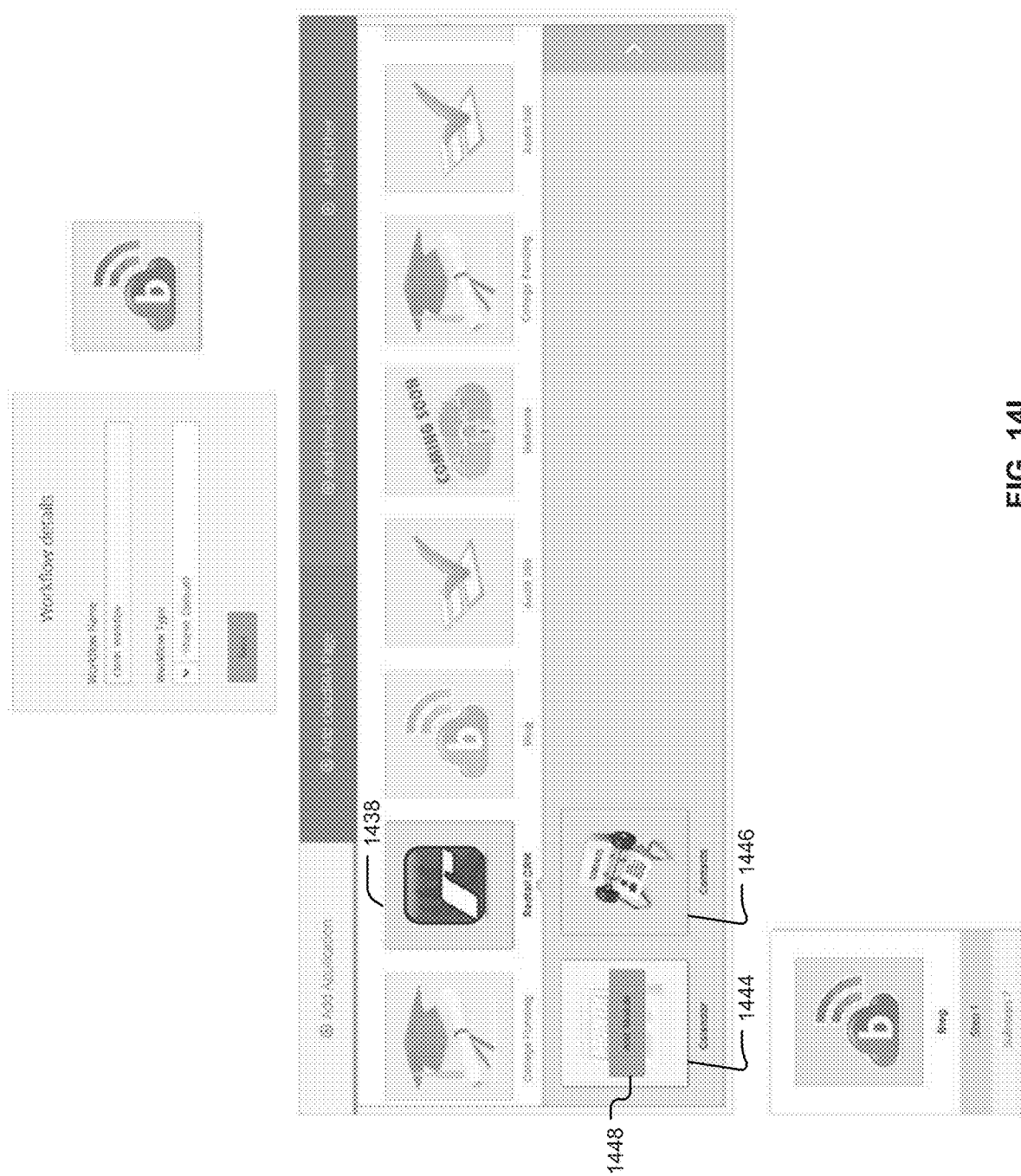
Figure 14J:
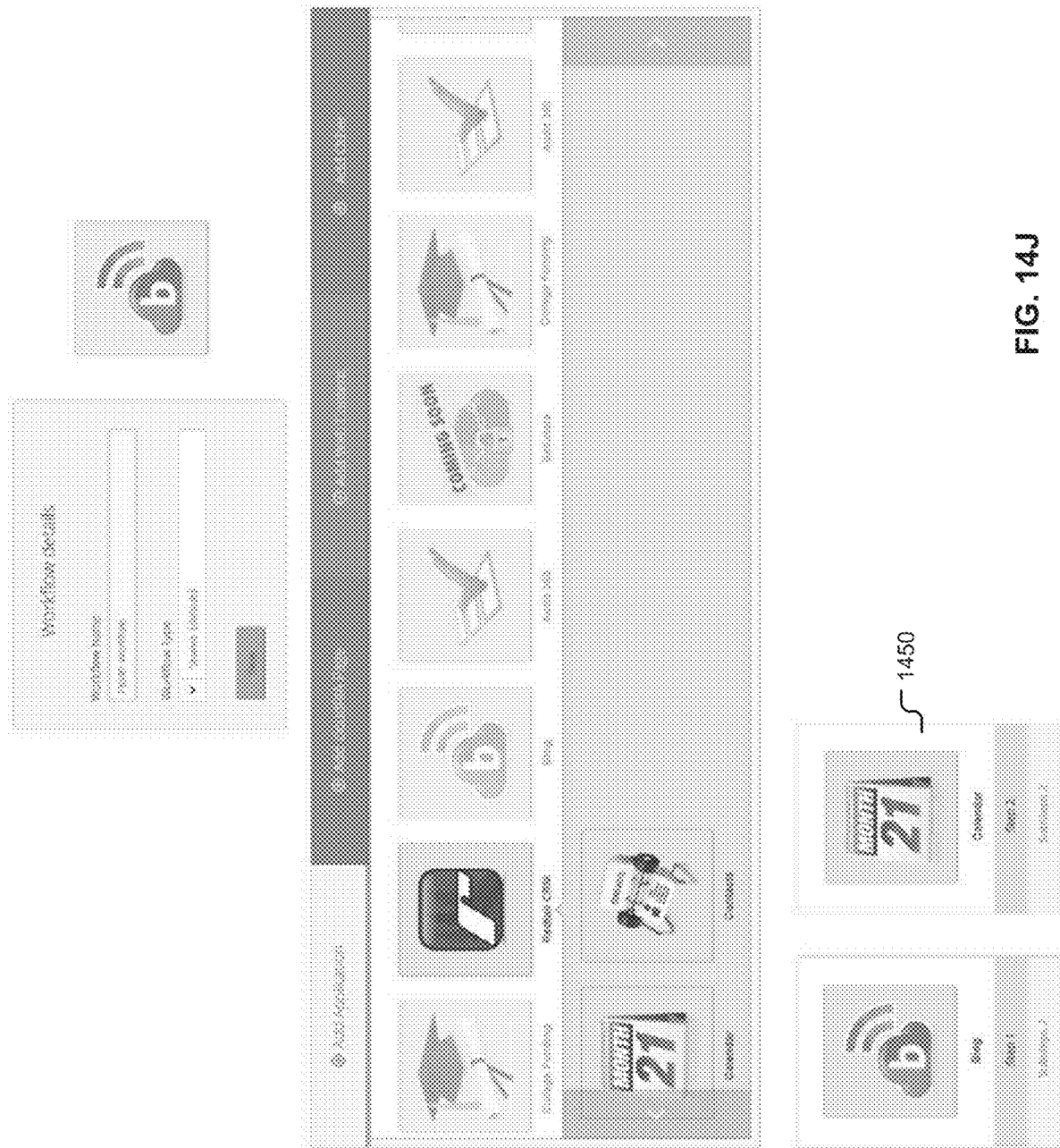
Figure 14K:
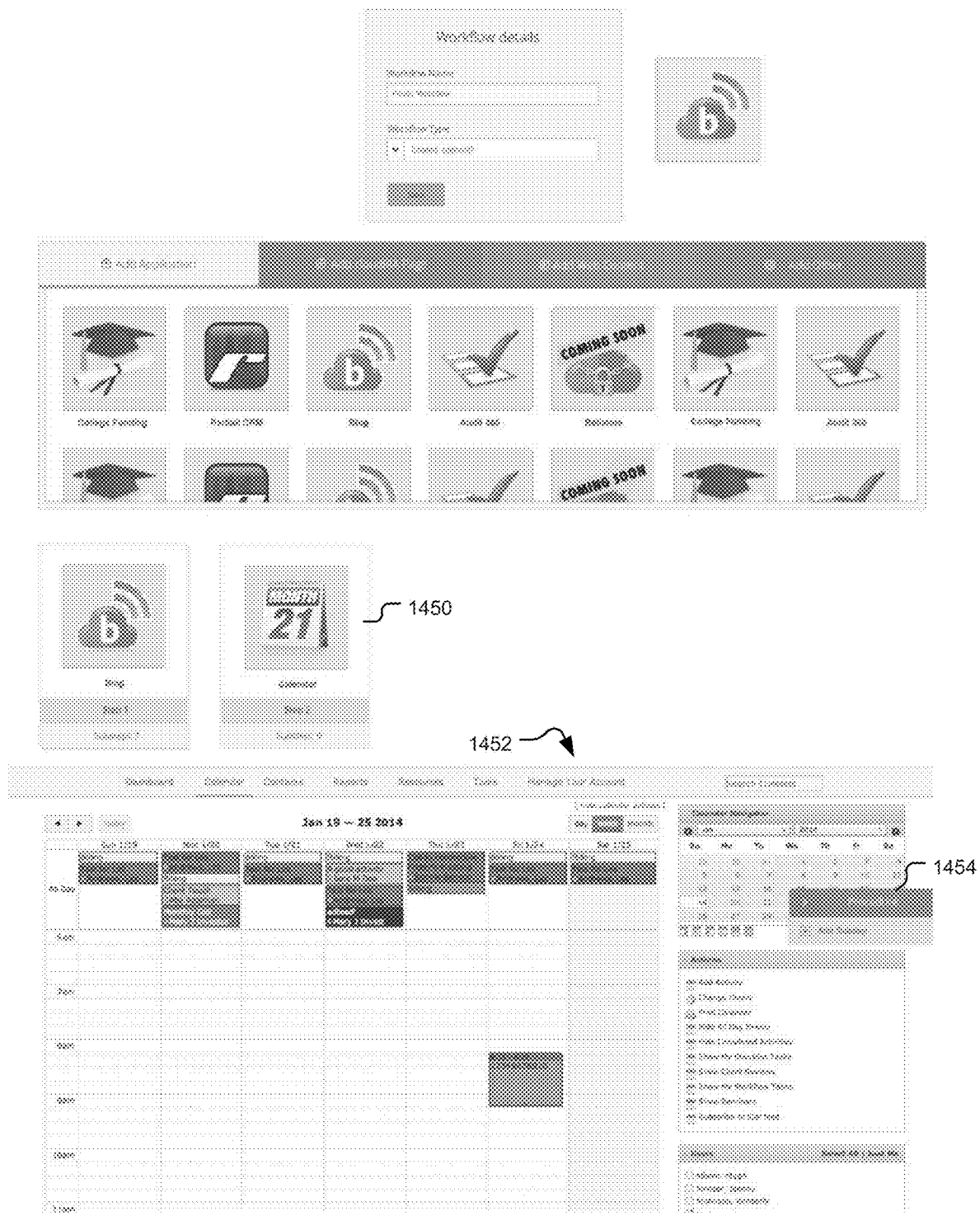
Figure 14L:
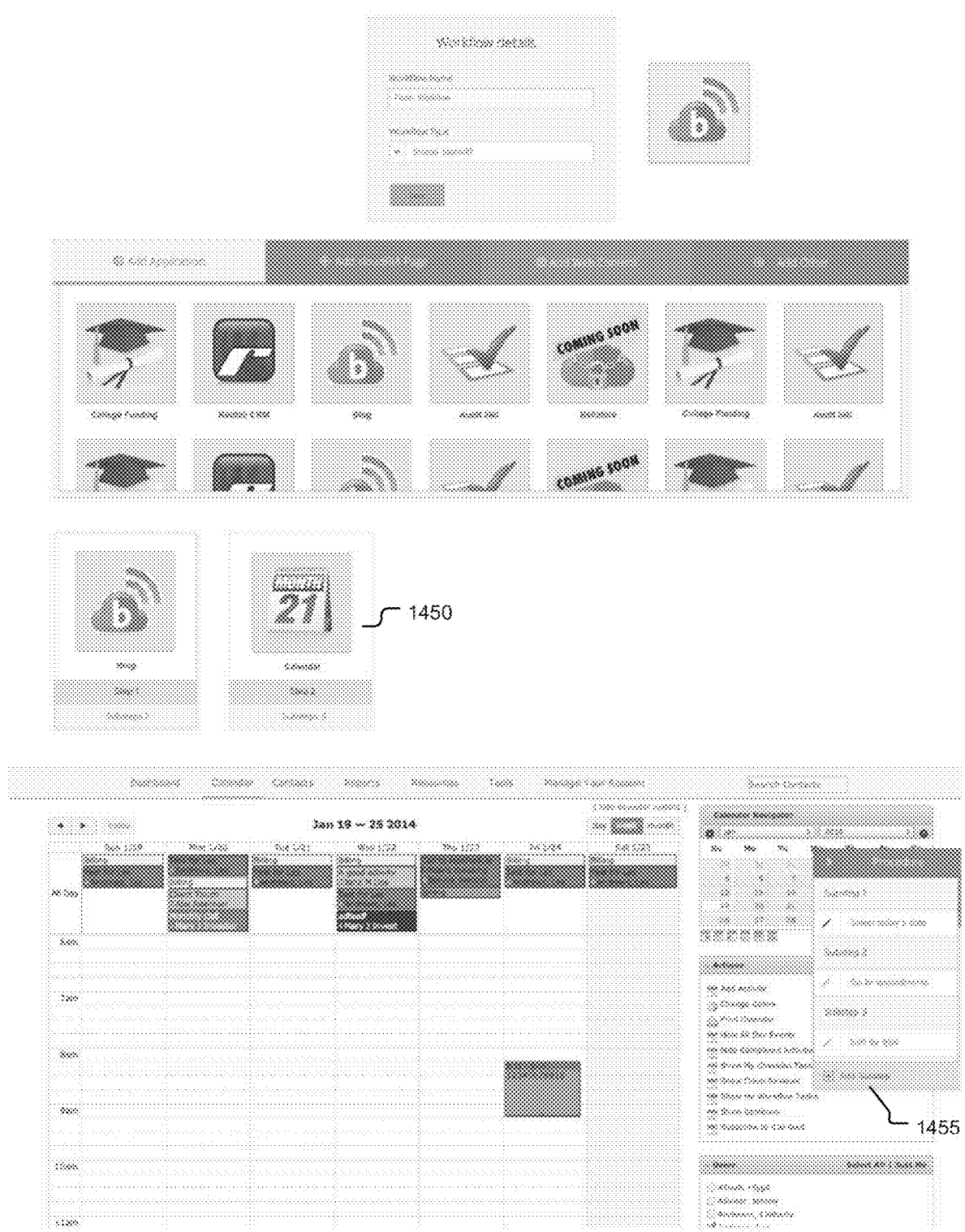
Figure 14M:
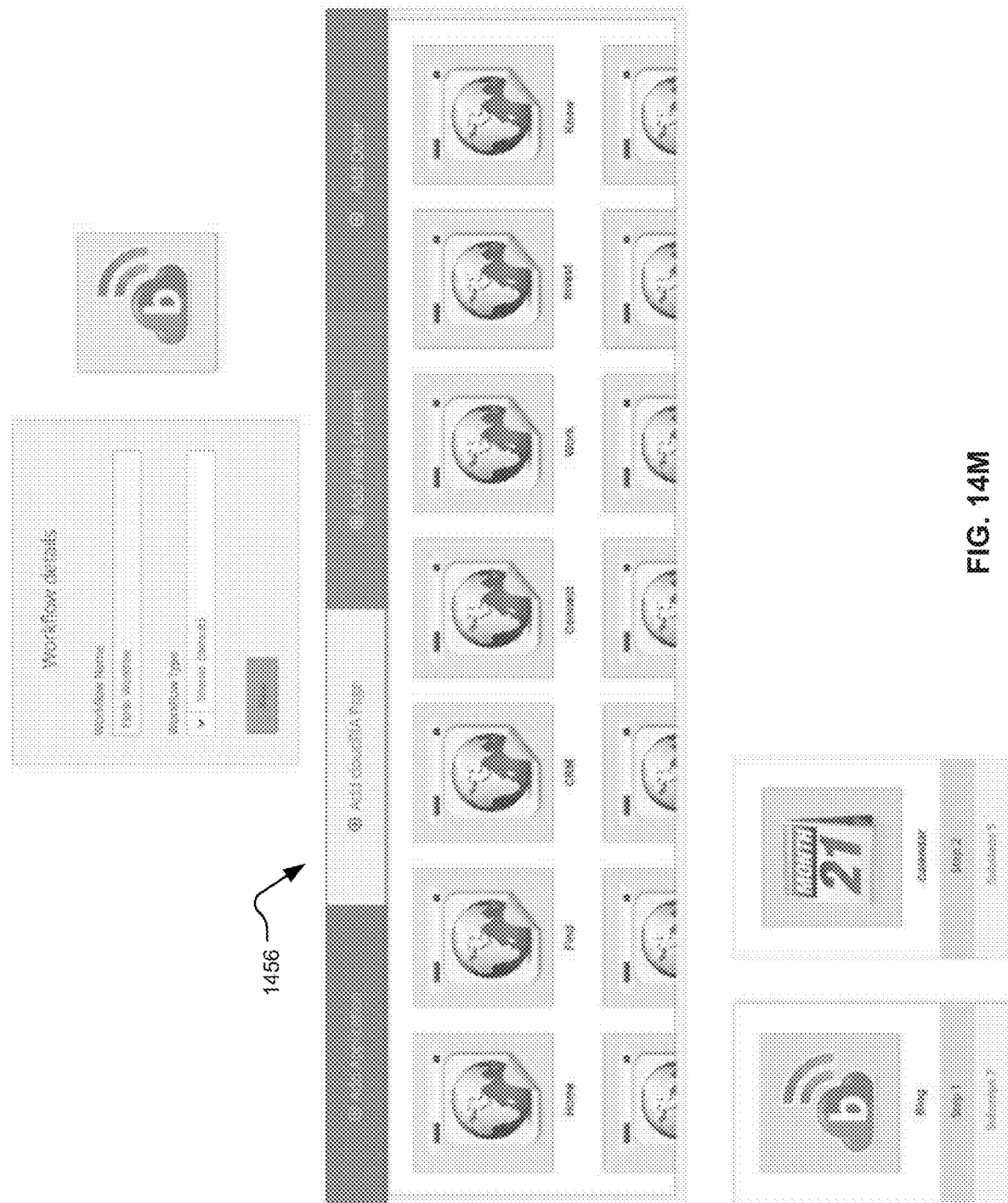
Figure 14N:
Figure 14O:
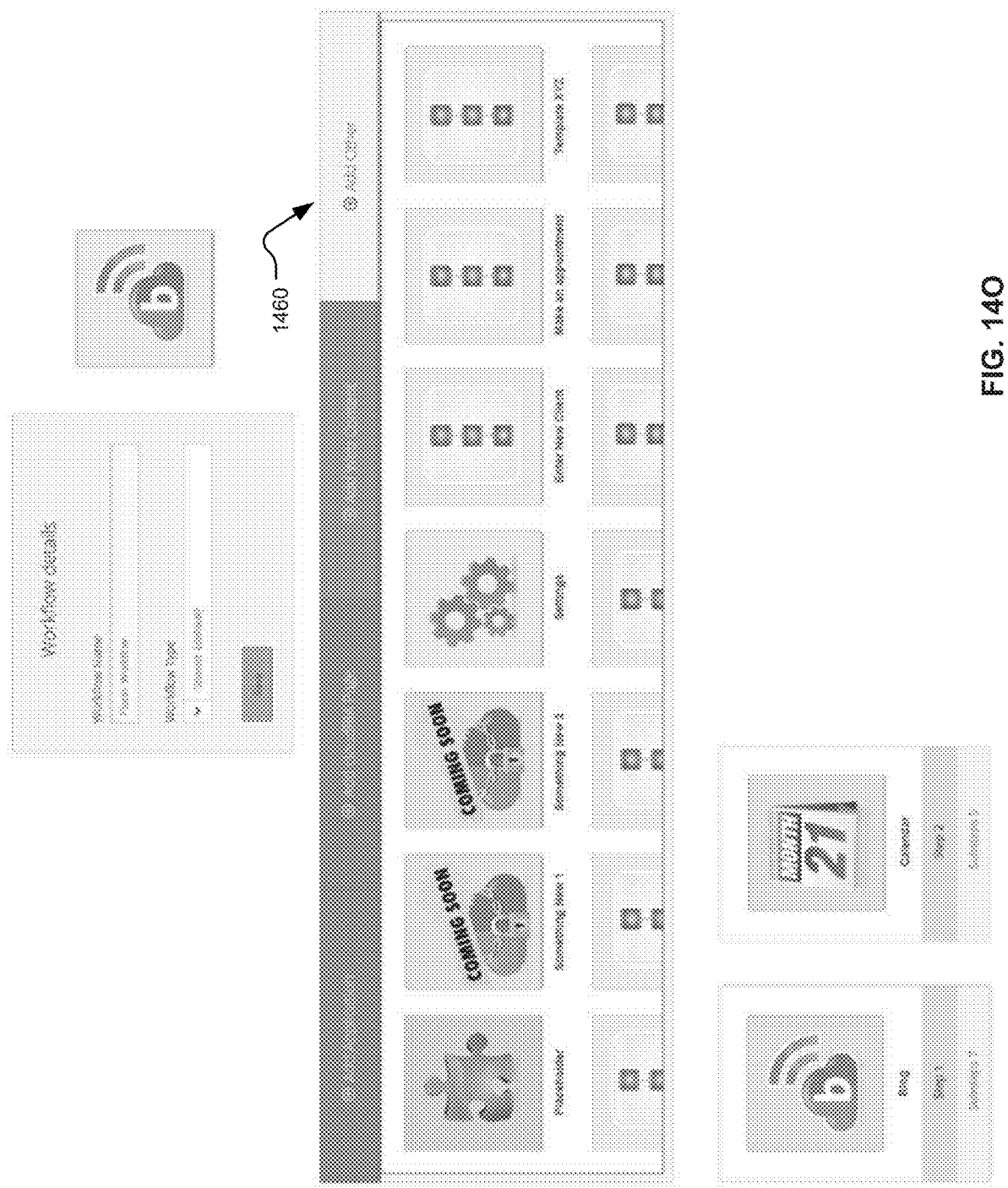
Figure 14P:
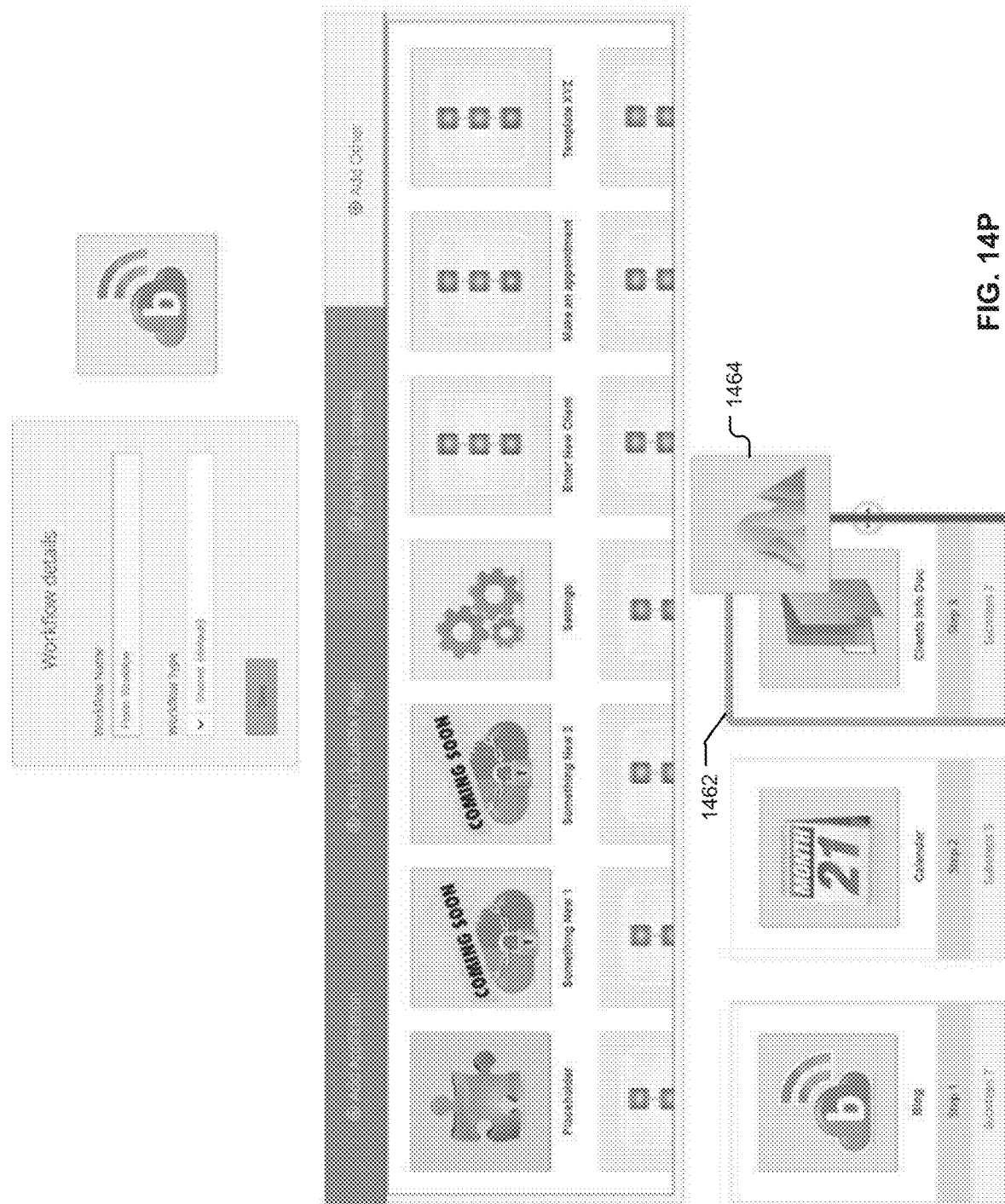
Figure 14Q:
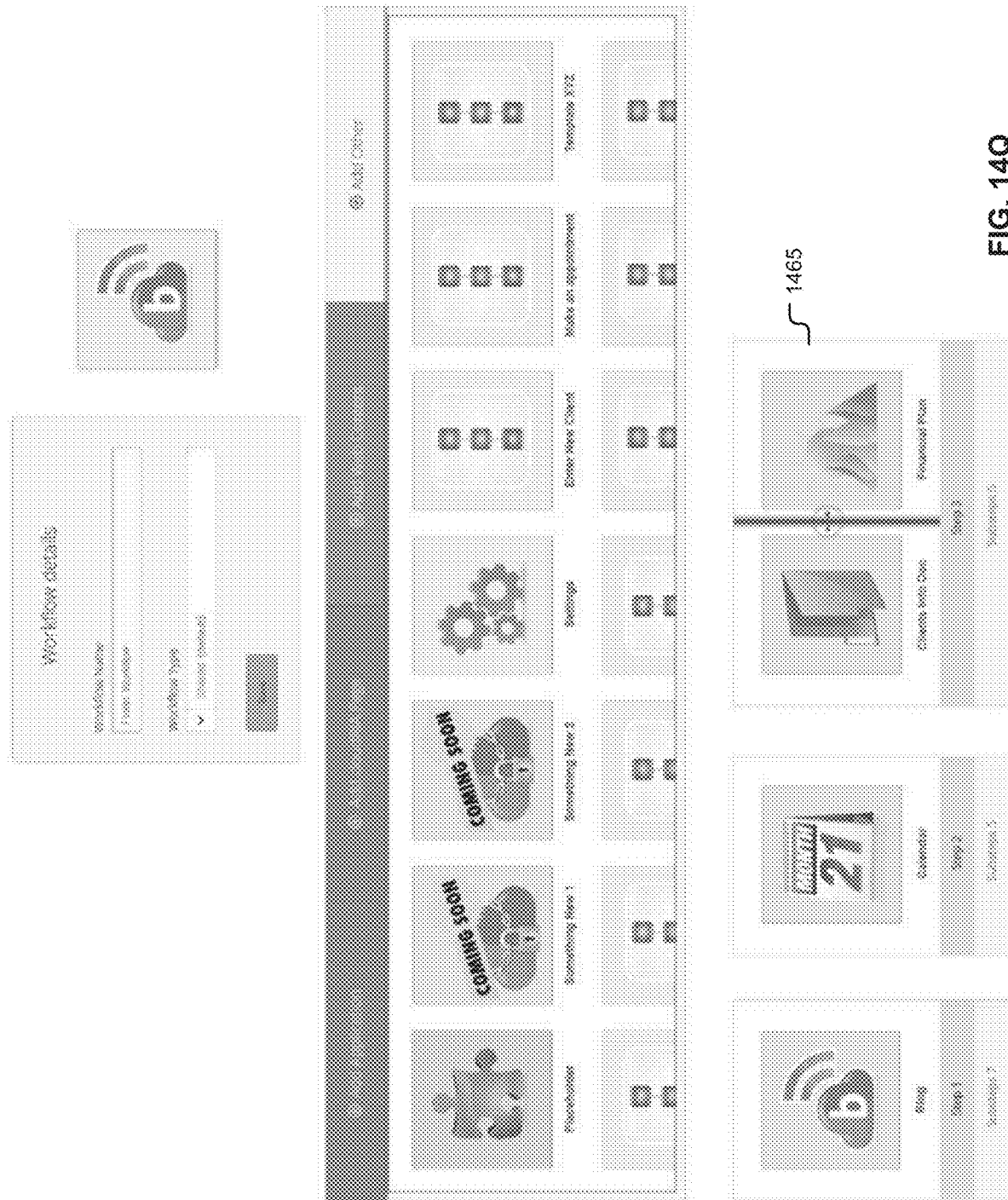
Figure 14R:
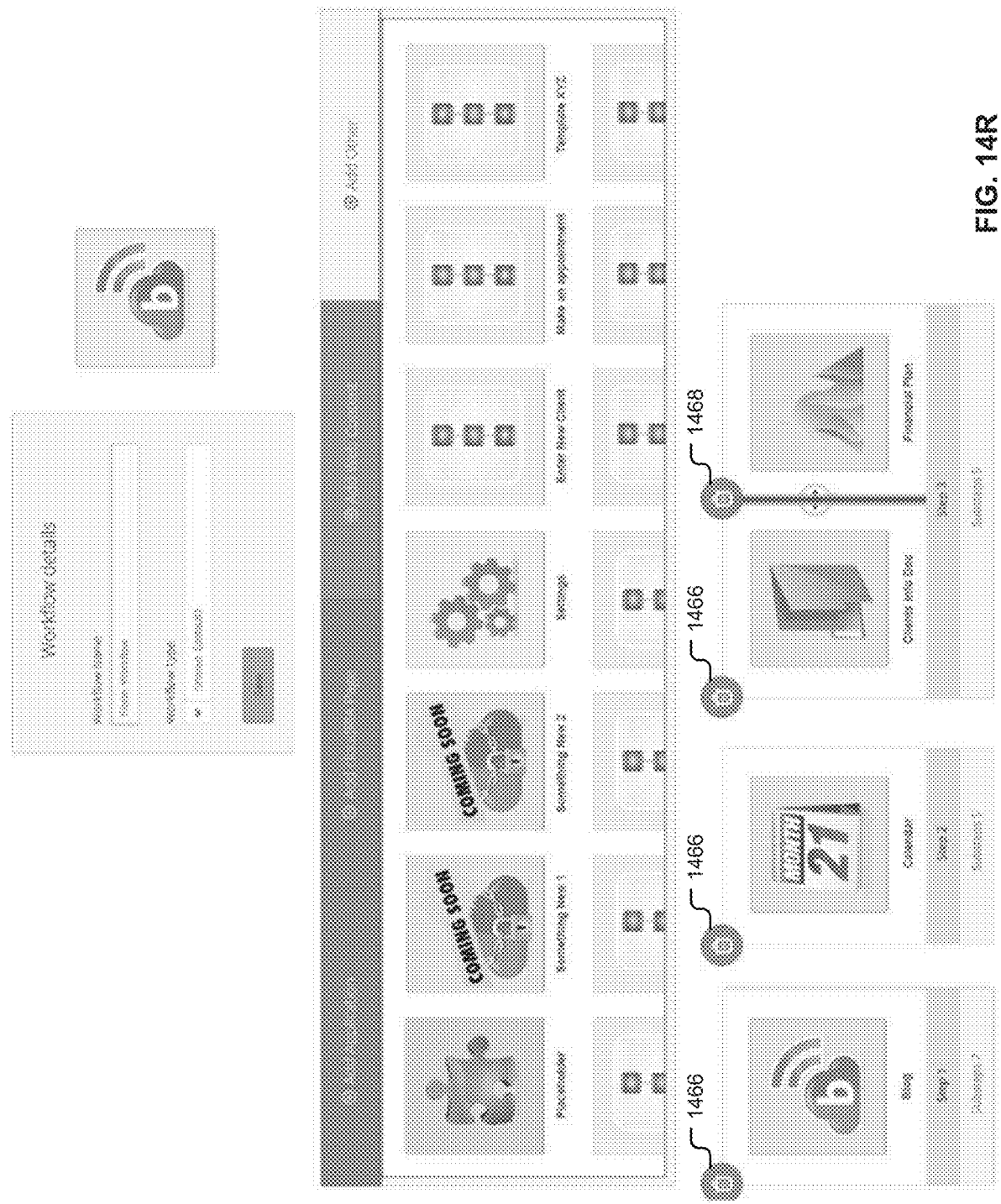
Figure 14S:
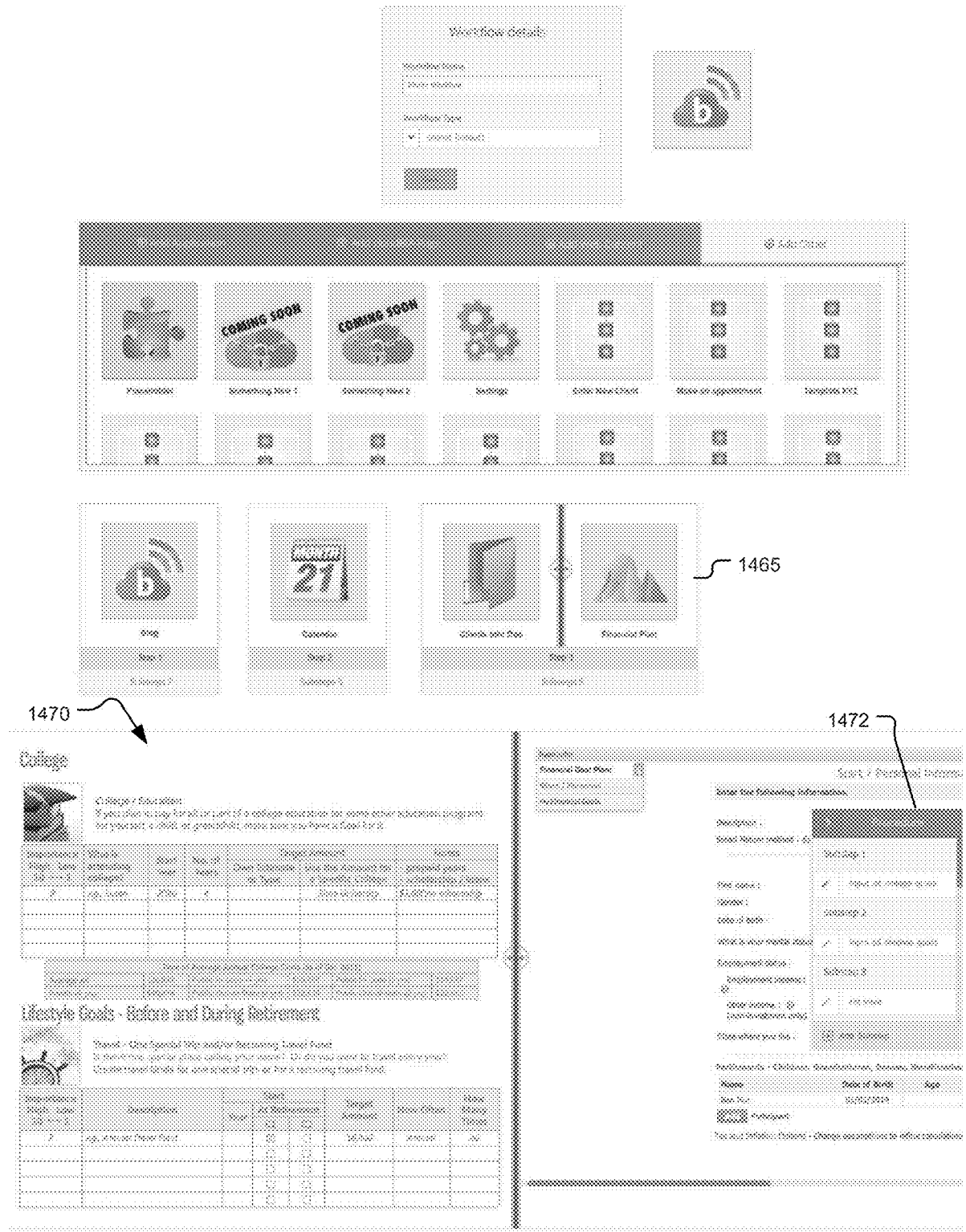
Figure 14T:
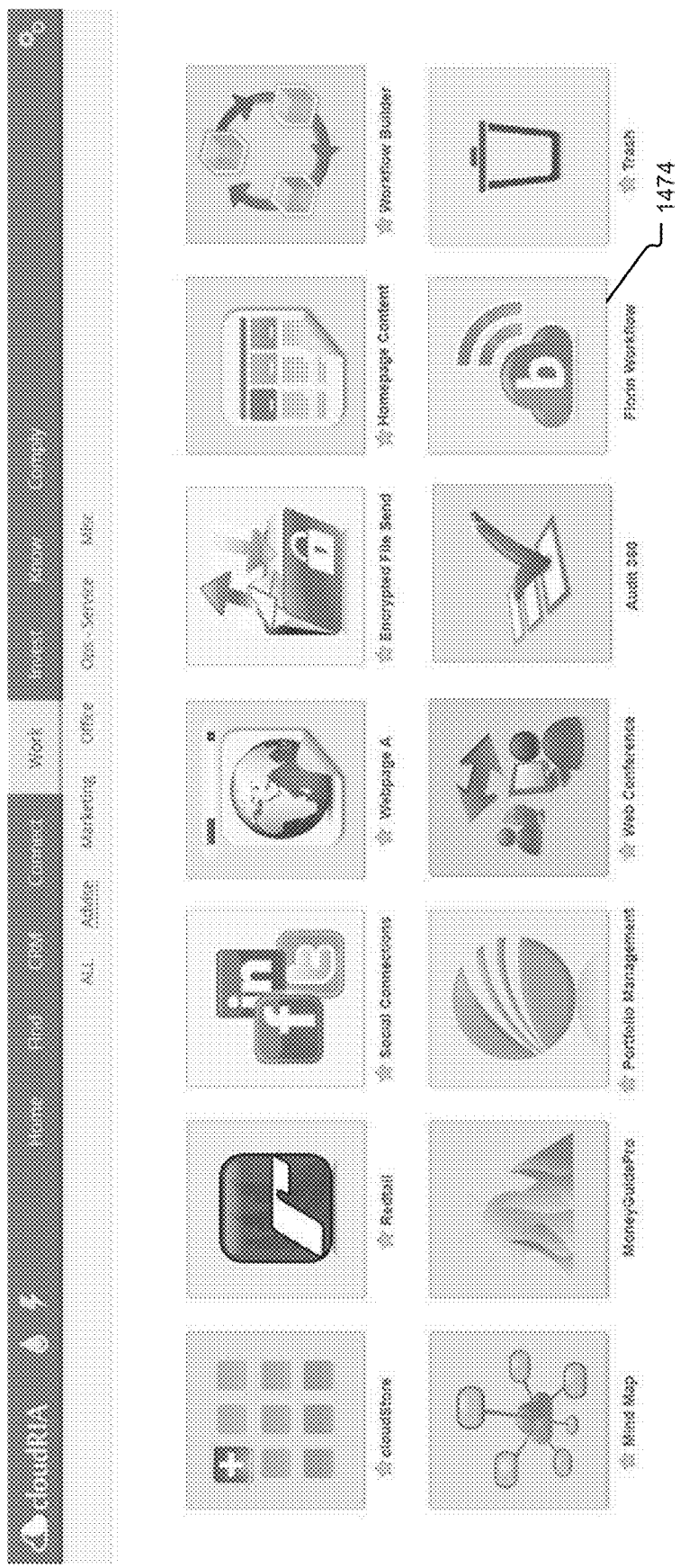

FIGS. 14A-14T illustrate additional workflow creation, in accordance with embodiments of the present invention.

FIG. 14A illustrates an application interface portal 1400 comprising a workflow builder icon 1402, in accordance with embodiments of the present invention. By clicking on the workflow builder icon 1402, a user may create a workflow. It is to be understood that a user may create a workflow in other ways, such as via a menu item.

FIG. 14B illustrates a workflow builder interface 1404, in accordance with embodiments of the present invention. In some embodiments, after a user clicks the workflow builder icon 1402 illustrated in FIG. 14A, a workflow builder interface 1404 may display. The workflow builder interface 1404 may comprise a workflow details section 1406. The user may be prompted to enter a name for the workflow in the workflow name field 1408. Next, the user may be prompted to enter a type of the workflow in the workflow type field 1410. Next, the user may save the workflow details by clicking on the save button 1412. In the illustrated embodiment, because a first step has yet to be indicated, the display of the workflow icon is represented by a generic workflow icon 1414.

FIG. 14C illustrates a workflow builder interface, in accordance with embodiments of the present invention. In some embodiments, when the user is prompted to enter a type of workflow in the workflow type field 1410, a list of types 1418 may be displayed to a user, such as Share, Personal, Audit, and Template. A Share type of workflow may indicate that a workflow is allowed to be shared with others. The sharing of the workflow may be to all users of an organization, or users within a specific role. In some embodiments, a template may be shared to users outside of an organization. A Personal type of workflow may indicate that a workflow is personal to the user who created the workflow. In some embodiments, a Personal type of workflow may indicate that the workflow may not be shared with others. An Audit type of workflow may indicate that a workflow comprises mandatory steps that must be completed in order to conduct an audit. A Template type of workflow may indicate that a workflow is a group of steps that may be added to other workflows, in which the steps of the template workflow would be the same across all the other workflows that incorporate the template workflow. Such may allow different workflows to be created in which a portion of the steps of the workflows are identical.

FIG. 14D illustrates a workflow builder interface, in accordance with embodiments of the present invention. In the illustrated embodiment, a user may select an icon to be added to the workflow, for example, as a first or a next step of a workflow. The icons to be added may be grouped, for example, by application, by web page, by web content, by other, and the like. A user may choose which group of icons to display by clicking on a tab above the icons, such as an Add Application tab. As shown in FIG. 14D, a user may view a group of application icons 1420. As illustrated in the embodiment, a user may have clicked the icon 1416, for example a blog application, as illustrated in FIG. 14B. Accordingly, a context menu 1421 may be displayed that may comprise an Add App context button 1422, to add to the workflow the application represented by the icon 1416, or an Add Module context button 1424, to add to the workflow a module of the application represented by the icon 1416.

FIG. 14E illustrates a workflow builder interface, in accordance with embodiments of the present invention. In the illustrated embodiment, a user may have clicked the Add App context button 1422, as illustrated in FIG. 14D, which may cause the icon 1426 to be displayed in the workflow. In the illustrated embodiment, icon 1426 is the first step ("Step 1") of the workflow. In some embodiments, the workflow icon 1428 that represents the icon will display as the same icon as the first step of the workflow.

FIG. 14F illustrates a workflow builder interface, in accordance with embodiments of the present invention. In the illustrated embodiment, a user may have selected the icon 1426, as illustrated in FIG. 14E, which may cause the application 1430 to display. The application 1430 may be a display of the actual application, either in a native format or in a restyled format, in which a user may interact with the application such as conduct a search. The application may be, for example, a web application, a local application, an application native to the portal, an application native to a third-party operating system, and an application originating from a third-party server. In the illustrated embodiment, a user may be prompted by a Procedure box 1432 to add one or more substeps. Under some embodiments, the Procedure box 1432 may hover above the application 1430, and may be positioned in a different location by the user. A substep may be, for example, an instruction to a user to interact with the application 1430.

FIG. 14G illustrates a workflow builder interface, in accordance with embodiments of the present invention. In the illustrated embodiment, a user has added seven substeps to the first step, as illustrated in the first step icon 1434, and three of the seven substeps are displayed to the user in the Procedure box 1436. A user may be prompted by the Procedure box 1436 to add another substep. A user may also be able to edit a substep or move the substep to a different position within the group of substeps.

FIG. 14H illustrates a workflow builder interface, in accordance with embodiments of the present invention. In the illustrated embodiment, a user may have clicked icon 1438, for example a CRM application, as illustrated in FIG. 14G. Accordingly, a context menu may be displayed that may comprise an Add App context button 1440, to add to the workflow the application represented by the icon 1438, or an Add Module context button 1442 to add to the workflow a module of the application represented by the icon 1438.

FIG. 14I illustrates a workflow builder interface, in accordance with embodiments of the present invention. In the illustrated embodiment, a user may have clicked the Add Module context button 1442, as illustrated in FIG. 14H. Accordingly, some or all of the modules may be displayed that are associated with the application associated with the icon 1438, for example, through deep linking. In the illustrated environment, module icon 1444, representing a calendar module, and module icon 1446, representing a contact module, are displayed to the user. A user may click the module icon 1444 and an Add Module context button 1448 may be displayed to the user, which may cause the selected module to be added to the workflow.

FIG. 14J illustrates a workflow builder interface, in accordance with embodiments of the present invention. In the illustrated embodiment, a user may have clicked the Add Module context button 1448 illustrated in FIG. 14I, which may cause the icon 1450 to be displayed in the workflow. In the illustrated embodiment, icon 1450 is the second step ("Step 2") of the workflow. In various embodiments, a module may represent a deep link into an application, regardless of whether or not the application natively supports such deep linking, regardless of whether or not the application is behind a third party authentication system, and regardless of the native styling of the module of the application.

FIG. 14K illustrates a workflow builder interface, in accordance with embodiments of the present invention. In the illustrated embodiment, a user may select the icon 1450, which may cause the corresponding module 1452 to display, such as a calendar module. The module 1452 may be a display of the actual module, either in a native format or in a restyled format, in which a user may interact with the module such as entering an appointment. The module may be, for example, a module of a web application, a local application, an application native to the portal, an application native to a third-party operating system, and an application originating from a third-party server. In the illustrated embodiment, a user may be prompted by a Procedure box 1454 to add one or more substeps. Under some embodiments, the Procedure box 1454 may hover above the module 1452, and may be positioned in a different location by the user. A substep may be, for example, an instruction to a user to interact with the module 1452.

FIG. 14L illustrates a workflow builder interface, in accordance with embodiments of the present invention. In the illustrated embodiment, a user has added five substeps to the second step, as illustrated in the second step icon 1450, and three of the five substeps are displayed to the user in the procedures box 1455. A user may be prompted to add another substep. A user may also be able to edit a substep or move the substep to a different position within the group of substeps.

FIG. 14M illustrates a workflow builder interface, in accordance with embodiments of the present invention. In the illustrated embodiment, a user may select an icon to be added to the workflow, for example, as a third or a next step of a workflow. The icons to be added may be viewed as a group. In the illustrated embodiment, a user may view a group of portal page icons 1456, for example, by clicking on an Add cloudRIA Page tab.

FIG. 14N illustrates a workflow builder interface, in accordance with embodiments of the present invention. In the illustrated embodiment, a user may select an icon to be added to the workflow, for example, as a third or a next step of a workflow. The icons to be added may be viewed as a group. In the illustrated embodiment, a user may view a group of web content icons 1458, for example, by clicking on an Add Web Content tab.

FIG. 14O illustrates a workflow builder interface, in accordance with embodiments of the present invention. In the illustrated embodiment, a user may select an icon to be added to the workflow, for example, as a third or a next step of a workflow. The icons to be added may be viewed as a group. In the illustrated embodiment, a user may view a group of other icons 1460, such as icons that are not grouped in another grouping. The user may view the group of other icons 1460, for example, by clicking on an Add Other tab.

FIG. 14P illustrates a workflow builder interface, in accordance with embodiments of the present invention. In the illustrated embodiment, a user may have added icon 1462 as a third step in a workflow. The icon 1462 may represent an application or a module such as Clients Info Doc. Furthermore, a user may have added icon 1464 as a fourth step in a workflow, or a user may be in the process of adding icon 1464 as a fourth step. The icon 1464 may represent an application or a module such as Financial Plan. In the illustrated embodiment, the icon 1464 is in a state of being merged with icon 1462 to create a multitask, such as by dragging and dropping icon 1464 on top of icon 1462. Accordingly, if icon 1462 had been previously a third step, and icon 1464 had previously been a fourth step, the multitasked combination of these two icons becomes a third step in the workflow.

FIG. 14Q illustrates a workflow builder interface, in accordance with embodiments of the present invention. In the illustrated embodiment, a multitask icon 1465 may be a third step, which may have been created by a user combining the icon 1462 and the icon 1464 as illustrated in FIG. P. The multitask icon 1465 may display, for example, a split screen bar with an icon, such as Client Info Docs, on one side of the split screen bar, and an icon, such as Financial Plan, on the other side of the split screen bar.

FIG. 14R illustrates a workflow builder interface, in accordance with embodiments of the present invention. In the illustrated embodiment, all of the icons in the workflow have a Delete context icon 1466, which a user may click to delete any of the steps of the workflow. Furthermore, a Delete context icon 1468 of a multitask icon can separate the two icons associated with the multitask icon into individual steps, such as a third step and a fourth step.

Figure 11A:
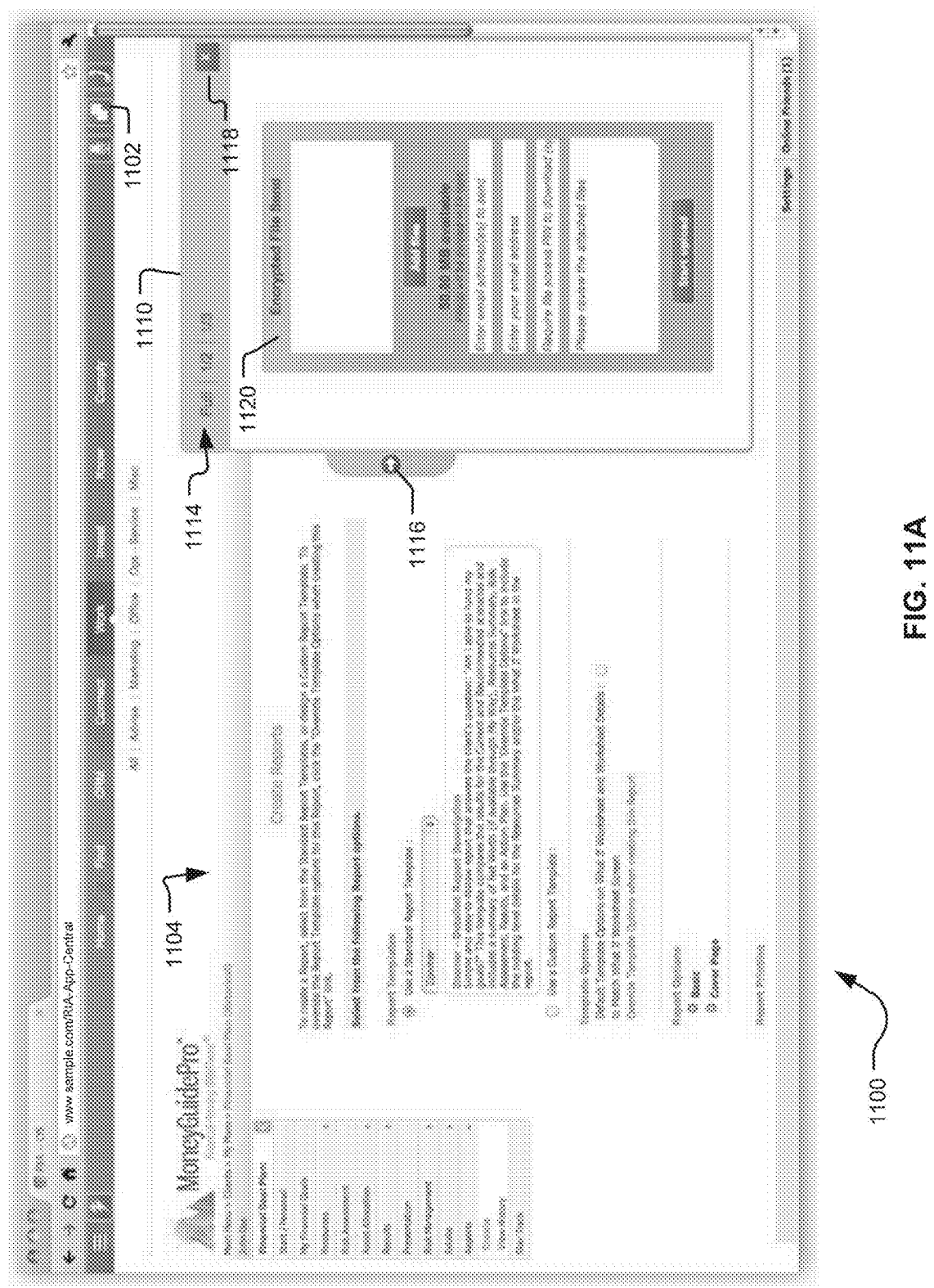
FIGS. 11A-11B illustrate different methods of enabling users to interact with multiple applications simultaneously, in accordance with embodiments of the present invention.
Figure 11B:
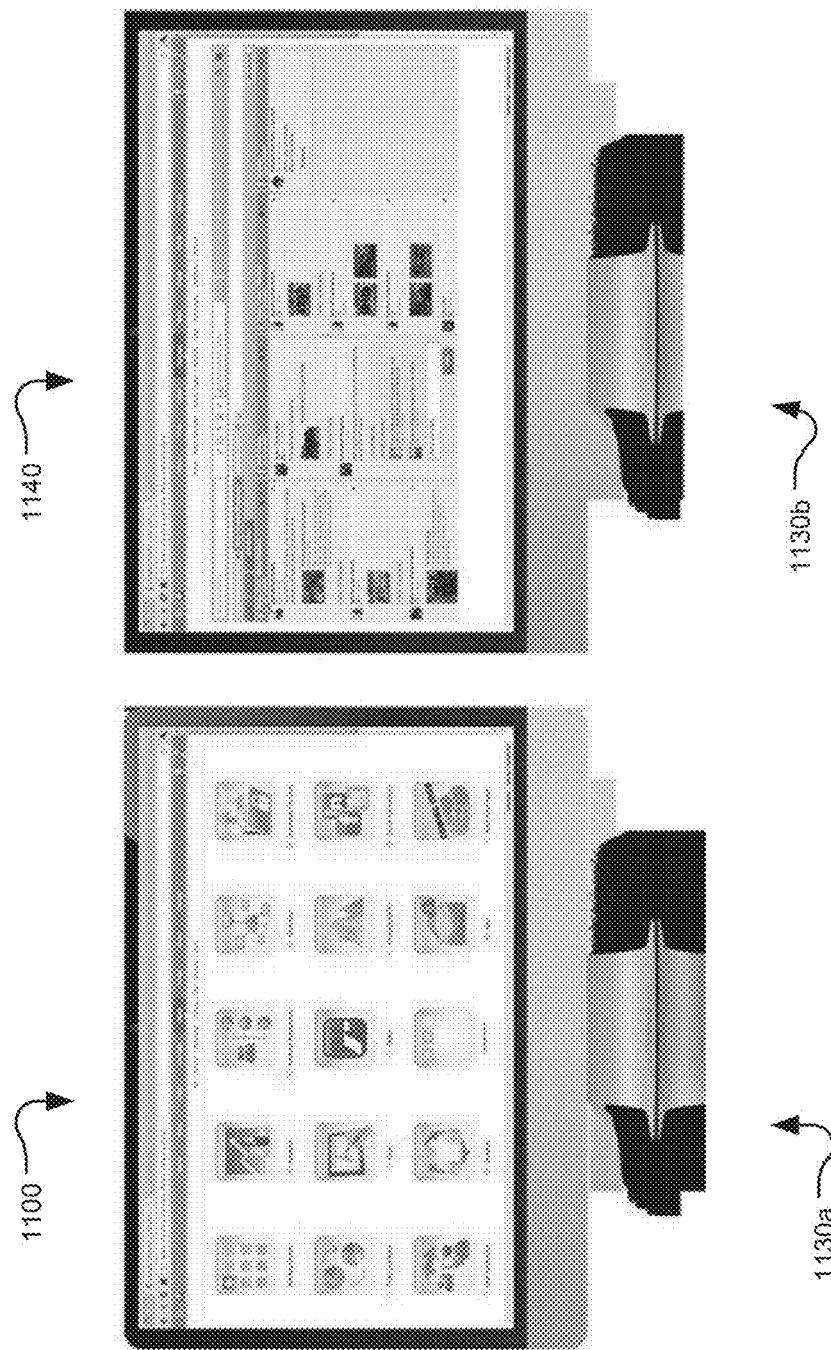

FIG. 14S illustrates a workflow builder interface, in accordance with embodiments of the present invention. In the illustrated embodiment, a user may select the multitask icon 1465, which may cause the multitask 1470 to display. An embodiment of a display of a multitask is also illustrated in FIGS. 11A and 11B. The multitask 1470 may comprise two or more of combinations of applications, modules, webpages, web content articles, place holders, and the like. It is to be understood that a place holder may be an icon that may represent actions that occur outside of the system such as services, or may represent an application that will be acquired in the future. As illustrated in FIG. 14S, the multitask 1470 comprises a College application and a Financial Goal Plan application. The multitask 1470 may be a display of the actual applications or modules, either in a native format or in a restyled format. In some embodiments, a user may interact with the applications or modules such as entering a college in the College application and entering a name in the Financial Goal Plan application. In the illustrated embodiment, a user may be prompted by a Procedure box 1472 to add one or more substeps. Under some embodiments, the Procedure box 1472 may hover above the multitask 1470, and may be positioned in a different location by the user. A substep may be, for example, an instruction to a user to interact with the multitask 1470.

FIG. 14T illustrates an application interface portal, in accordance with embodiments of the present invention. In the illustrated embodiment, a user has created a workflow and it is displayed to the user as workflow icon 1474. It is to be understood that a workflow may create connections between applications and modules that are not inherently connected together, such as applications and modules on disparate operating systems, domains, websites, and the like.

FIGS. 15A-15I illustrate workflow launching, in accordance with embodiments of the present invention.

Figure 15A:
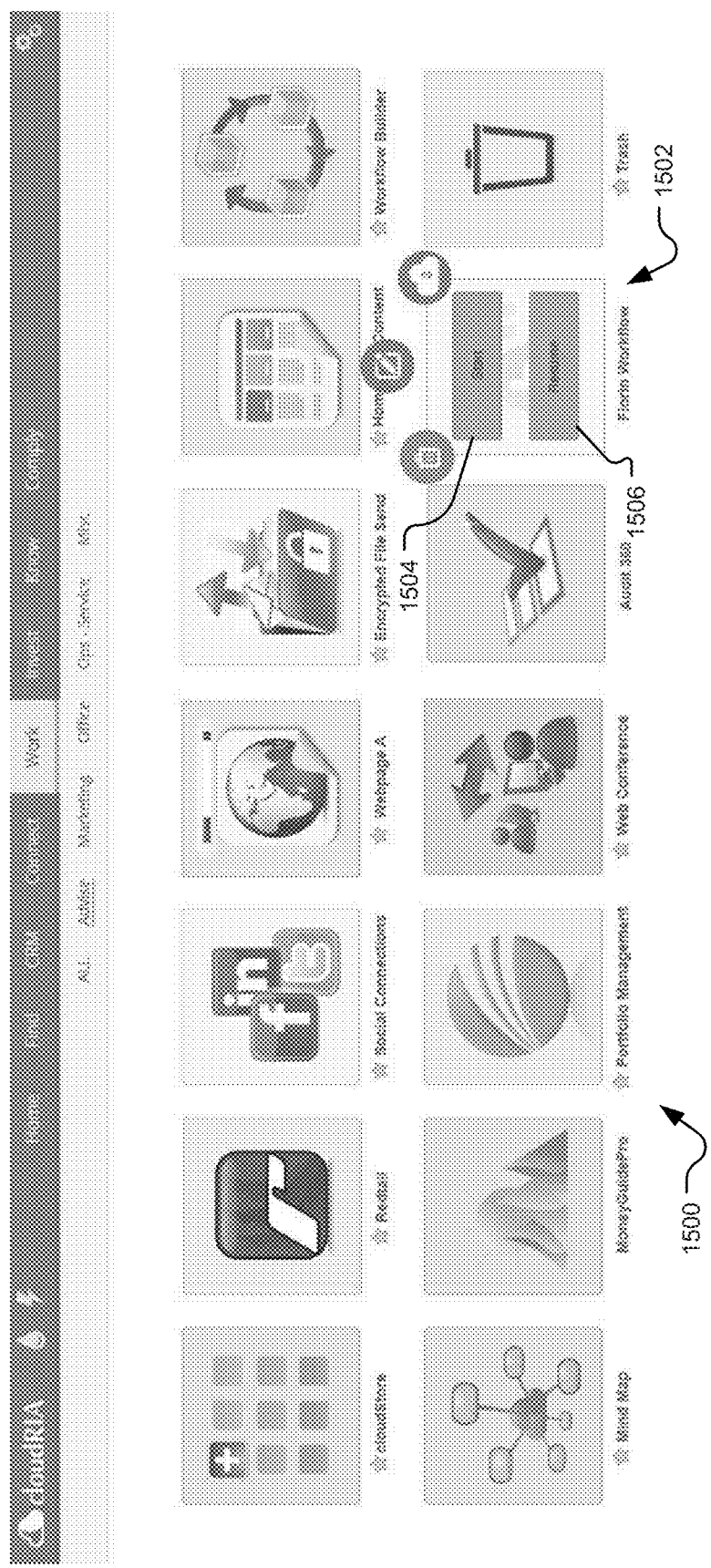
FIGS. 15A-15I illustrate workflow launching, in accordance with embodiments of the present invention.

FIG. 15A illustrates an application interface portal 1500, in accordance with embodiments of the present invention. In some embodiments, after a user has clicked a workflow icon, such as the workflow icon 1474 of FIG. 14T, a context menu 1502 may be displayed to the user. The context menu 1502 may comprise a delete context icon, an edit context icon, and a notification context icon, similar to the context icons 1310, 1312, and 1314 described above. The context menu 1502 may also comprise a start context button 1504 and a resume context button 1506, similar to the context buttons 1316 and 1318 described above.

Figure 15B:
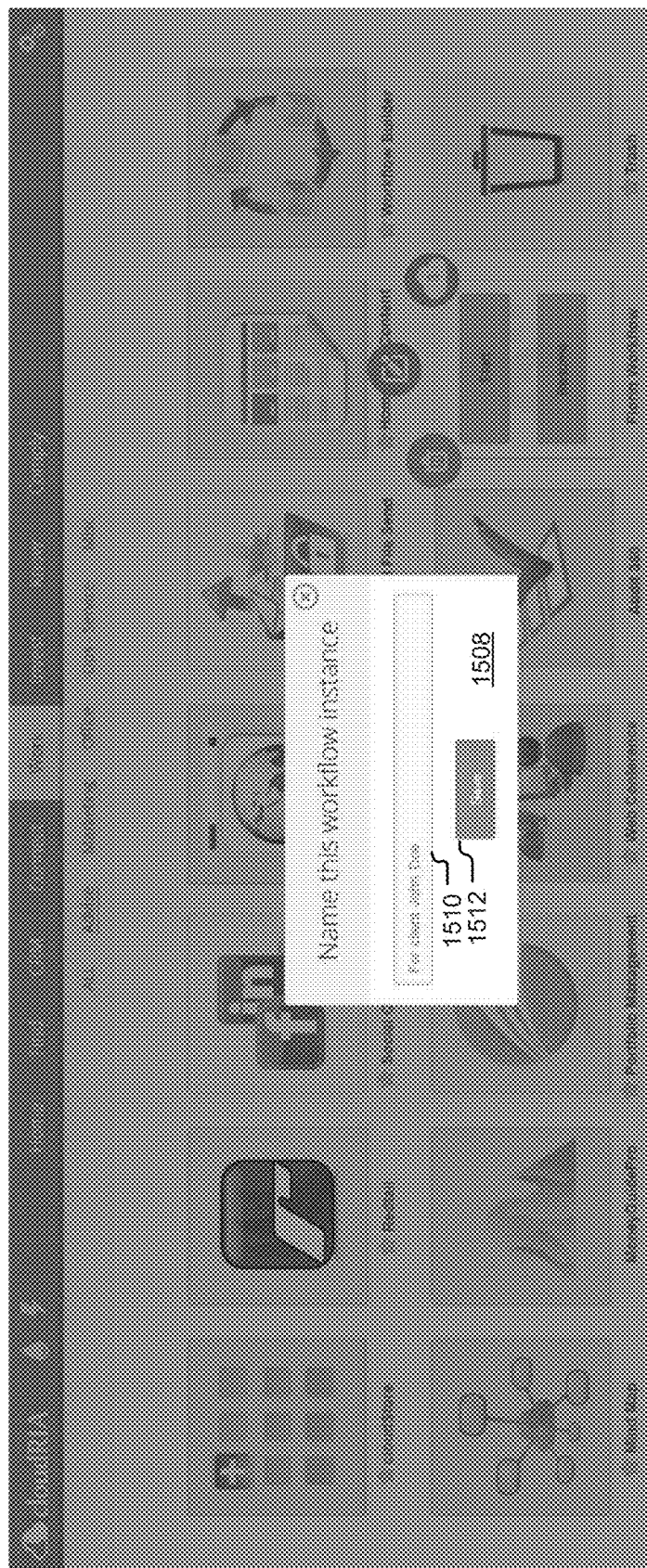

FIG. 15B illustrates a dialog box 1508, which may be displayed after a user has clicked the start context button 1504 shown in FIG. 15A, which may launch a new instance of a workflow. The dialog box 1508 may prompt the user to enter a name for the workflow in a workflow name field 1510, after which the user may click a save button 1512 to save the entered name.

Figure 15C:
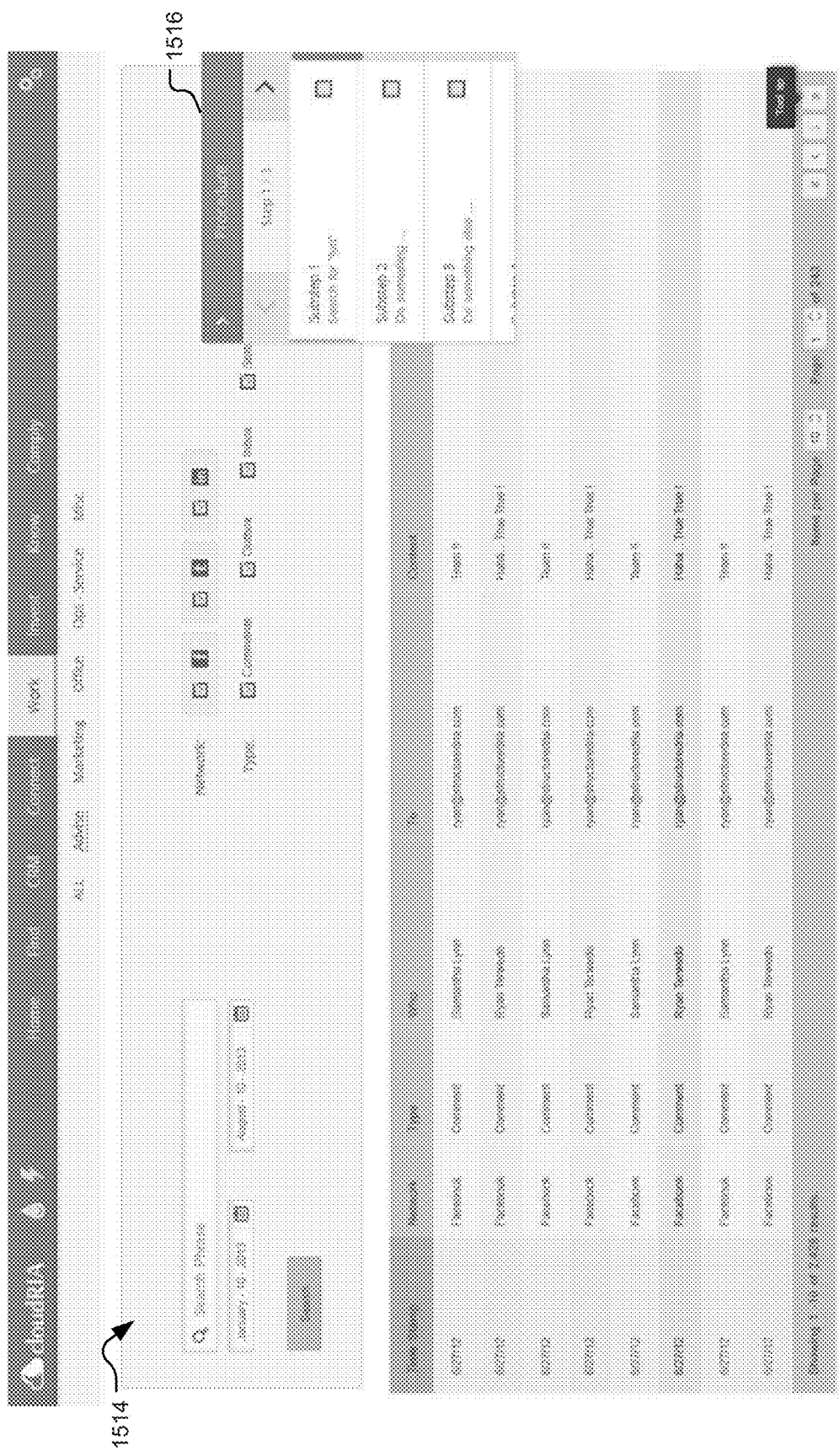

FIG. 15C illustrates the launching of a first step of a workflow, for example, after an instance of a workflow has been named and the save button 1512 has been clicked, as illustrated in FIG. 15C. In the illustrated embodiment, a workflow's first step 1514 is displayed to a user, which may be an application or a module. Furthermore, when there are substeps associated with a first step, the substeps may be displayed to the user, such as a Procedure dialog box 1516 that displays the applicable substeps. It is to be understood that the Procedure dialog box 1516 may hover near an area of the display with which a user is to interact.

Figure 15D:
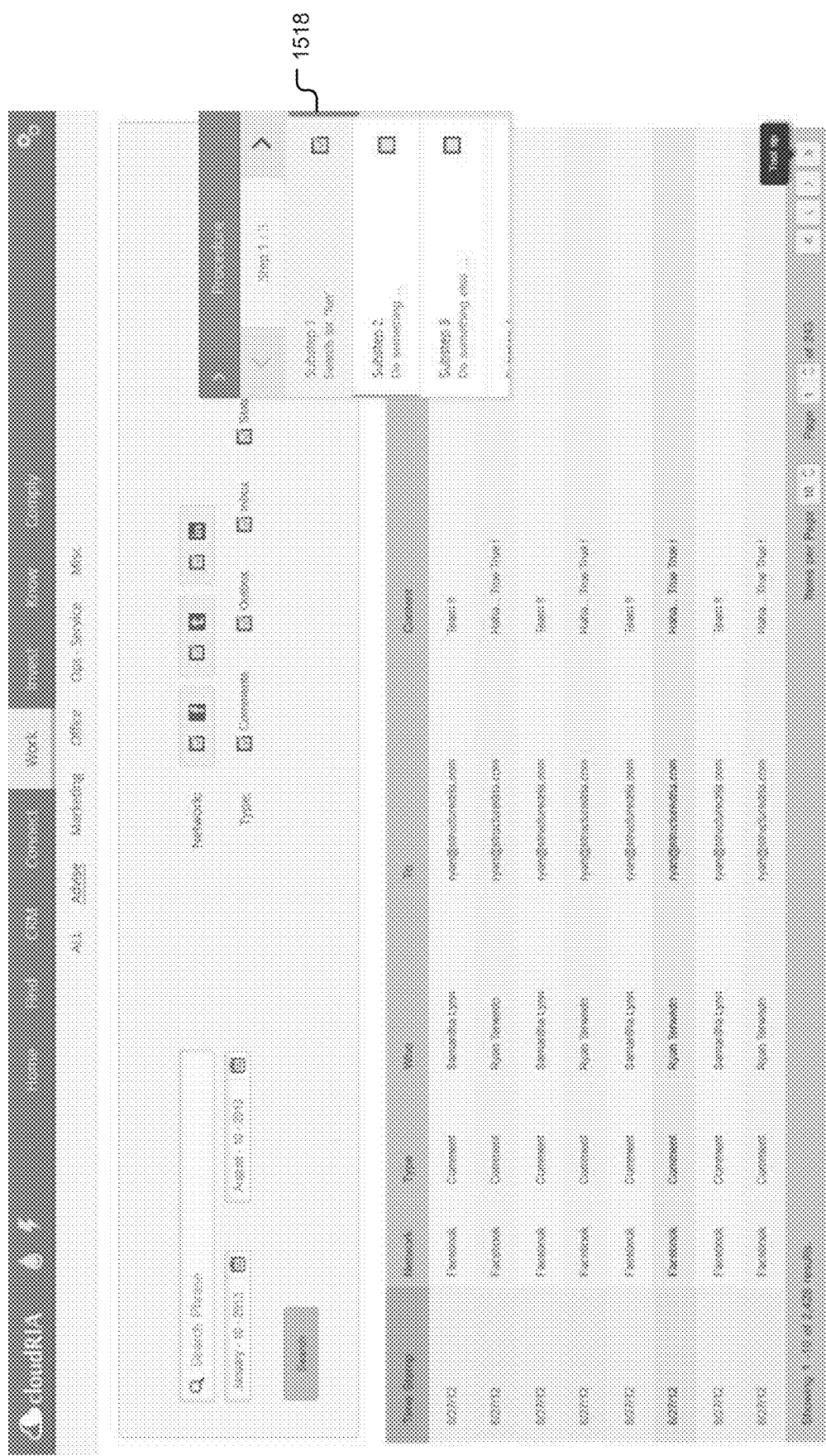

FIG. 15D illustrates a user's completion of a substep 1518, such as "Substep 1," which is marked complete by the user via a check box. A user may complete a substep 1518 by performing the contextual instructions of the substep 1518, such as "Search for fun."

Figure 15E:
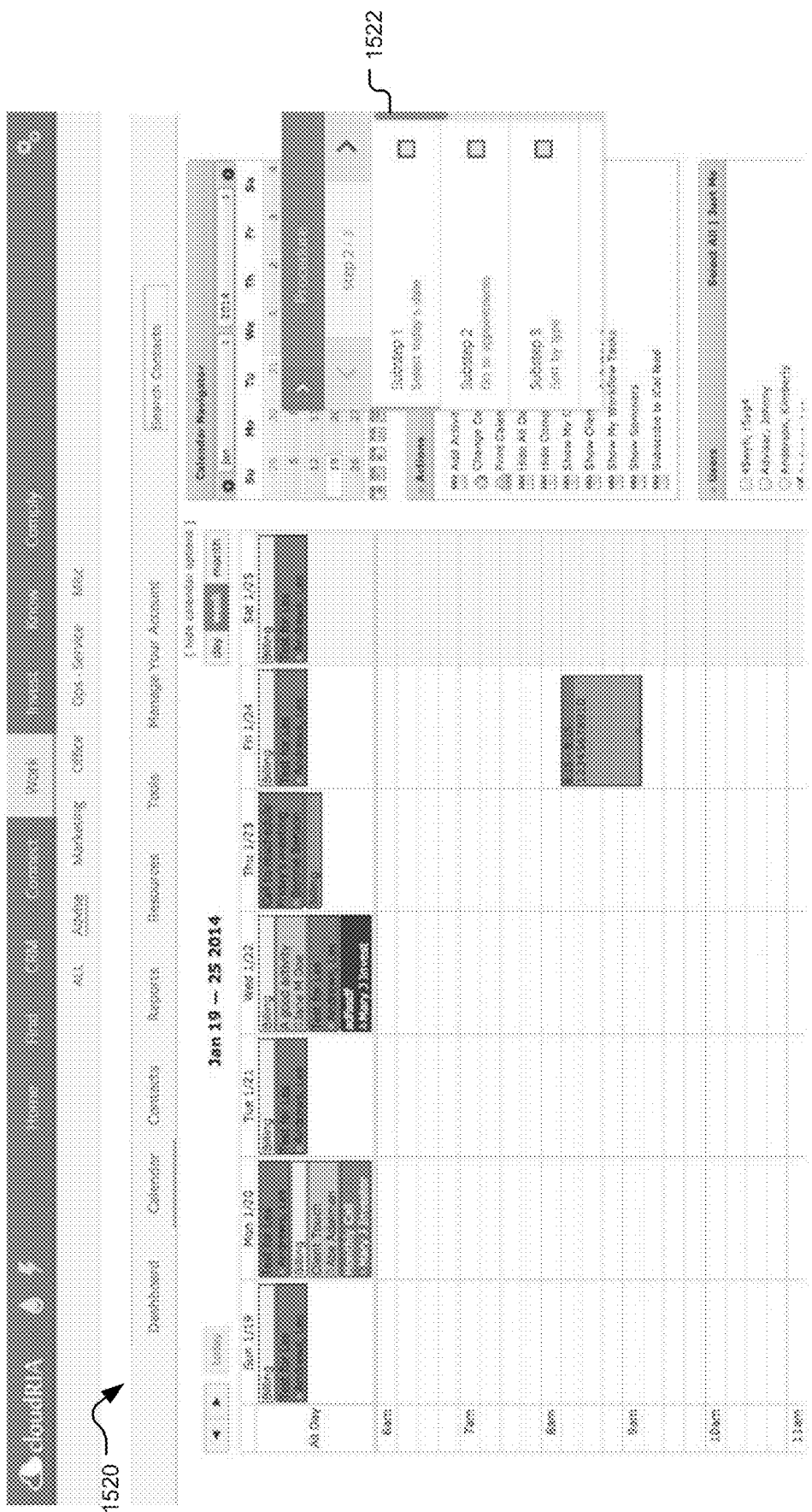

FIG. 15E illustrates the display to the user of a next step of a workflow, such as a second step 1520. A next step of a workflow may be displayed after a previous step of a workflow has been completed, which may include completion of substeps of a previous step. A Procedure dialog box 1522 may display any applicable substeps for a step, such as the substeps for second step 1520. In some embodiments, the Procedure dialog box 1522 may be repositioned by the user.

Figure 15F:
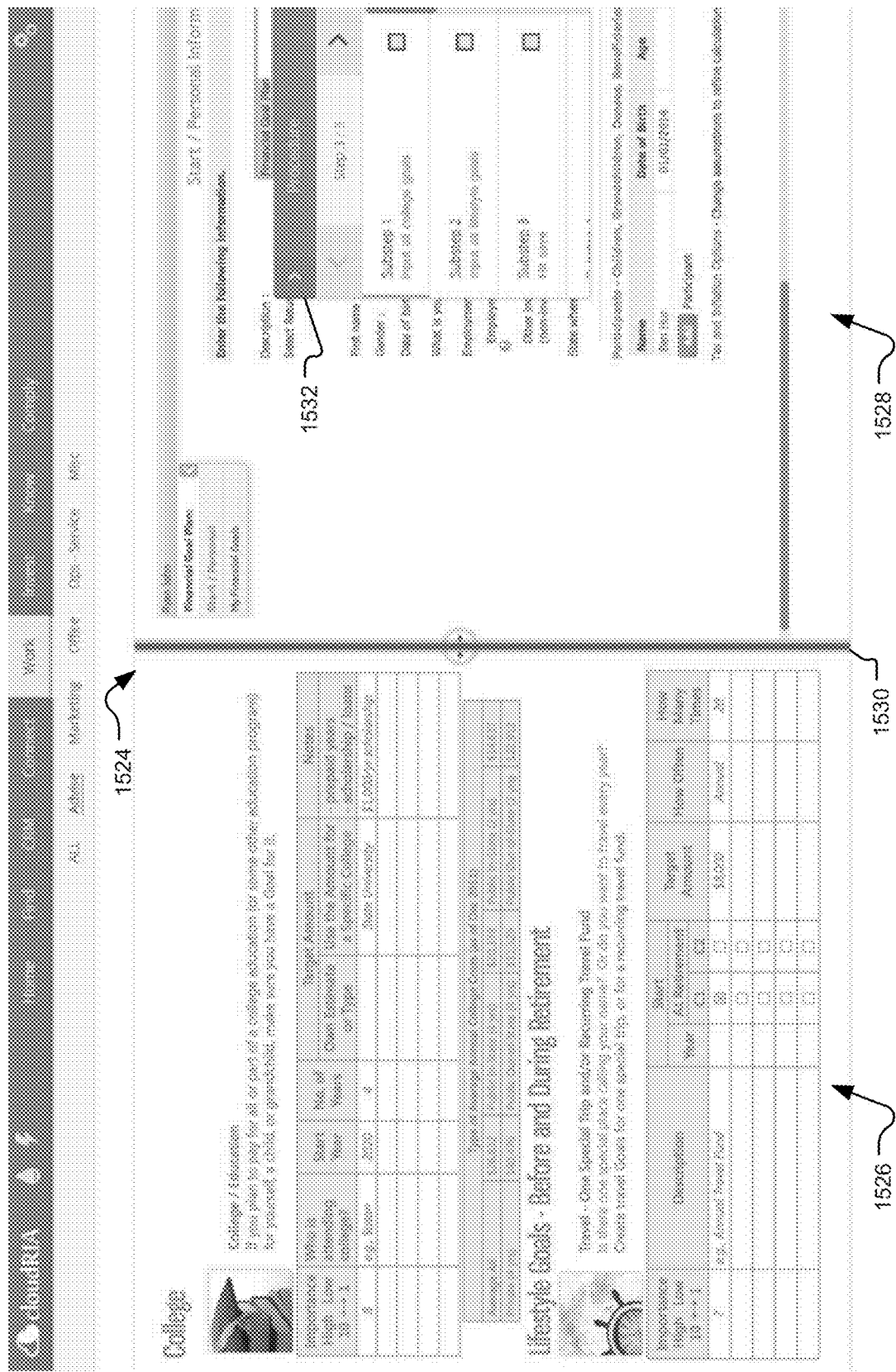

FIG. 15F illustrates the display to the user of a next step of a workflow, such as the third step 1524, which as illustrated is a multitask step. In the illustrated embodiment, the multitask step 1524 comprises two of applications and modules, such as application 1526 and application 1528, separated by a split screen bar 1530. The user may interact with either displayed application 1526 or displayed application 1528, and may resize or reposition one or both of the application 1526 and the application 1528. In the illustrated embodiment, when there are substeps associated with a multitask step, then the substeps may be displayed to the user, such as a Procedure dialog box 1532 that displays the applicable substeps. It is to be understood that the Procedure dialog box 1532 may hover over the multitask step and may be moved by the user. Furthermore, a substep may be applicable to the application 1526, the application 1528, or both applications.

Figure 15G:
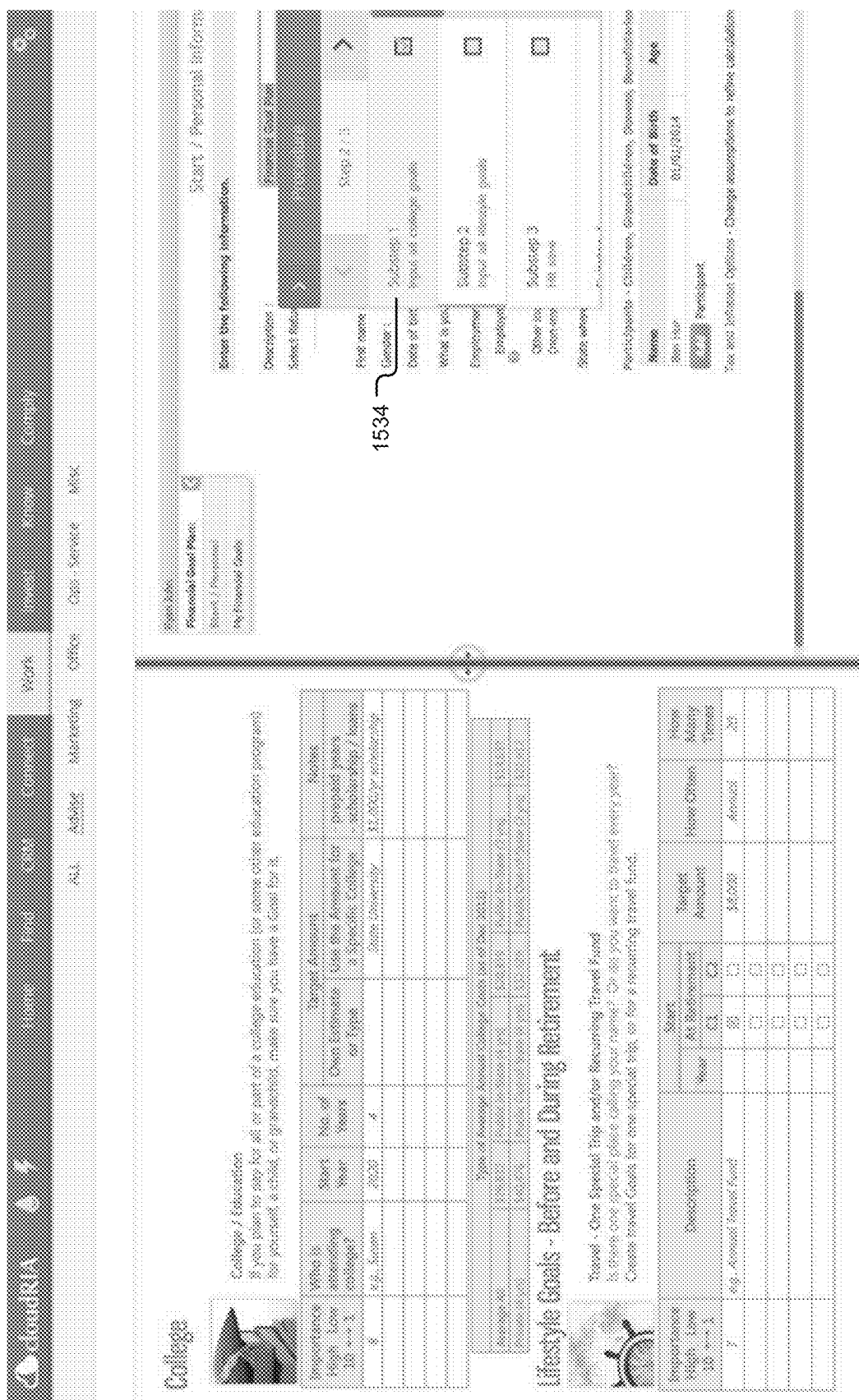

FIG. 15G illustrates a user's completion of one or more substeps of Procedure box 1534, such as "Substep 1," which is marked complete by the user via a check box. A user may complete a substep 1534 by performing the contextual instructions of the substep 1534, such as "Input all college goals."

Figure 15H:
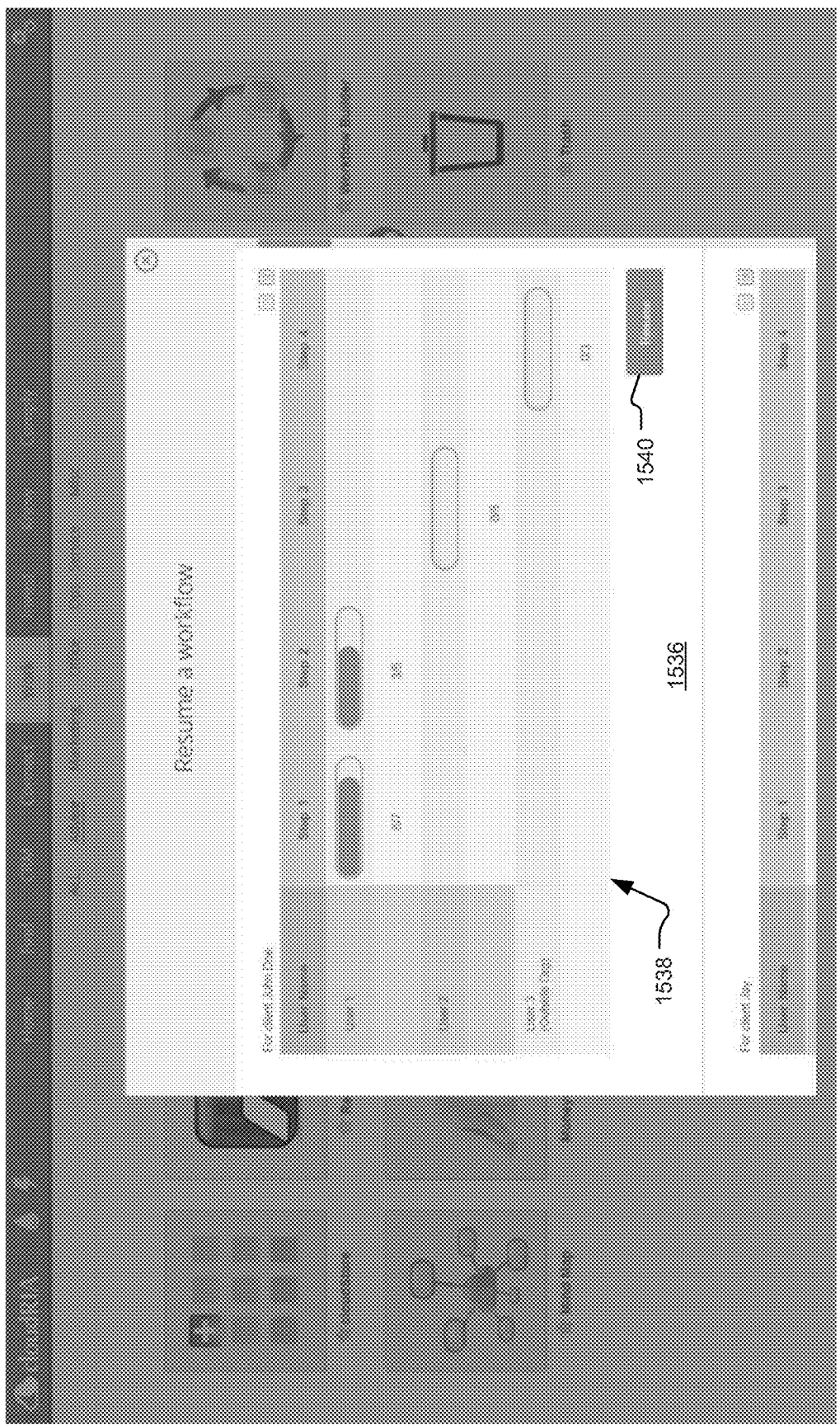

FIG. 15H illustrates a dialog box 1536, which may be displayed after a user has clicked the resume context button 1506 shown in FIG. 15A, which may cause an existing instance of a workflow to launch. For example, if a workflow comprises four steps, and if a user has completed the first two steps, the user may resume the workflow at the third step, which would be the next step to be completed. In the illustrated embodiment, a workflow status indication 1538 is displayed for an instance of a workflow named "For client John Doe." In the illustrated embodiment, the workflow has four steps, with the first step having seven substeps, the second step having five substeps, the third step having eight substeps, and the fourth step having three substeps. A step may be assigned to a user inside or outside of an organization, and in the illustrated embodiment, the first and second steps are assigned to User 1, the third step is assigned to User 2, and the fourth step is assigned to User 3 who is outside of the organization. A step may be partially completed based on whether substeps have been completed. In the illustrated embodiment, six of the seven substeps of the first step are completed, and three of the five substeps of the second step are completed while none of the substeps of the third and fourth steps are completed. In the illustrated embodiment, a user may choose which instance of a workflow to resume by clicking the applicable Resume button 1540 to resume that instance of a workflow.

Figure 15I:
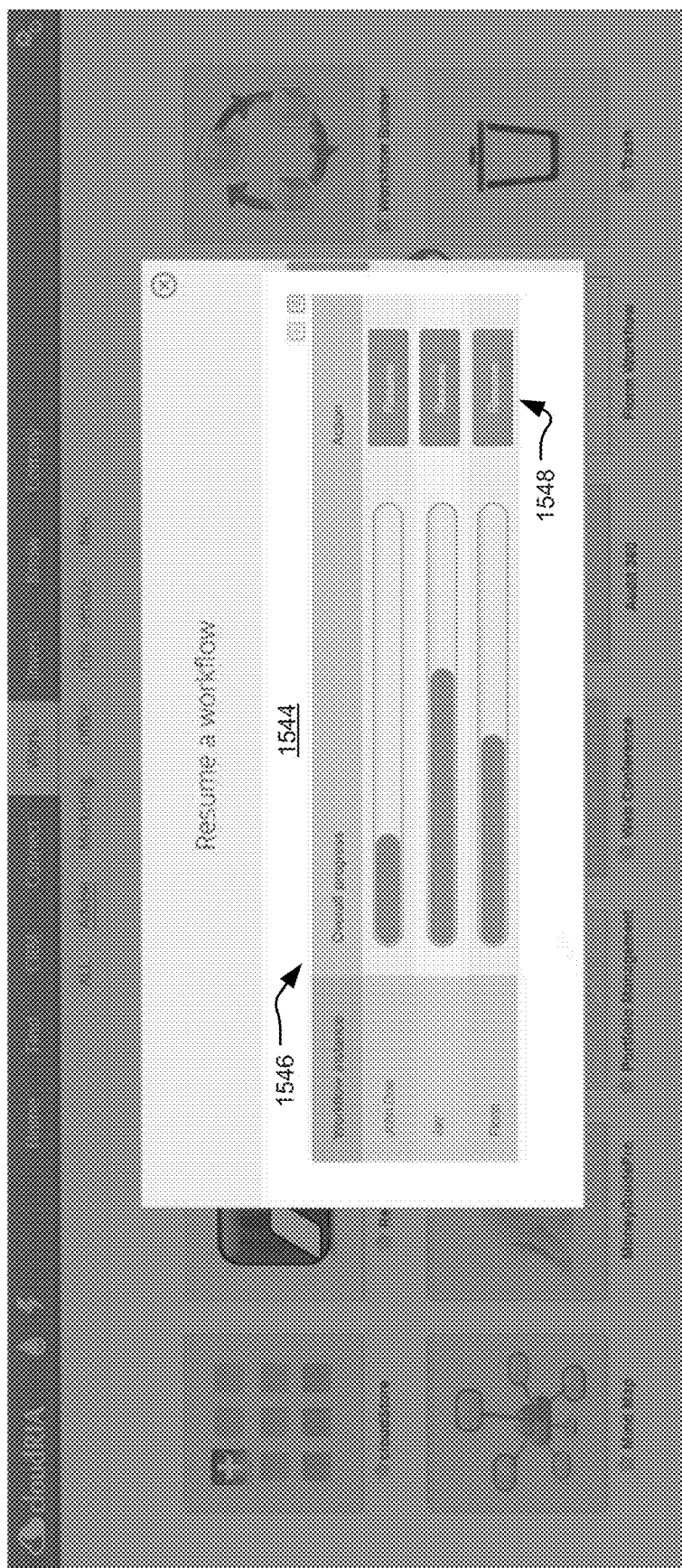

FIG. 15I illustrates an alternative dialog box 1544, which may be displayed after a user has clicked the resume context button 1506 shown in FIG. 15A. In the illustrated embodiment, there are three workflow instances 1546 that have previously been started, and each instance of a workflow may be partially or fully complete. A user may choose which instance of a workflow to resume by clicking the respective resume button 1548 of the workflow instance.

FIGS. 16A-16F illustrate alternative workflow creation, in accordance with embodiments of the present invention.

Figure 16A:
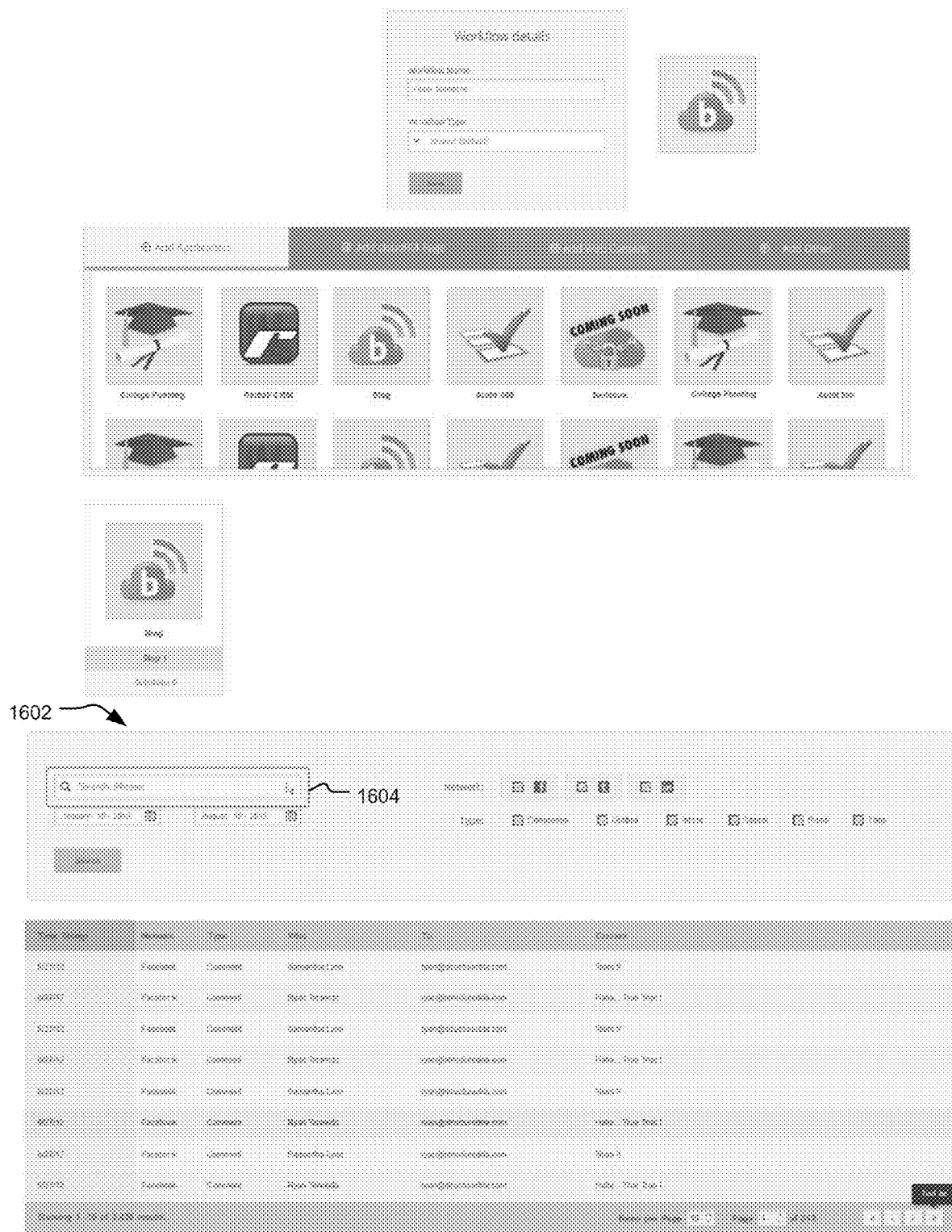
FIGS. 16A-16F illustrate alternative workflow creation, in accordance with embodiments of the present invention.

FIG. 16A illustrates a workflow builder interface, in accordance with embodiments of the present invention. In the illustrated embodiment, a user may have selected the icon 1426, as illustrated in FIG. 14E, which may cause the application 1602 to display, similar to the application 1430 shown in FIG. 14F. Under this embodiment, a user may select a portion of the application 1602 to which a substep would be created and applied, for example the "Search Phrase" field 1604.

Figure 16B:
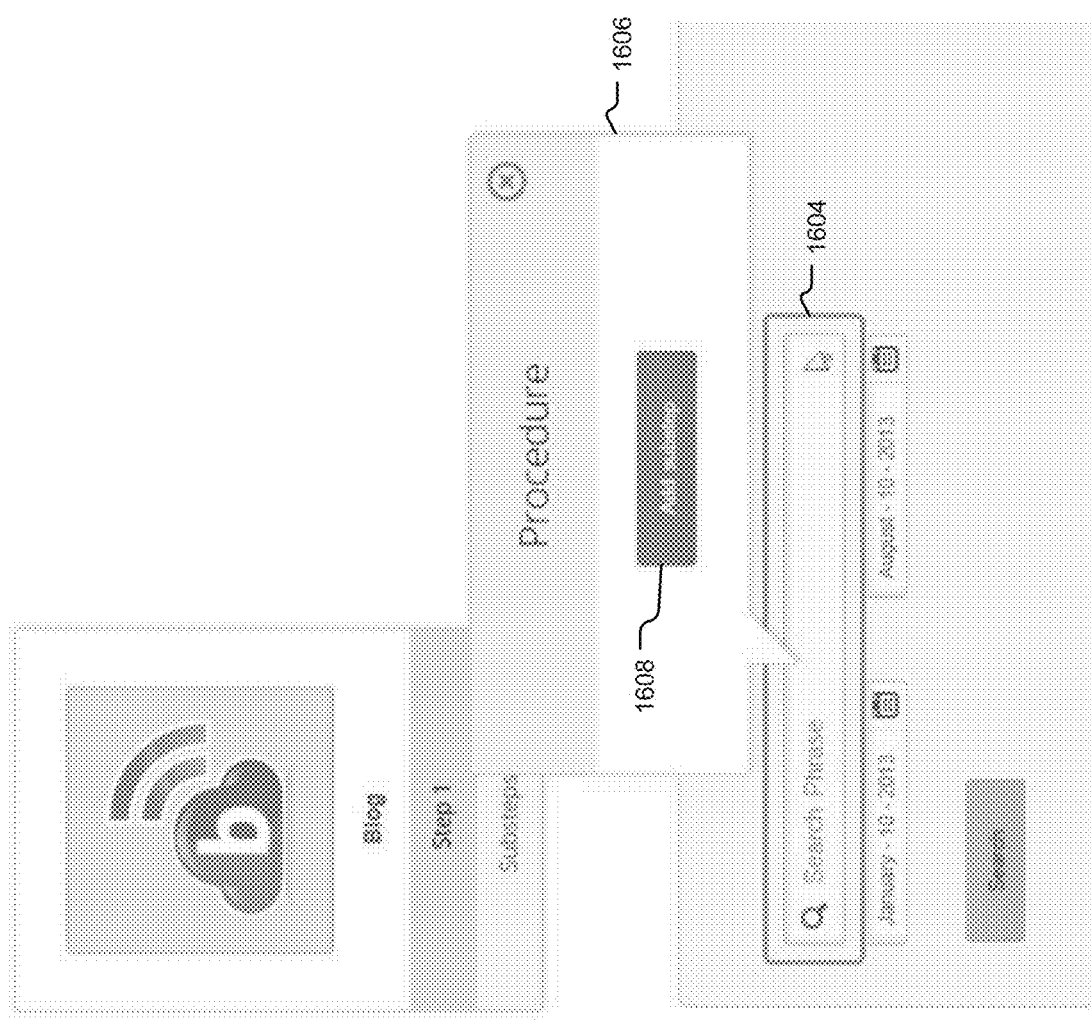

FIG. 16B illustrates a workflow builder interface, in accordance with embodiments of the present invention. In the illustrated embodiment, a user may have selected a portion of the application such as a Search Phrase field 1604, which may cause a Procedure box 1606 to display. The user may click an Add Substep button 1608 in order to associate a substep with the field 1604.

Figure 16C:
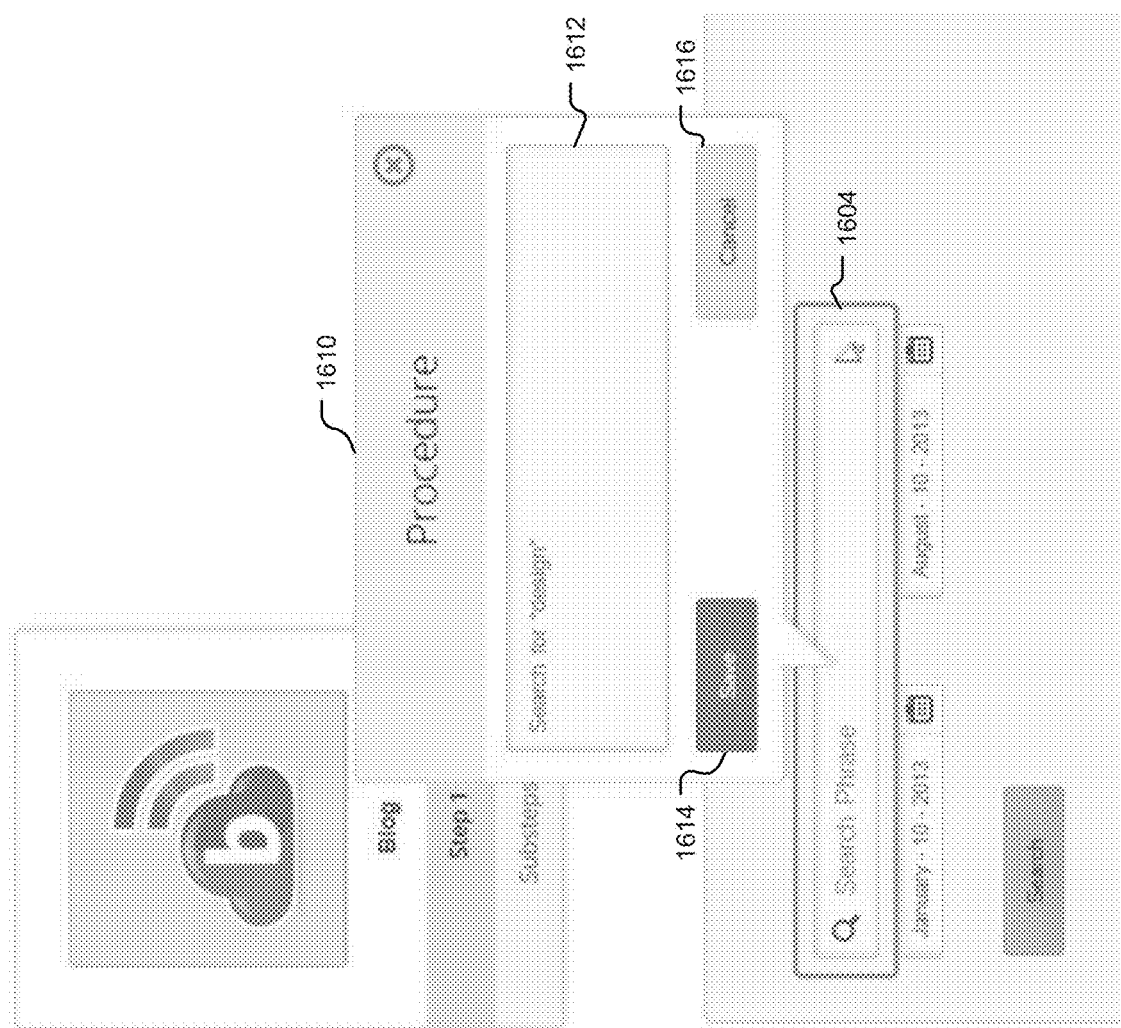

FIG. 16C illustrates a workflow builder interface, in accordance with embodiments of the present invention. In the illustrated embodiment, a user may have clicked the Add Substep button 1608 shown in FIG. 16B, which may cause the user to be prompted to enter text related to a substep, such as user instructions. In the illustrated embodiment, a Procedure dialog box 1610 may display with a text field 1612. For example, the substep text may be "Search for design." These substep instructions may be associated with the field 1604, such that when the workflow is launched, these contextual instructions are displayed proximate to the field 1604. Such may be advantageous to assist the user interact with the displayed application. In some embodiments, a user may save the substeps by clicking the Save button 1614. In some embodiments, a user may cancel the addition of a substep by clicking the Cancel button 1616.

In some embodiments, the Procedure dialog box 1610 may receive instructions to automatically perform an action on the application or module, such as populate a field, click a button, submit a form, and any other user interaction that is desired to be mimicked through automatic actions. For example, if a substep of a workflow requires the input of a specific search term, the specific search term may be automatically entered and the user can be automatically taken to the next substep of a workflow.

Figure 16D:
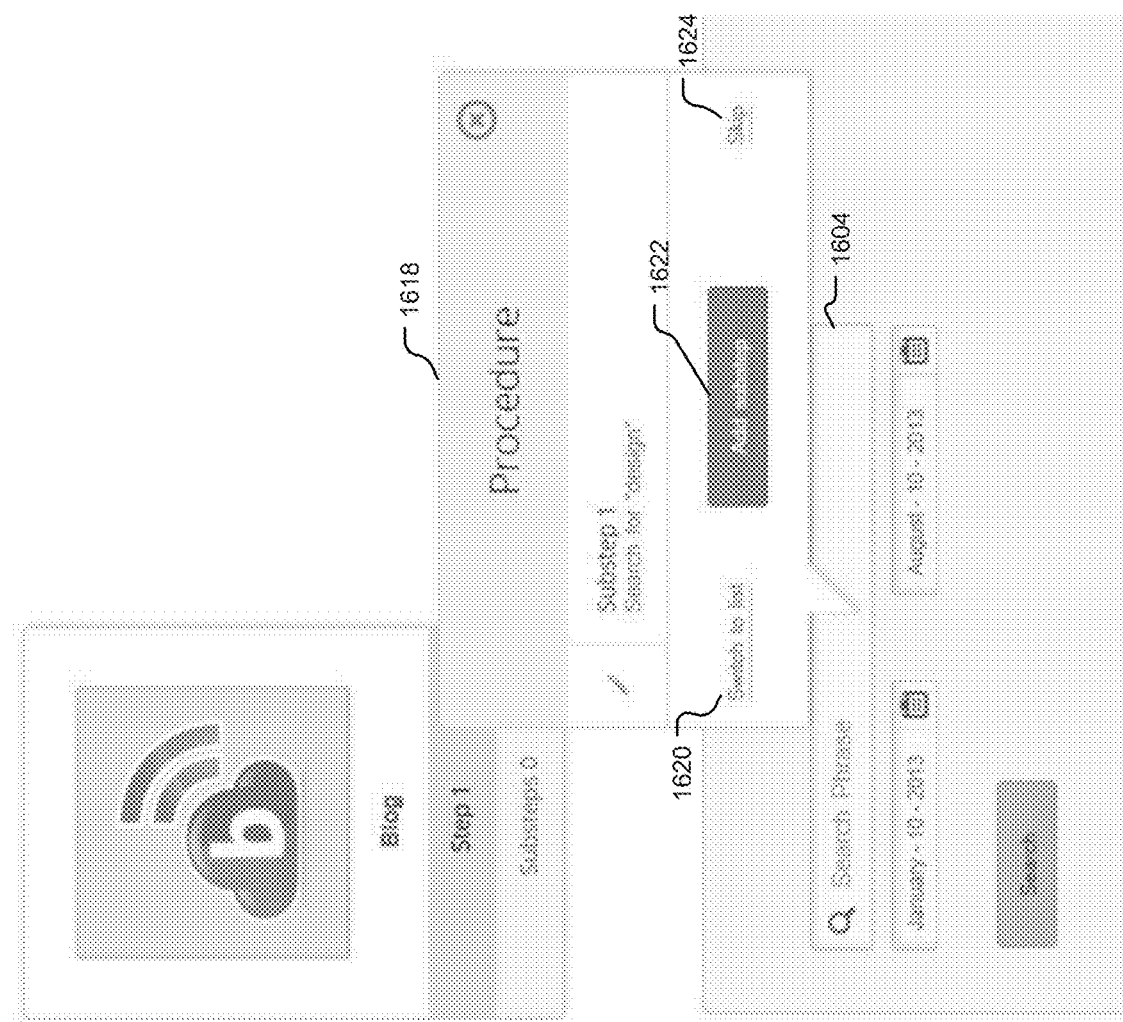

FIG. 16D illustrates a workflow builder interface, in accordance with embodiments of the present invention. In the illustrated embodiment, a user may have clicked the Save button 1614 shown in FIG. 16C, which may cause a Procedure dialog box 1618 to display. The Procedure dialog box 1618 may prompt a user to add a next step, by displaying the Add Substep button 1622. The Procedure dialog box 1618 may also prompt the user to click a Switch to List link 1620, which may display the saved substeps in a list view. A user may also be prompted to skip a substep via a Skip link 1624.

Figure 16E:
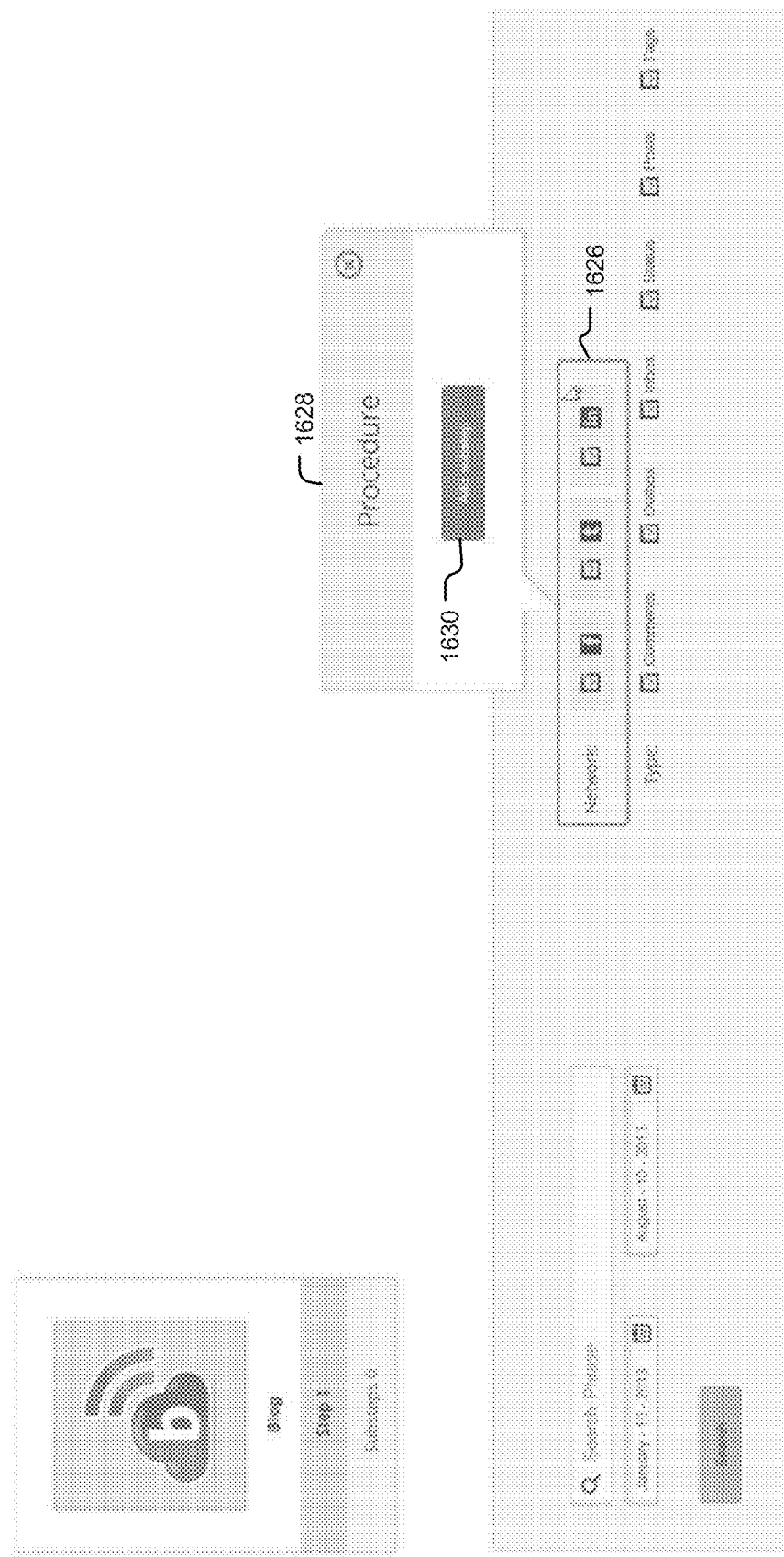

FIG. 16E illustrates a workflow builder interface, in accordance with embodiments of the present invention. In the illustrated embodiment, a user may have clicked the Add Substep button 1622 shown in FIG. 16D and selected a portion of the application such as the Network fields 1626 to associate a substep, which may cause a Procedure box 1628 to display. The user may click an Add Substep button 1630 in order to associate a substep with the field 1626.

Figure 16F:
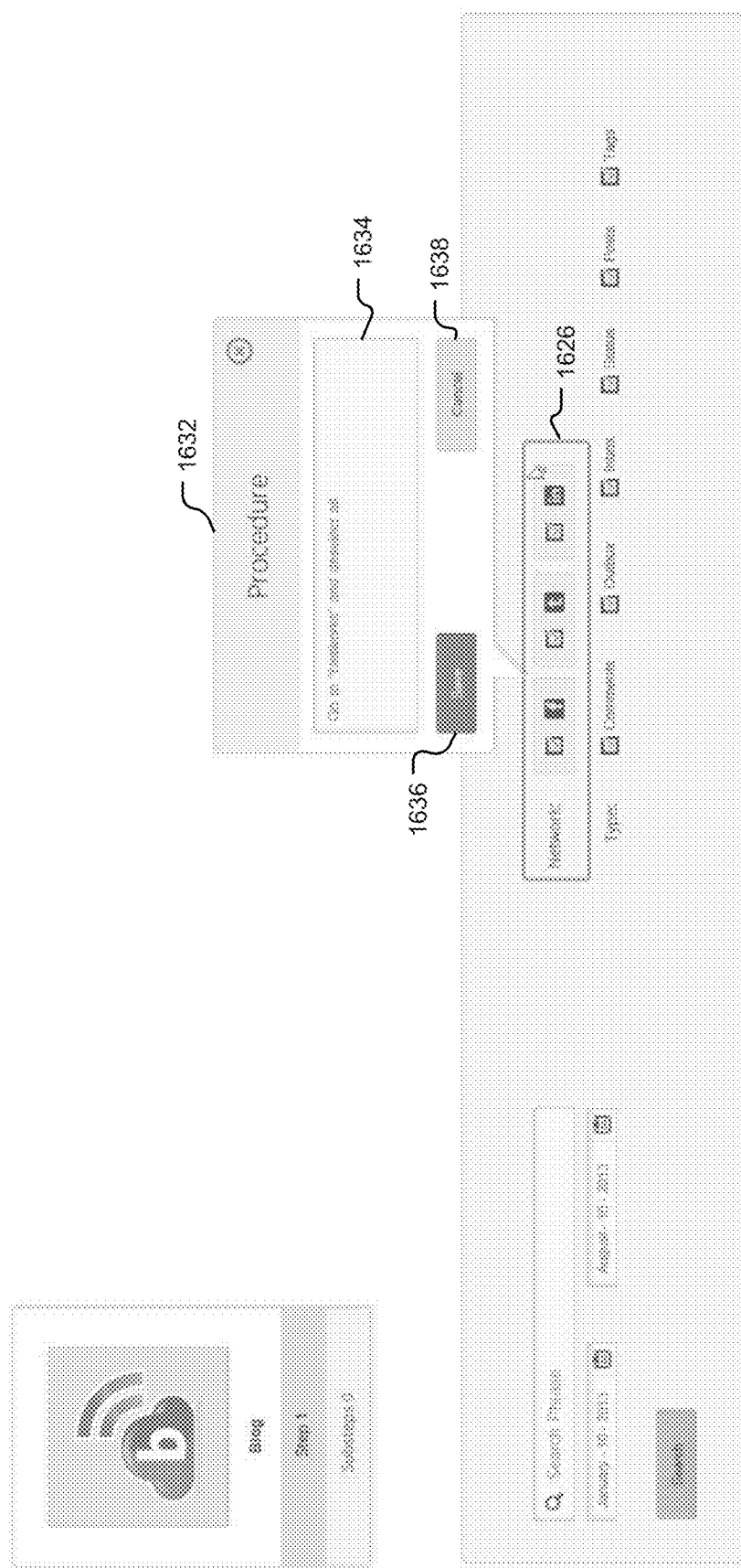

FIG. 16F illustrates a workflow builder interface, in accordance with embodiments of the present invention. In the illustrated embodiment, a user may have selected the button 1630 shown in FIG. 16E, which may cause the user to be prompted to enter text related to a substep, such as user instructions. In the illustrated embodiment, a Procedure dialog box 1632 may display a text field 1634. For example, the substep text may be "Go to Networks and deselect all." These substep instructions may be associated with the field 1626, such that when the workflow is launched, these contextual instructions are displayed proximate to the field 1626. In some embodiments, a user may save the substeps by clicking the Save button 1636. In some embodiments, a user may cancel the addition of a substep by clicking the Cancel button 1638.

Figure 17:
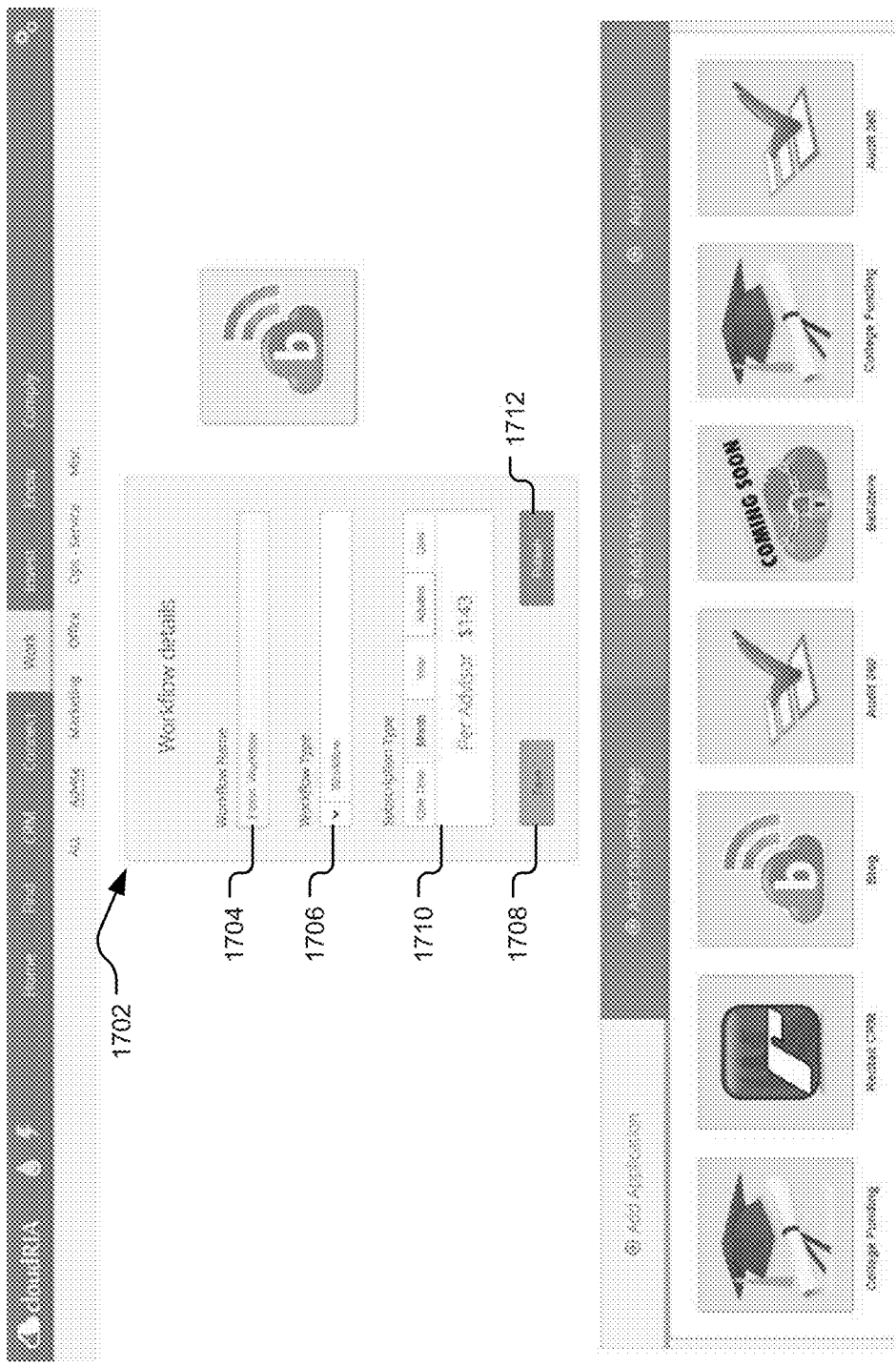
FIG. 17 illustrates additional workflow creation, in accordance with embodiments of the present invention.

FIG. 17 illustrates additional workflow creation, in accordance with embodiments of the present invention. In some embodiments, after a user clicks the workflow builder icon 1402 illustrated in FIG. 14A or edits a workflow, a workflow details section 1702 may display. The user may be prompted to enter a name for the workflow in the workflow name field 1704. Next, the user may be prompted to enter a type of the workflow in the workflow type field 1706. The user may save the workflow details by clicking on the Save button 1708. In the illustrated embodiment, a user may be prompted to publish a workflow to other users. For example, a user may choose to sell the workflow on a subscription basis for a fee. In some embodiments a subscription type may be One Time, Month, Year, Advisor, or User. As illustrated in FIG. 17, a user was prompted for a subscription type in Subscription Type dialog box 1710 for a monthly subscription per adviser at $143. The user may be prompted to publish the workflow under the subscription via a Publish button 1712.

Icon Configuration

In accordance with embodiments of the present invention, color coding may be used to indicate different types of information regarding the icons displayed in the application interface portal 200. For example, different background colors may be used to specify application types, e.g., a blue icon background may represent a software application, a purple icon background may represent a web page or web application, and a gray icon background may represent a page for modifying application settings. According to some embodiments, the color coding may indicate the functionality or status of the applications and modules of the applications.

In other embodiments, the icons associated with workflows may change colors depending on a status of the associated workflow or application. A workflow may be associated with one or more deadlines, which can be triggered based on the passage of time or distance from a deadline or upon the occurrence of some predetermined event. By changing the color of the workflow icon, the user can be quickly informed as to the status of that workflow and the need for the user to initiate the workflow. In some embodiments, a red color may indicate a workflow stage that is overdue, a yellow color may indicate a deadline for a workflow stage that is approaching, and a green color may indicate a default status of the workflow. According to some embodiments, the color coding may shift steps in the workflow. For example, a red color may indicate a workflow stage that is overdue—and also that a different subsequent user response is required because of the overdue status of the workflow stage. It is to be understood that color coding may be applied to any icon, for example, based on type or category. In some embodiments, applications may comprise a blue color, web pages may comprise a purple color, place holders may comprise a brown color, settings may comprise a grey color, and web content may comprise a pink color.

For example, an auditing workflow may need to be run by the user once per month. The system may be configured to change the color of the workflow icon (such as the entire icon or a background of the icon) for that auditing workflow process depending on the status of next deadline for running that workflow. If the workflow does not need to be run within the next 7 days, the icon may be green, which would indicate to the user that no action is urgently needed. When the deadline for the audit is within 7 days, the icon may change to yellow, which indicates to the user that the deadline for the audit is approaching. When the deadline for the audit is past due, the icon may change to red, which indicates that the audit deadline is overdue.

In some embodiments, workflows may be provided with special permissions, as may be required by regulatory requirements or company policy. For example, in some embodiments an audit workflow can only be edited by an administrator and cannot be edited by the users who run the audit workflows. In other embodiments, a user may create private workflows that can only be accessed by that user, unless the user leaves the company. In that case, the user's supervisor or other administrator of the system may reassign the workflow to another user.

In other embodiments, the icon may be altered in different ways to indicate a status of the icon. For example, the image associated with the icon may change, or another image (such as an exclamation point or star) may be overlaid onto the default icon to indicate the status or urgency. If an icon is stored within a folder with other icons, then the folder color may also change to reflect the color change of an icon contained inside. Embodiments of the present invention may provide various advantages not provided by prior art systems. For example, the application interface portal may provide a user with a single interface for accessing a plurality of applications and web content, regardless of where those applications are hosted and on what operating system. In addition, the application interface portal may provide users with a way to easily create workflows that can be used to automate routine tasks.

The icons may be displayed in any of a variety of forms supportable by the web browser displaying the portal. In examples described herein, the icons are displayed as static two-dimensional images, similar to the way in which icons are conventionally displayed in GUI OS interfaces. Alternatively, the icons may comprise three-dimensional images, animated images, or other multimedia type. For example, the icon may be an embedded video clip and/or may include an audio clip to provide improved accessibility for users with vision impairment. The interaction of the icon with the user may vary as well. In some embodiments, an icon image may be displayed in the portal as a shaking image to indicate a status of the icon (e.g., that the icon has been selected or can be interacted with for some purpose). In other embodiments, the icon status may be indicated by an increase or decrease in the icon image's size, or by generating an audio notification.

In yet other embodiments, information related to the application associated with an icon may be displayed as part of the icon. For example, an icon associated with an email application may display the number of unread email messages, similar to the notifications provided in other mobile operating systems, such as iOS or Android. In other embodiments, the icon may display more information than can be displayed in a static image. For example, an icon image may include as a scrolling feed of stock market price information. This may be desirable for an icon associated with a stock market trading application. In other embodiments, the icon may change upon the occurrence of an event or other specified condition. For example, if a previously identified stock has changed by a predetermined amount, then the icon may change colors, animate, display a notification balloon or image, and/or generate an audio notification. In yet other embodiments, the icon may provide a live feed of a stock market chart or numerical information (e.g., dollar value change, percentage value change, etc.). In yet other embodiments, the occurrence of an event or other specified condition may trigger the automatic launch of a workflow or application, either immediately or upon the user's next interaction with the portal or application.

In yet other embodiments, haptic feedback may be provided to the user, such as a vibration of smartphone, tablet, or other mobile computing device, or vibration of an input device, such as a mouse, touchpad, or keyboard. This feedback may be used in place of or in addition to the icon image changes described above.

In yet other embodiments, the user may interact with the icons in three-dimensional space. For example, the icon may be represented by a multi-sided object (e.g., a six-sided cube), with each side providing a different function or type of information. The user may be able to manipulate the icon in three-dimensional space to interact with the different sides. The manipulation may occur using, for example, a mouse or motion detection system, to rotate the icon to display the side of interest. For example, one side of the icon may display the stock price for a particular stock, a second side may display the price of an index, and a third side may display a stock chart. The user may rotate the icon in the portal to display the information of interest. Each side of the icon may represent a "widget", a graphic, or a video, and with or without notifications on each side. Each side may be associated with alerts or workflows related to the other sides or unrelated to the other sides of the icon. Similar interactions may also be provided in two-dimensional space.

Application Management

FIG. 10 illustrates an application management portal 1000 that may be utilized by users to select the applications that are displayed in the user's default Home application interface portal 200*a*. As described above, the applications associated with each icon are links to web pages preconfigured to provide the web application or software application associated with that icon. The application management portal 1000 displays to users the complete list of application icons 1010*a*-1010*i* that may be added to the users' Home portal 200*a*, much like the application stores or other digital application distribution systems used with many smartphones and tablets. However, in a conventional application store, when a user selects an application for purchase, the executable files for running that application are downloaded onto the user's device. In contrast, in the illustrated embodiment, the executable files are not downloaded onto the user's device. A system administrator has already preinstalled the application on one of the servers 120 and preconfigured the hidden web page link to that application. In some embodiments, the system provides information 1012 about a web application or software application to a user. The information 1012 may facilitate the user's decision whether to display the associated icon on the user's default Home application interface portal 220*a*. In some embodiments the information 1012 may be customized by an administrator to feature an application.

When a user selects one of the application icons 1010*a*-1010*i* from the application management portal 1000, the system merely adds the icon image and associated hidden web page link to the user's Home application interface portal 200*a*. In some embodiments, the preinstallation of the application may comprise embedding a portion of the application into another web page, establishing a connection to the application, or preconfiguring an existing application for use by the users. This can dramatically simplify the distribution of applications to users in an enterprise. In some embodiments, the application management portal 1000 may be a store, in which applications, services, and websites may be purchased. In some embodiments, the icons 1010*a*-1010*i* may be viewed based on a user's selection of a type or a category. For example, dialog box 1014 illustrates a prompt for a user to view by a category such as Advice, Marketing, Office, Operations—Services, and Miscellaneous.

The preconfiguration of the web page linked to the application icon may be performed in a variety of ways. For example, if the application is a third party application running on a desktop or web application server, the hidden web page may be preconfigured to display a portion of the third party application interface within the portal interface or display the entire third party application interface within the portal interface. The third party application interface may be displayed either exactly as delivered by the third party application in a native style, or restyled to match the portal style. Such may enable a user to choose the visual display of disparate systems that do not natively provide for such display.

Multitasking

FIGS. 11A-11B illustrate different methods of enabling users to interact with multiple applications simultaneously. In FIG. 11A, a multitasking portal 1100 is shown. In this portal 1100, a user is interacting with a first web application (e.g., Report Creation application 1104). When the user clicks on the multitask button 1102, a second application multitask window 1110 appears alongside the first application 1104. This multitask window 1110 can be resized using preset size selection links 1114 to fill, for example, ⅓, ½, or the full browser window. In addition, a resizing handle 1116 may be provided to enable the user to adjust the size of the window 1110 to any desired width.

When the multitask window 1110 is first opened, the window 1110 will contain a list of icons or applications that can be launched in that window 1110. In the illustrated embodiment, an Encrypted File Send application 1120 is running in the multitask window 1110 simultaneously with the Report Creation application 1104. The multitask window 1110 can also be turned off by clicking the close button 1118. This would terminate the user's session with the application running in the window 1110. Alternatively, the portal 1100 may be provided with a "collapse" or "hide" button that would collapse the window 1110 from view in the browser, but maintain the application 1120 running in the background.

FIG. 11B illustrates another embodiment in which the user has multiple computer monitors 1130*a*-1130*b*. In this embodiment, the second application multitask window 1140 can be launched in a separate browser window that is displayed on the second monitor 1130*b*. This embodiment can also be used with a single monitor 1130*a* displaying multiple applications running in separate browser windows.

Website Archival

Figure 12:
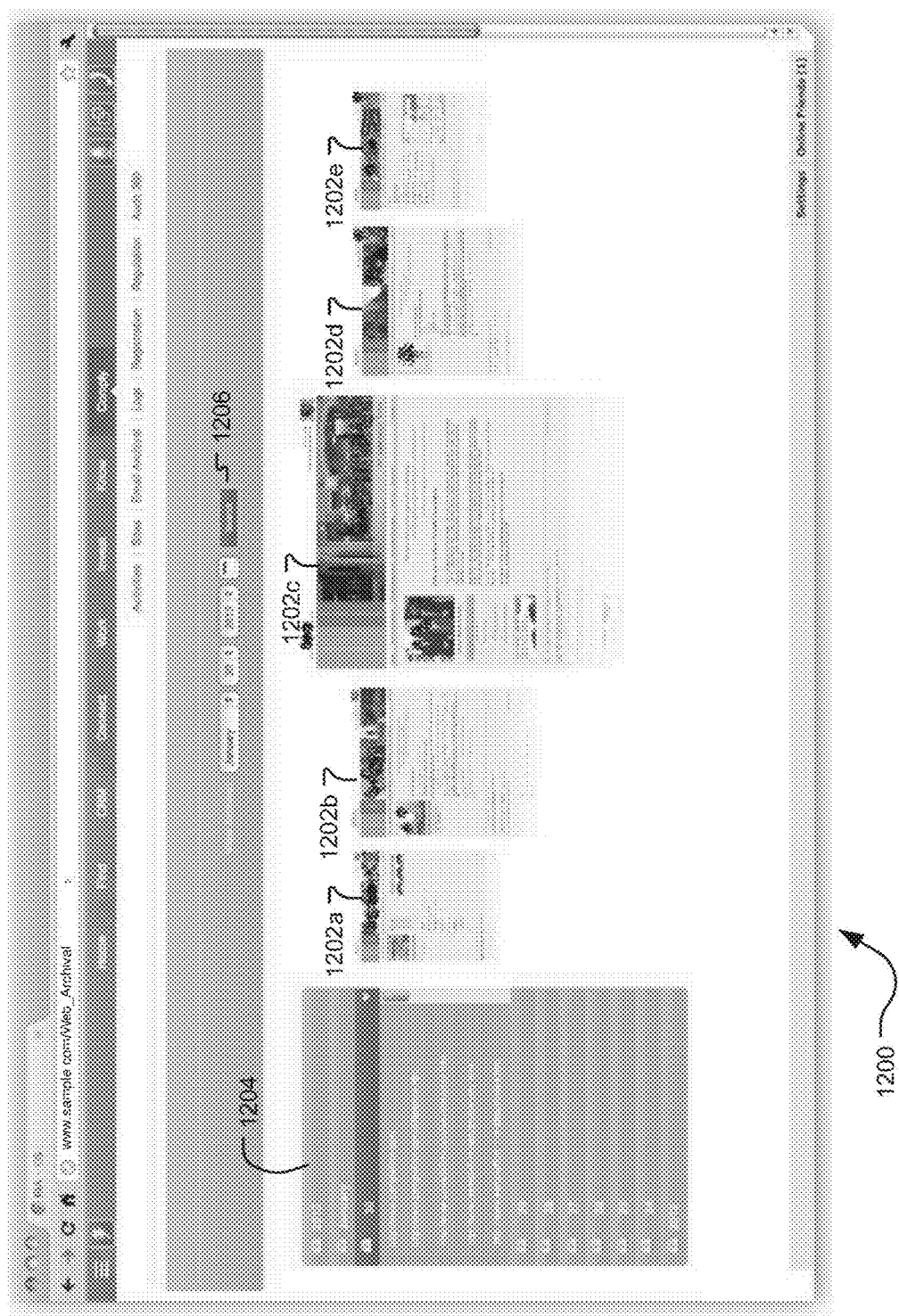
FIG. 12 illustrates a website archival application in accordance with embodiments of the present invention.

FIG. 12 illustrates a website archival application 1200 in accordance with embodiments of the present invention. In order to satisfy compliance requirements, many organizations are required to maintain accurate records of that organization's website. The storage of historical web pages and the ongoing need to constantly monitor those web pages for changes can be overwhelming and require a considerable amount of data storage capacity.

In accordance with embodiments of the present invention, a user can enter a URL into the website archival application 1200, and a monitoring application running on a server (e.g., server 120*a* in FIG. 1) can periodically retrieve the web page associated with that URL and save a static image 1202*a*-1202*e* of that web page. This image can be, for example, in a PNG or JPG image file format. In addition, the complete contents of the web page can also be saved, and on a predetermined schedule (e.g., once per day, once per week, once per month, etc.), the server 120*a* can retrieve the current web page and compare it to all of the stored information from the previously-archived page. If no changes are detected in the web page contents, then there is no need to save a new image 1202 of that page for the later date. Instead, the system can merely save a pointer to the image 1202*a* from the previous date. When reviewing the archived web pages, the user may navigate to a particular date using the archive menu 1204 or date selector 1206. If the web page for the selected date is unchanged from the previous date, then the system will merely retrieve the same image for the first date 1202*a* and the second date 1202*b*, but present that as the archived web page for both dates.

If the system detects a change in the web page contents, then a new web page image 1202*c* is created and stored for that date. The complete contents from the previous web page may be deleted and replaced with the complete contents of the most current web page. In this way, the amount of data storage capacity for storing web page images can be reduced to only that amount necessary to capture changes in the web pages.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of managing sources, comprising:
   identifying, by at least a first server, a first source at a first source server different from a first client computing device;
   determining, by at least the first server, first instructions effective to cause the first client computing device to execute first client-side code causing modification of code of the first source, wherein the first instructions are associated with the first source;

sending, by at least the first server, the first instructions to the first client computing device, wherein execution of the first instructions cause the first client computing device to execute the first client-side code causing the modification of code of the first source, wherein an application of the first client computing device executes a first modified version of the first source that modifies at least one of a first functionality or a first appearance of the first source, wherein the modification of the code of the first source is not initiated, natively styled, and natively supported by a first entity controlling the first source, and wherein the first modified version is different than the first source.

2. The method of claim 1, further comprising causing the application to display data retrieved from the first source in a first format different than a second format delivered by the first source.

3. The method of claim 1, further comprising causing the application to display menu options corresponding to at least one menu option of a first native user interface of the first source in a reconfigured menu format different than a native menu format delivered by the first source.

4. The method of claim 1, further comprising causing the application to display less than all of a first native user interface delivered by the first source for display by the browser application.

5. The method of claim 1, further comprising causing the application to display a first reconfigured view of the first source with a second reconfigured view of the second source.

6. The method of claim 1, wherein said causing the second source to be launched comprises:
causing, by at least the first server, the application on the client computing device to transmit login information to a remote authentication server; and
transmitting, by at least the first server, commands to the remote authentication server to launch the second source.

7. The method of claim 6, further comprising:
determining, by at least the first server, that the remote authentication server requires a dynamic variable or static variable for authentication of the client computing device;
receiving, by at least the first server, the dynamic variable or the static variable from the client computing device; and
transmitting, by at least the first server, the dynamic variable or the static variable to the remote authentication server.

8. The method of claim 1, further comprising, in response to receiving a first user input indicating creation of a new workflow, initiating creation of a workflow icon associated with a workflow process.

9. The method of claim 8, wherein said workflow process comprises launch of a third application associated with a first application icon and a fourth application associated with a second application icon.

10. The method of claim 9, further comprising:
in response to receiving a second user input indicating that a user of the application has dragged the first application icon to the second application icon, causing the application to display a prompt to select creation of a folder or creation of a workflow; and
wherein said first user input is received in response to said prompt.

11. The method of claim 10, further comprising transmitting to the application a workflow editor interface, said workflow editor interface configured to receive user inputs regarding the workflow process.

12. The method of claim 11, wherein said workflow editor interface is configured to receive user inputs corresponding to identification of a plurality of software applications and selection of a sequence of launching said plurality of software applications.

13. The method of claim 12, wherein said workflow editor interface is configured to receive user inputs corresponding to identification of said plurality of software applications and web content, and receive user inputs corresponding to selection of the sequence of launching said plurality of software applications and retrieving said web content.

14. The method of claim 12, wherein said workflow editor interface is configured to receive user inputs corresponding to selection of application icons into a desired sequence of launching said plurality of software applications.

15. The method of claim 14, further comprising in response to receiving a user selection of the workflow icon, initiating said workflow process, wherein said workflow process causes said plurality of software applications to be launched in the desired sequence.

16. The method of claim 15, further comprising causing said application to display user instructions as said workflow process is in progress.

17. The method of claim 16, wherein said user instructions comprises text-based instructions regarding actions to be taken by the user of the browser application.

18. The method of claim 16, wherein said user instructions comprises video instructions regarding actions to be taken by the user of the application.

19. The method of claim 8, wherein a plurality of application icons in a browser-based application includes a first application icon related to the first source, a second application icon related to the second source, and the workflow icon.

20. The method of claim 8, further comprising selecting a color of the workflow icon based on a status of the workflow process.

21. The method of claim 20, wherein said selecting the color for the workflow icon based on the status of the workflow process comprises selecting a first color for the workflow icon if the workflow process is due and selecting a second color for the workflow icon if the workflow process is not due.

22. The method of claim 1, further comprising transmitting by at least the first server to a browser application on the client computing device the browser-based application, wherein the transmitting comprises transmitting the browser-based application to a plurality of browser applications, each of the plurality of browser applications being executed on a corresponding one of a plurality of client computing devices.

23. The method of claim 1, further comprising, in response to receiving a user selection corresponding to a selection of an application icon for a predetermined period of time, causing a browser-based application to enter into an editing mode.

24. The method of claim 23, wherein said editing mode permits a user of the application to drag and drop application icons within the browser-based application.

25. The method of claim 1, further comprising storing authentication information for a plurality of applications associated with a user of the application.

26. The method of claim 1, wherein the first source comprises a plurality of modules, wherein the first modified version of the first source comprises a first module of the plurality of modules.

27. The method of claim 1, wherein the modification of the code of the first source causes authentication of a user of the application to the first source.

28. The method of claim 1, wherein:
the first source is launched in a first operating system at the first source server; and
the second source is launched in a second operating system at the second source server, wherein the second operating system is different from the first operating system.

29. The method of claim 1, further comprising sharing, by a first user of the client computing device, a workflow process with a second user of a different client computing device.

30. The method of claim 1, further comprising providing, by the application an auditing workflow, wherein the auditing workflow is configured to provide status information about an audited workflow.

31. The method of claim 1, wherein the client computing devices causes the first source to be launched at the first source server.

32. A method of managing sources, comprising:
identifying, by at least a first server, a first source at a first source server different from a client computing device;
determining, by at least the first server, first instructions effective to cause the client computing device to execute first client-side code causing modification of code of the first source, wherein the first instructions are associated with the first source;
sending, by at least the first server, the first instructions to the client computing device, wherein execution of the first instructions cause the client computing device to modify code of the first source to cause a browser-based application to execute a first modified version of the first source, wherein modification of the code of the first source is not triggered, natively styled, and natively supported by a first entity controlling the first source, and wherein the first modified version is different than the first source;
identifying, by at least the first server, a second source at a second source server different from the client computing device;
determining, by at least the first server, second instructions effective to cause the client computing device to execute second client-side code causing modification of code of the second source, wherein the second instructions are associated with the second source; and
sending, by at least the first server, the second instructions to the client computing device, wherein execution of the second instructions cause the client computing device to modify code of the second source to cause the browser-based application to execute a second modified version of the second source, wherein modification of the code of the first source is not triggered, natively styled, and natively supported by a second entity controlling the second source, and wherein the second modified version is different than the second source.

* * * * *